US012749290B2

(12) United States Patent
Obinata et al.

(10) Patent No.: US 12,749,290 B2
(45) Date of Patent: Sep. 29, 2026

(54) STORAGE MEDIUM, DATA GENERATION METHOD, AND INFORMATION PROCESSING DEVICE

(71) Applicant: Fujitsu Limited, Kawasaki (JP)

(72) Inventors: Yuya Obinata, Kawasaki (JP); Yasuhiro Aoki, Kawasaki (JP); Takuma Yamamoto, Yokohama (JP); Daisuke Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 18/490,278

(22) Filed: Oct. 19, 2023

(65) Prior Publication Data

US 2024/0212321 A1 Jun. 27, 2024

(30) Foreign Application Priority Data

Dec. 23, 2022 (JP) ................................ 2022-207688

(51) Int. Cl.

| | |
|---|---|
| ***G06V 10/764*** | (2022.01) |
| ***G06F 18/24*** | (2023.01) |
| ***G06N 3/08*** | (2023.01) |
| ***G06Q 20/20*** | (2012.01) |
| ***G06Q 30/0601*** | (2023.01) |

(Continued)

(52) U.S. Cl.

CPC ............ *G06V 10/764* (2022.01); *G06F 18/24* (2023.01); *G06N 3/08* (2013.01); *G06Q 20/20* (2013.01); *G06Q 30/0601* (2013.01); *G06V 20/50* (2022.01); *G07G 1/0045* (2013.01)

(58) Field of Classification Search

CPC ...... G06V 10/764; G06V 20/50; G06V 10/82; G06V 10/774; G06V 20/63; G06V 20/64; G06F 18/24; G06N 3/08; G06Q 20/20; G06Q 30/0601; G07G 1/0045; G07G 1/0036; G07G 3/003

See application file for complete search history.

(56) References Cited

U.S. PATENT DOCUMENTS 12,118,662 B2 * 10/2024 Fox ......................... G06T 17/00
2017/0046613 A1 * 2/2017 Paluri .................... G06N 3/045

(Continued)

FOREIGN PATENT DOCUMENTS

JP 2019-29021 2/2019

OTHER PUBLICATIONS

Al-Halah, Ziad, and Rainer Stiefelhagen. "How to Transfer? Zero-Shot Object Recognition via Hierarchical Transfer of Semantic Attributes." arXiv preprint arXiv:1604.00326. (Year: 2016).*

(Continued)

*Primary Examiner* — Ross Varndell

(74) *Attorney, Agent, or Firm* — Fujitsu Intellectual Property Center

(57) ABSTRACT

A non-transitory computer-readable storage medium storing a data generation program that causes at least one computer to execute a process, the process includes acquiring product data; generating reference source data in which attributes of products are associated with each of a plurality of hierarchies based on a variance relationship of attributes of products included in the acquired product data; and setting the generated reference source data as data to be referred to by a zero-shot image classifier.

7 Claims, 49 Drawing Sheets

(51) Int. Cl.
*G06V 20/50* (2022.01)
*G07G 1/00* (2006.01)

(56) References Cited

U.S. PATENT DOCUMENTS

| | | | | |
|---|---|---|---|---|
| 2021/0279505 | A1* | 9/2021 | Zhong | G06Q 20/208 |
| 2021/0319007 | A1* | 10/2021 | Guggilla | G06F 16/23 |
| 2023/0079018 | A1* | 3/2023 | Fisher | G06V 10/7515<br>382/103 |
| 2024/0153258 | A1* | 5/2024 | Mangla | G06V 10/764 |

OTHER PUBLICATIONS

Klasson, Marcus, Cheng Zhang, and Hedvig Kjellstrom. "A Hierarchical Grocery Store Image Dataset with Visual and Semantic Labels." arXiv preprint arXiv:1901.00711. (Year: 2019).*
Tong, Bin, et al. "Hierarchical disentanglement of discriminative latent features for zero-shot learning." Proceedings of the IEEE/CVF conference on computer vision and pattern recognition. (Year: 2019).*
Marcus Klasson et al., "A Hierarchical Grocery Store Image Dataset with Visual and Semantic Labels", arxiv.org, Cornell University Library, 201 Olin Library Cornell University Ithaca, NY 14853, XP081011017, Jan. 3, 2019, 10 pages. [Cited in Extended European Search Report (EESR) mailed on Feb. 20, 2024 for corresponding European Patent Application No. 23202361.4].
Ziad Al-Halah et al., "How to Transfer? Zero-Shot Object Recognition via Hierarchical Transfer of Semantic Attributes", arxiv.org, Cornell University Library, 201 Olin Library Cornell University Ithaca, NY 14853, XP080692837, 8 pages, Apr. 1, 2016. [Cited in Extended European Search Report (EESR) mailed on Feb. 20, 2024 for corresponding European Patent Application No. 23202361.4].
EESR—Extended European Search Report mailed on Feb. 20, 2024 for corresponding European Patent Application No. 23202361.4 [7 pages].
EPOA—Office Action of European Patent Application No. 23202361.4 dated Jun. 30, 2025 [4 pages].
Kai Yi et al., "Exploring Hierarchical Graph Representation for Large-Scale Zero-Shot Image Classification," arXiv:2203.01386, pp. 1-25, Jul. 19, 2022.
Alec Radford et al., "Learning Transferable Visual Models From Natural Language Supervision", arXiv:2103.00020, pp. 1-48, Feb. 26, 2021.
KROA—Office Action of Korean Patent Application No. 10-2023-0145569 mailed Dec. 10, 2025, with English Translation (11 pages).
** Cited Reference 2—Non-patent Literature by Marcus Klasson et al., was previously submitted in the IDS filed on Mar. 4, 2024.

* cited by examiner

FIG. 6

- SHINE MUSCAT
- HIGH-GRADE KYOHO
- INEXPENSIVE GRAPES A
- INEXPENSIVE GRAPES B
- GRAPES A WITH DEFECTS

⋮

STORAGE MEDIUM, DATA GENERATION METHOD, AND INFORMATION PROCESSING DEVICE

CROSS-REFERENCE TO RELATED APPLICATION

This application is based upon and claims the benefit of priority of the prior Japanese Patent Application No. 2022-207688, filed on Dec. 23, 2022, the entire contents of which are incorporated herein by reference.

FIELD

The embodiments discussed herein are related to a storage medium, a data generation method, and an information processing device.

BACKGROUND

An image recognition technology of recognizing a specific object from an image is widely used. In this technology, for example, an area of a specific object in an image is specified as a bounding box (Bbox). Furthermore, there is also a technology of performing image recognition of an object by using machine learning. Additionally, it is considered to apply such an image recognition technology to, for example, monitoring of purchase operation of a customer in a store and work management of a worker in a factory.

In stores such as supermarkets and convenience stores, self-checkout machines are becoming popular. The self-checkout machine is a point of sale (POS) checkout system by which a user who purchases a product himself/herself performs from reading of a barcode of the product to checkout. For example, by introducing the self-checkout machine, it is possible to implement improvement of labor shortages due to population decrease and suppression of labor costs.

Japanese Laid-open Patent Publication No. 2019-29021 is disclosed as related art.

SUMMARY

According to an aspect of the embodiments, a non-transitory computer-readable storage medium storing a data generation program that causes at least one computer to execute a process, the process includes acquiring product data; generating reference source data in which attributes of products are associated with each of a plurality of hierarchies based on a variance relationship of attributes of products included in the acquired product data; and setting the generated reference source data as data to be referred to by a zero-shot image classifier.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of a product list;

DESCRIPTION OF EMBODIMENTS

In the self-checkout machine described above, since scanning of a product code and checkout are entrusted to a user himself/herself, there is an aspect in which it is difficult to detect a fraudulent act. For example, even when image recognition artificial intelligence (AI) is applied from the aspect of detecting a fraudulent act described above, a large amount of training data is needed for training of the image recognition AI. However, in stores such as supermarkets and convenience stores, since there are a large number of types of products and a life cycle of each product is short, the products are frequently replaced. It is difficult to tune the image recognition AI or train a new image recognition AI in accordance with the life cycles of such products.

In one aspect, an object is to provide a data generation program, a data generation method, and an information processing device capable of implementing reduction in the number of pieces of data referred to by a zero-shot image classifier.

According to an embodiment, it is possible to implement reduction in the number of pieces of data referred to by a zero-shot image classifier.

Hereinafter, embodiments of a data generation program, a data generation method, and an information processing device disclosed in the present application will be described in detail with reference to the drawings. Note that the embodiments do not limit the present disclosure. Furthermore, the respective embodiments may be appropriately combined with each other in a range without contradiction.

First Embodiment

Overall Configuration

Figure 1:
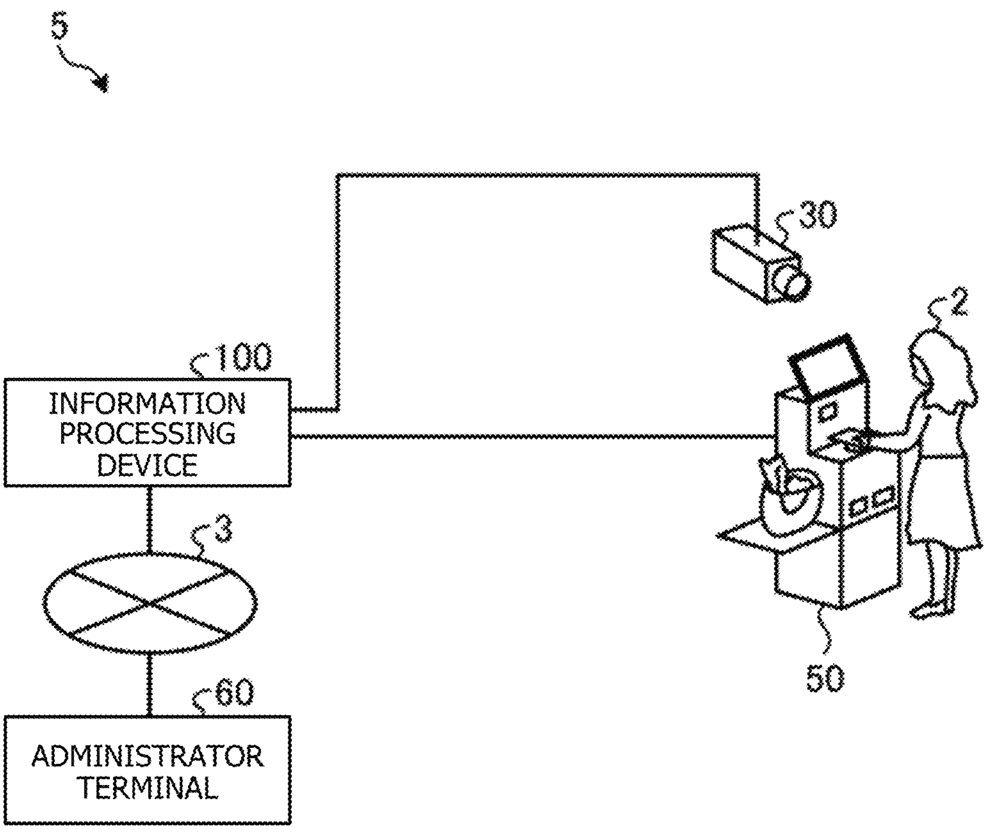
FIG. 1 is a diagram illustrating an overall configuration example of a self-checkout system according to a first embodiment.

FIG. 1 is a diagram illustrating an overall configuration example of a self-checkout system 5 according to a first embodiment. As illustrated in FIG. 1, the self-checkout system 5 includes a camera 30, a self-checkout machine 50, an administrator terminal 60, and an information processing device 100.

The information processing device 100 is an example of a computer coupled to the camera 30 and the self-checkout machine 50. The information processing device 100 is coupled to the administrator terminal 60 via a network 3. The network 3 may be various communication networks regardless of whether the network 3 is wired or wireless. Note that the camera 30 and the self-checkout machine 50 may be coupled to the information processing device 100 via the network 3.

The camera 30 is an example of an image capturing device that captures a video of an area including the self-checkout machine 50. The camera 30 transmits data of the video to the information processing device 100. In the following description, the data of the video may be referred to as "video data".

The video data includes a plurality of time-series image frames. To each image frame, a frame number is assigned in a time-series ascending order. One image frame is image data of a still image captured by the camera 30 at a certain timing.

The self-checkout machine 50 is an example of an accounting machine by which a user 2 himself/herself who purchases a product performs checkout machine registration and checkout (payment) of the product to be purchased, and is called "self checkout", "automated checkout", "self-checkout machine", "self-check-out register", or the like. For example, when the user 2 moves a product to be purchased to a scan area of the self-checkout machine 50, the self-checkout machine 50 scans a code printed or attached to the product and registers the product to be purchased. Hereinafter, registering a product in the self-checkout machine 50 may be referred to as "checkout machine registration". Note that the "code" referred to herein may be a barcode corresponding to a standard such as Japanese Article Number (JAN), Universal Product Code (UPC), or European Article Number (EAN), or may be another two-dimensional code or the like.

The user 2 repeatedly executes the checkout machine registration operation described above, and when scanning of the products is completed, the user 2 operates a touch panel or the like of the self-checkout machine 50 and makes a checkout request. When accepting the checkout request, the self-checkout machine 50 presents the number of products to be purchased, a purchase amount, and the like, and executes checkout processing. The self-checkout machine 50 registers, in a storage unit, information regarding the products scanned from the start of scanning by the user 2 until the checkout request is made, and transmits the information to the information processing device 100 as self-checkout machine data (product information).

The administrator terminal 60 is an example of a terminal device used by an administrator of a store. For example, the administrator terminal 60 may be a mobile terminal device carried by an administrator of a store. Furthermore, the administrator terminal 60 may be a desktop or laptop personal computer. In this case, the administrator terminal 60 may be arranged in a store, for example, in a backyard or the like, or may be arranged in an office outside the store, or the like. As one aspect, the administrator terminal 60 accepts various notifications from the information processing device 100. Note that, here, the terminal device used by the administrator of the store has been exemplified, but the terminal device may be used by all related persons of the store.

In such a configuration, the information processing device 100 acquires product data, and generates reference source data in which attributes of products are associated with each of a plurality of hierarchies based on a variance relationship of the attributes of the products included in the acquired product data. Then, the information processing device 100 sets the generated reference source data as reference source data to be referred to by a zero-shot image classifier.

As a result, the information processing device 100 may implement reduction in the number of pieces of data to be referred to by the zero-shot image classifier used for detection of a fraudulent act in the self-checkout machine 50.

2. Functional Configuration

Figure 2:
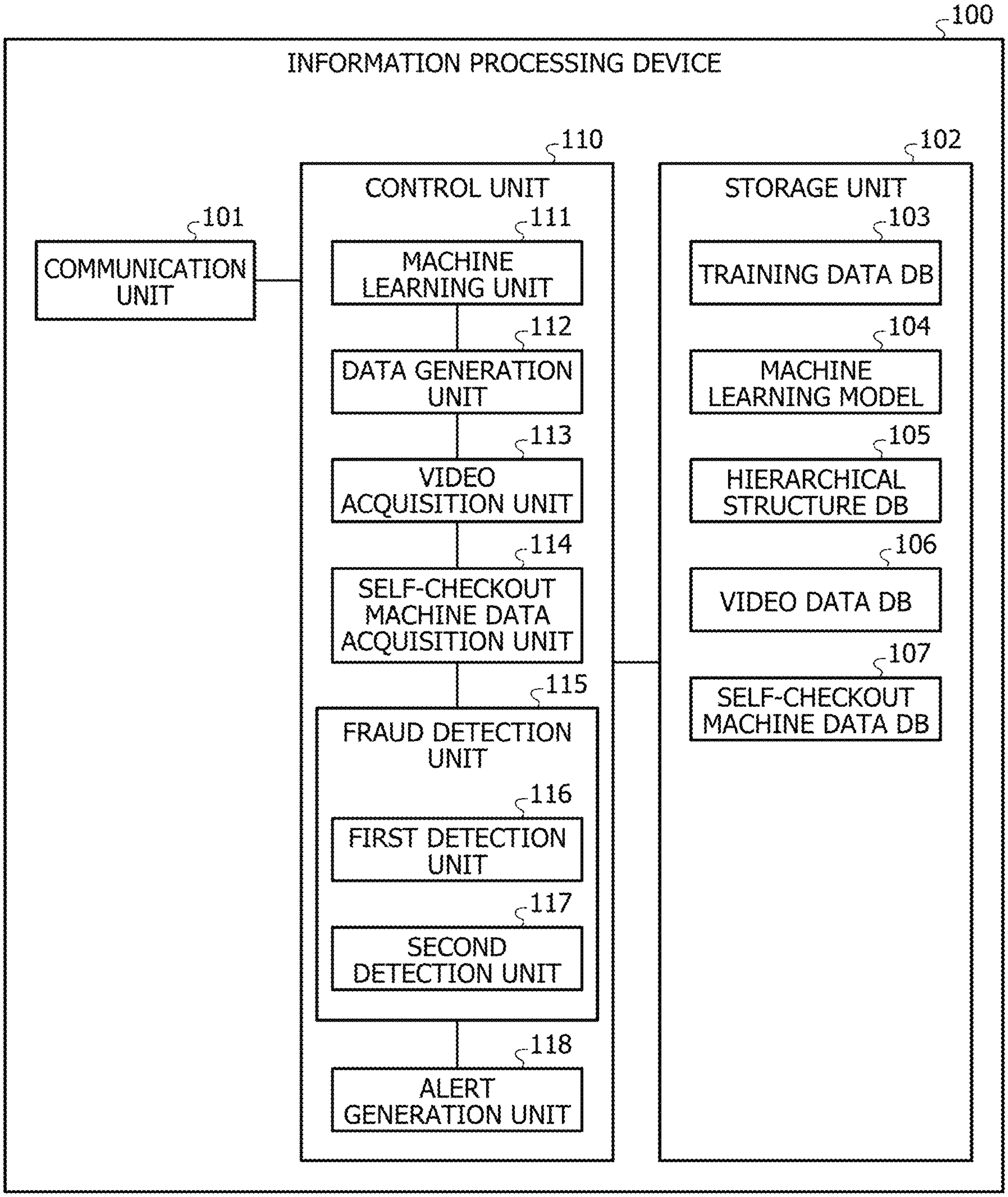
FIG. 2 is a functional block diagram illustrating a functional configuration of an information processing device according to the first embodiment.

FIG. 2 is a functional block diagram illustrating a functional configuration of the information processing device 100 according to the first embodiment. As illustrated in FIG. 2, the information processing device 100 includes a communication unit 101, a storage unit 102, and a control unit 110.

2-1. Communication Unit

The communication unit 101 is a processing unit that controls communication with another device, and is implemented by, for example, a communication interface or the like. For example, the communication unit 101 receives video data from the camera 30, and transmits a processing result by the control unit 110 to the administrator terminal 60.

2-2. Storage Unit

The storage unit 102 is a processing unit that stores various types of data, programs executed by the control unit 110, and the like, and is implemented by a memory, a hard disk, or the like. The storage unit 102 stores a training data database (DB) 103, a machine learning model 104, a hierarchical structure DB 105, a video data DB 106, and a self-checkout machine data DB 107.

2-2-1. Training Data DB

Figure 3:
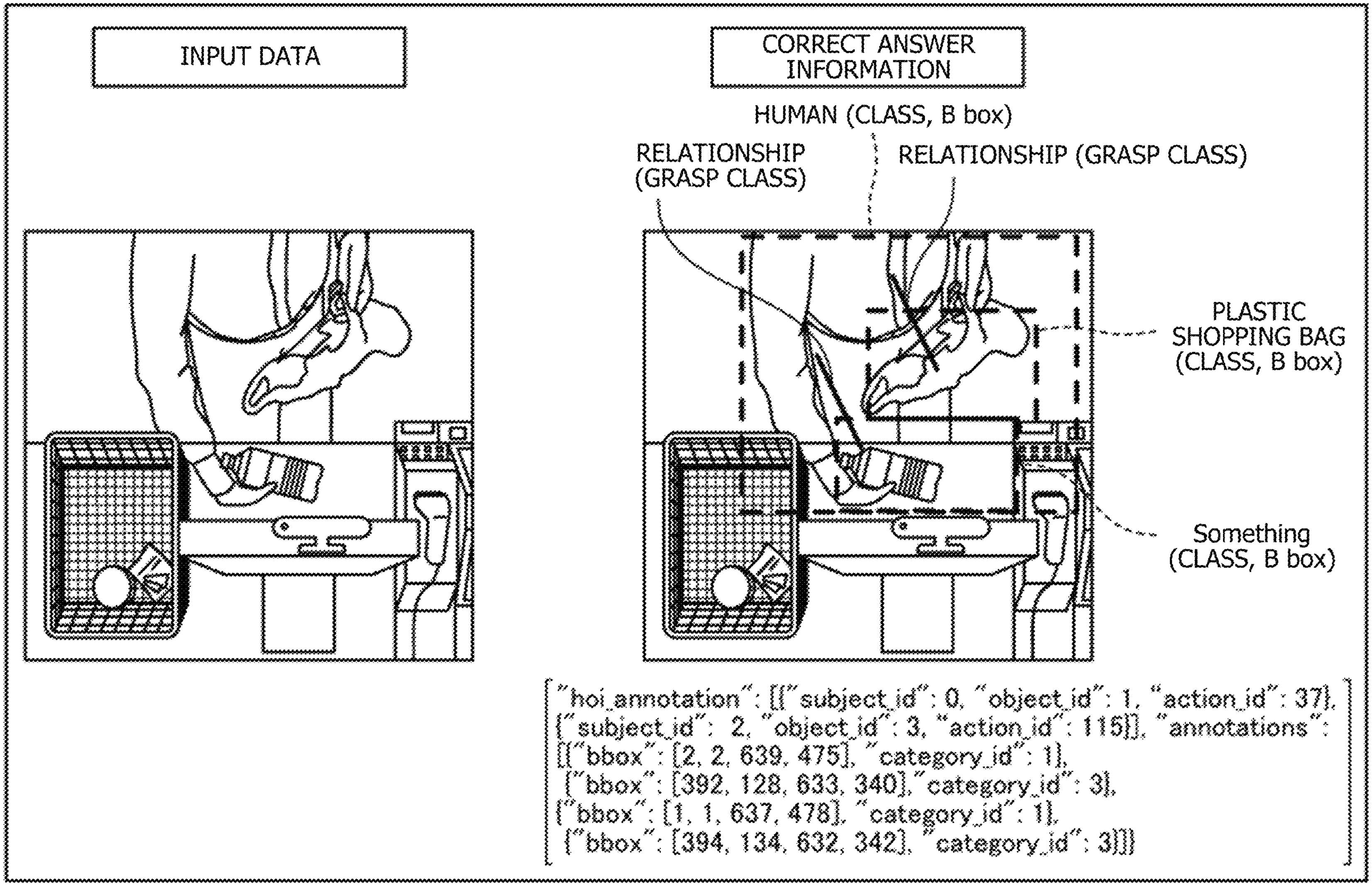
FIG. 3 is a diagram for describing an example of training data of a first machine learning model.

The training data DB 103 is a database that stores data used for training a first machine learning model 104A. For example, an example in which Human-Object Interaction Detection (HOID) is adopted in the first machine learning model 104A will be described with reference to FIG. 3. FIG. 3 is a diagram for describing an example of training data of the first machine learning model 104A. As illustrated in FIG. 3, each piece of the training data includes image data serving as input data and correct answer information set for the image data.

In the correct answer information, classes of a human and an object to be detected, a class indicating an interaction between the human and the object, and a bounding box (Bbox: area information regarding the object) indicating an area of each class are set. For example, as the correct answer information, area information regarding a Something class indicating an object such as a product other than a plastic shopping bag, area information regarding a human class indicating a user who purchases the product, and a relationship (grasp class) indicating an interaction between the Something class and the human class are set. In other words, information regarding an object grasped by a person is set as the correct answer information.

Furthermore, as the correct answer information, area information regarding a plastic shopping bag class indicating a plastic shopping bag, area information regarding the human class indicating the user who uses the plastic shopping bag, and a relationship (grasp class) indicating an interaction between the plastic shopping bag class and the human class are set. In other words, information regarding a plastic shopping bag grasped by the person is set as the correct answer information.

Normally, when the Something class is created in normal object identification (object recognition), all objects that are not related to a task, such as all backgrounds, clothes, and accessories, are detected. Furthermore, since they are all Something, only a large number of Bboxes are identified in the image data, and nothing is known. In the case of the HOID, since it may be known that there is a special relationship of the object possessed by the human (there may be another relationship such as sitting or operating), it is possible to use the relationship for a task (for example, a fraud detection task of a self-checkout machine) as meaningful information. After the object is detected by Something, the plastic shopping bag or the like is identified as a unique class called Bag (plastic shopping bag). The plastic shopping bag is valuable information in the fraud detection task of the self-checkout machine, but is not important information in another task. Thus, it is valuable to use the plastic shopping bag based on unique knowledge of the fraud detection task of the self-checkout machine that a product is taken out from a basket (shopping basket) and stored in the bag, and a useful effect may be obtained.

2-2-2. Machine Learning Model

Returning to FIG. 2, the machine learning model 104 indicates a machine learning model used for the fraud detection task of the self-checkout machine 50. Examples of such a machine learning model 104 may include the first machine learning model 104A used from an aspect of specifying an object grasped by the user 2, for example, a product, and a second machine learning model 104B used from an aspect of specifying an item of the product.

The first machine learning model 104A may be implemented by the HOID described above as merely an example. In this case, the first machine learning model 104A identifies a human, a product, and a relationship between the human and the product from input image data, and outputs an identification result. For example, "human class and area information, product (object) class and area information, an interaction between the human and the product" is output. Note that, here, the example in which the first machine learning model 104A is implemented by the HOID is exemplified, but the first machine learning model 104A may be implemented by a machine learning model using various neural networks or the like.

The second machine learning model 104B may be implemented by a zero-shot image classifier as merely an example. In this case, the second machine learning model 104B uses a list of texts and an image as input, and outputs a text having the highest similarity to the image in the list of the texts as a label of the image.

Here, as an example of the zero-shot image classifier described above, a contrastive language-image pre-training (CLIP) is exemplified. The CLIP implements embedding of a plurality of types of, so-called multimodal, images and texts in a feature space. In other words, in the CLIP, by training an image encoder and a text encoder, embedding in which vectors are close in distance between a pair of an image and a text having close meanings is implemented. For example, the image encoder may be implemented by a vision transformer (ViT), or may be implemented by a convolutional neural network, for example, ResNet or the like. Furthermore, the text encoder may be implemented by a generative pre-trained transformer (GPT)-based Transformer, or may be implemented by a recurrent neural network, for example, a long short-term memory (LSTM).

2-2-3. Hierarchical Structure DB

The hierarchical structure DB 105 is a database that stores a hierarchical structure in which attributes of products are listed for each of a plurality of hierarchies. The hierarchical structure DB 105 is data generated by a data generation unit 112 to be described later, and corresponds to an example of reference source data referred to by the zero-shot image classifier used as an example of the second machine learning model 104B. For example, a text encoder of the zero-shot image classifier refers to a list in which texts corresponding to attributes of products belonging to the same hierarchy are listed in order from a higher hierarchy, in other words, from a shallow hierarchy among the hierarchies included in the hierarchical structure DB 105.

2-2-4. Video Data DB

The video data DB 106 is a database that stores video data captured by the camera 30 installed for the self-checkout machine 50. For example, the video data DB 106 stores, for each self-checkout machine 50 or each camera 30, image data acquired from the camera 30, an output result of the HOID obtained by inputting the image data to the HOID, and the like in units of frames.

2-2-5. Self-Checkout Machine Data DB

The self-checkout machine data DB 107 is a database that stores various types of data acquired from the self-checkout machine 50. For example, the self-checkout machine data DB 107 stores, for each self-checkout machine 50, an item name and the number of purchases of a product subjected to checkout machine registration as an object to be purchased, an amount billed that is a sum of amounts of all the products to be purchased, and the like.

2-3. Control Unit

The control unit 110 is a processing unit that performs overall control of the information processing device 100, and is implemented by, for example, a processor or the like. The control unit 110 includes a machine learning unit 111, the data generation unit 112, a video acquisition unit 113, a self-checkout machine data acquisition unit 114, a fraud detection unit 115, and an alert generation unit 118. Note that the machine learning unit 111, the data generation unit 112, the video acquisition unit 113, the self-checkout machine data acquisition unit 114, the fraud detection unit 115, and the alert generation unit 118 are implemented by an electronic circuit included in a processor, processes executed by the processor, and the like.

2-3-1. Machine Learning Unit

Figure 4:
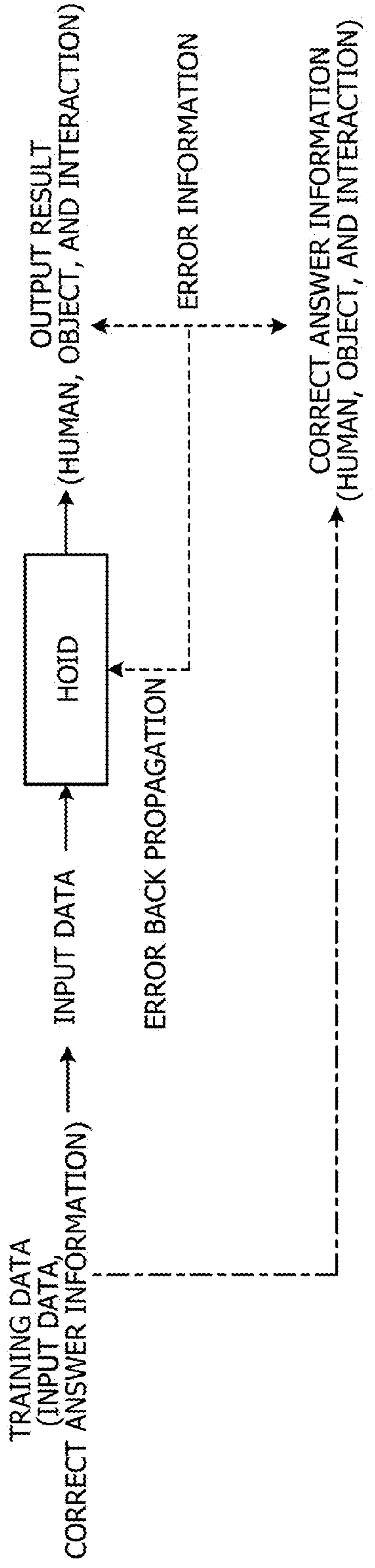
FIG. 4 is a diagram for describing machine learning of the first machine learning model.

The machine learning unit 111 is a processing unit that executes machine learning of the machine learning model 104. As one aspect, the machine learning unit 111 executes machine learning of the first machine learning model 104A by using each piece of the training data stored in the training data DB 103. FIG. 4 is a diagram for describing the machine learning of the first machine learning model 104A. FIG. 4 illustrates an example in which the HOID is used in the first machine learning model 104A. As illustrated in FIG. 4, the machine learning unit 111 inputs input data of the training data to the HOID and acquires an output result of the HOID. The output result includes a human class, an object class, an interaction between the human and the object, and the like detected by the HOID. Then, the machine learning unit 111 calculates error information between correct answer information of the training data and the output result of the HOID, and executes machine learning of the HOID by error back propagation so as to reduce the error. With this configuration, the trained first machine learning model 104A is generated. The trained first machine learning model 104A generated in this manner is stored in the storage unit 102.

As another aspect, the machine learning unit 111 executes machine learning of the second machine learning model 104B. Here, an example in which the second machine learning model 104B is trained by the machine learning unit 111 of the information processing device 100 will be exemplified. However, since the trained second machine learning model 104B is disclosed over the Internet or the like, the machine learning by the machine learning unit 111 does not necessarily have to be executed. Furthermore, the machine learning unit 111 may execute fine-tune in a case where a system is insufficient after the trained second machine learning model 104B is applied to operation of the self-checkout system 5.

Figure 5:
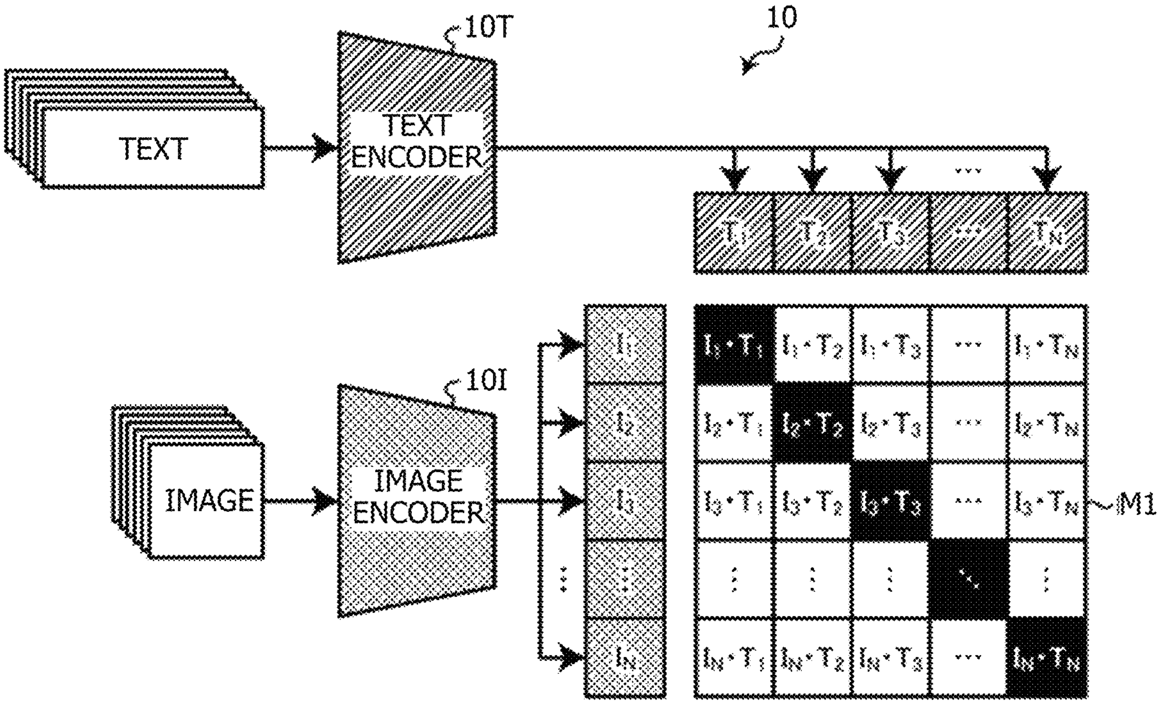
FIG. 5 is a diagram for describing machine learning of a second machine learning model.

FIG. 5 is a diagram for describing the machine learning of the second machine learning model 104B. FIG. 5 illustrates a CLIP model 10 as an example of the second machine learning model 104B. As illustrated in FIG. 5, pairs of images and texts are used as training data for training the CLIP model 10. As such training data, a data set obtained by extracting pairs of images and texts described as captions of the images from a Web page over the Internet, so-called WebImageText (WIT) may be used. For example, a pair of an image such as a photograph in which a dog is captured or a picture in which an illustration of a dog is drawn and a text "dog photograph" described as a caption of the image is used as the training data. By using the WIT as the training data in this manner, labeling work is not needed, and a large amount of training data may be acquired.

Among these pairs of images and texts, images are input to an image encoder 10I, and texts are input to a text encoder 10T. The image encoder 10I to which the images are input in this manner outputs vectors that embed the images in a feature space. On the other hand, the text encoder 10T to which the texts are input outputs vectors that embed the texts in the feature space.

For example, FIG. 5 exemplifies a mini-batch of a batch size N including training data of N pairs: a pair of an image 1 and a text 1, a pair of an image 2 and a text 2, . . . , and a pair of an image N and a text N. In this case, a similarity matrix M1 of N×N embedding vectors may be obtained by inputting each of the N pairs of the images and the texts to the image encoder 10I and the text encoder 10T. Note that the "similarity" referred to herein may be an inner product or cosine similarity between the embedding vectors as merely an example.

Here, in the training of the CLIP model 10, an objective function called Contrastive objective is used because labels become undefined because formats of the captions of the texts of the Web vary.

For the Contrastive objective, in the case of an i-th image of the mini-batch, an i-th text corresponds to a correct pair, and thus the i-th text is used as a positive example, while all other texts are used as negative examples. That is, since one positive example and N−1 negative examples are set for each piece of the training data, N positive examples and $N^2$-N negative examples are generated in the entire mini-batch. For example, in the example of the similarity matrix M1, N elements of diagonal components for which black and white inversion display is performed are used as positive examples, and $N^2$-N elements for which white background display is performed are used as negative examples.

Under such a similarity matrix M1, parameters of the image encoder 10I and the text encoder 10T are trained that maximize similarity of N pairs corresponding to the positive examples and minimize similarity of $N^2$-N pairs corresponding to the negative examples.

For example, in the example of the first image 1, a loss, for example, a cross entropy error is calculated in a row direction of the similarity matrix M1 with the first text as the positive example and the second and subsequent texts as the negative examples. By executing such loss calculation for each of the N images, the losses regarding the images are obtained. On the other hand, in the example of the second text 2, a loss is calculated in a column direction of the similarity matrix M1 with the second image as the positive example and all the images other than the second image as the negative examples. By executing such loss calculation for each of the N texts, the losses regarding the texts are obtained. An update of the parameters that minimizes a statistic, for example an average, of these losses regarding the images and losses regarding the texts is executed on the image encoder 10I and the text encoder 10T.

The training of the image encoder 10I and the text encoder 10T that minimizes such a Contrastive objective generates the trained CLIP model 10.

2-3-2. Data Generation Unit

Returning to the description of FIG. 2, the data generation unit 112 is a processing unit that generates reference source data referred to by the second machine learning model 104B. As merely an example, the data generation unit 112 generates a list of texts, so-called class captions, to be input to the zero-shot image classifier which is an example of the second machine learning model 104B.

More specifically, the data generation unit 112 acquires a product list of a store such as a supermarket or a convenience store. The acquisition of such a product list may be implemented by acquiring a list of products registered in a product master in which products of the store are stored in a database as merely an example. With this configuration, a product list illustrated in FIG. 6 is acquired as merely an example. FIG. 6 is a diagram illustrating an example of the product list. In FIG. 6, as examples of product items related to a fruit “grapes” among the entire products sold in the store, “shine muscat”, “high-grade kyoho”, “inexpensive grapes A”, “inexpensive grapes B”, and “grapes A with defects” are excerpted and indicated.

Figure 7:
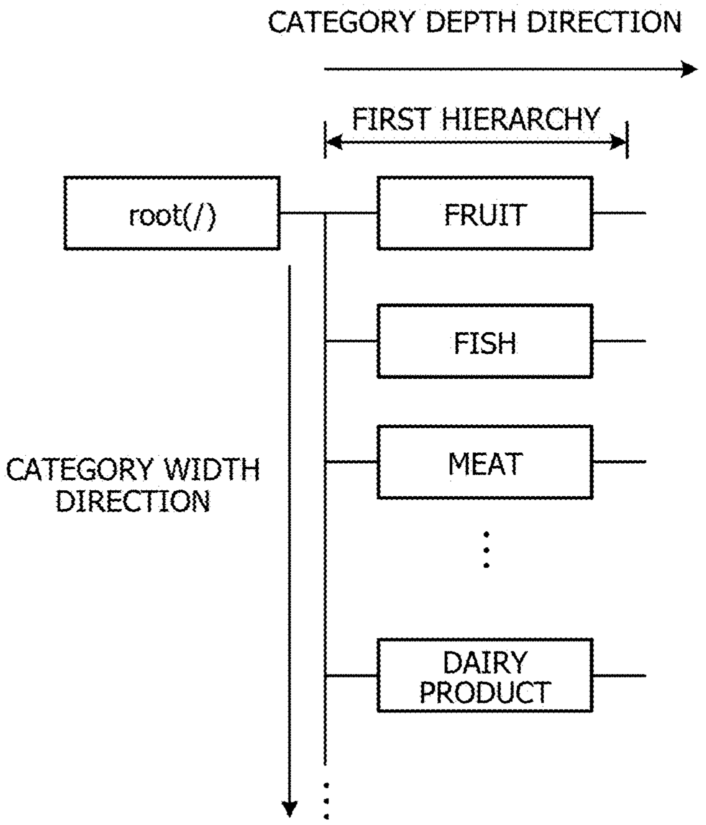
FIG. 7 is a diagram illustrating an example of a template.

Moreover, as merely an example, the data generation unit 112 acquires a template having a hierarchical structure illustrated in FIG. 7. As for the acquisition of the template having the hierarchical structure, the template may be generated by setting categories of the products to be sold in the store, such as “fruit”, “fish”, or “meat”, as elements of a first hierarchy, for example. FIG. 7 is a diagram illustrating an example of the template. As illustrated in FIG. 7, the template has a hierarchical structure with root as a highest hierarchy. Moreover, in the first hierarchy in which a depth from the root is “1”, categories such as “fruit”, “fish”, “meat”, . . . , and “dairy product” are included as elements (nodes). Note that, in FIG. 7, from an aspect of simplifying the description, the template in which the categories of the products are set as the first hierarchy is exemplified. However, large classification of the products, for example, classification of a fruit, a fish, or the like, may be set as the first hierarchy, and small classification of the products, for example, classification of grapes, an apple, or the like, may be set as a second hierarchy.

Subsequently, the data generation unit 112 adds an attribute specified by a system definition or a user definition, for example, an attribute related to “price”, or the like, for each element of a lowermost hierarchy of the template of the hierarchical structure, for example, the first hierarchy at this time. Hereinafter, the attribute related to “price” may be referred to as “price attribute”. Note that, in the following, the price attribute will be exemplified as merely an example of the attribute. However, it is to be naturally noted that another attribute such as “color”, “shape”, or “the number of pieces of stock” may be added, for example, although details will be described later.

Figure 8:
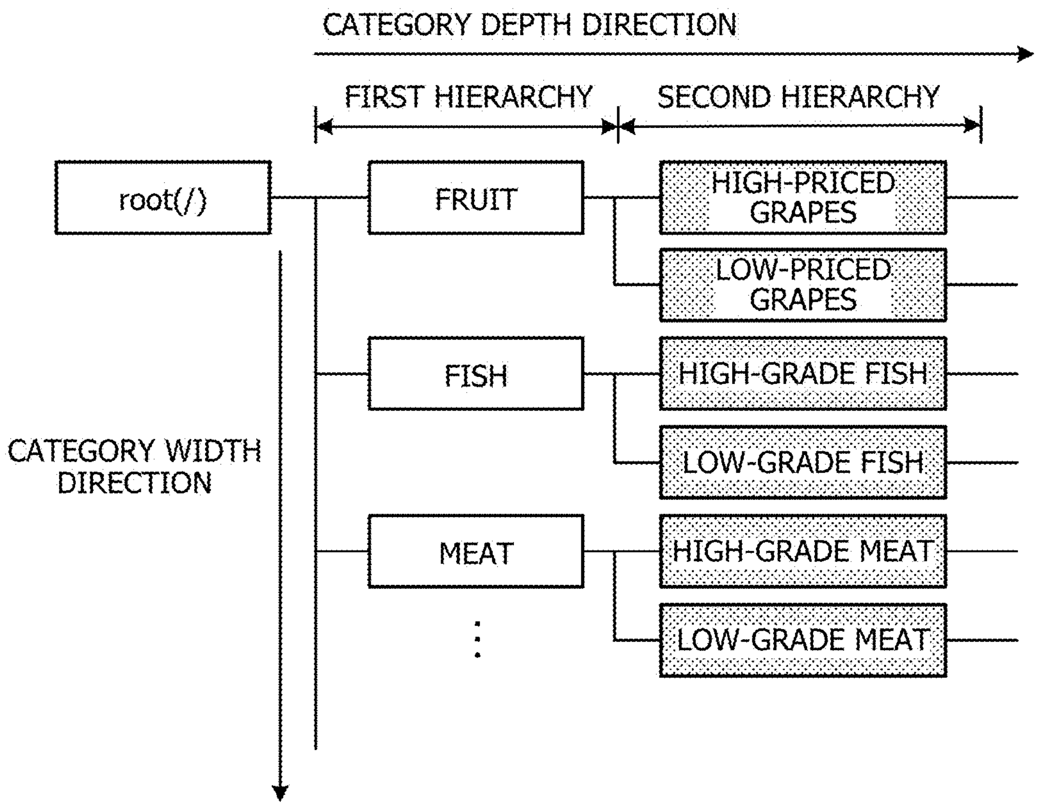
FIG. 8 is a diagram (1) for describing generation of hierarchical structure data.

FIG. 8 is a diagram (1) for describing generation of hierarchical structure data. In FIG. 8, elements of portions corresponding to the template illustrated in FIG. 7 are indicated by white background, and portions of attributes added to the respective elements are indicated by hatching. As illustrated in FIG. 8, attributes related to “price” are added to the respective elements of the first hierarchy. For example, in the example of the element “fruit” of the first hierarchy, an element “high-priced grapes” of the second hierarchy and an element “low-priced grapes” of the second hierarchy are added to the element “fruit” of the first hierarchy. Here, as merely an example, FIG. 8 exemplifies an example in which two price attributes are added to one element, but the embodiment is not limited to this, and less than two or three or more price attributes may be added to one element. For example, three price attributes of the element “high-priced grapes” of the second hierarchy, an element “medium-priced grapes” of the second hierarchy, and the element “low-priced grapes” of the second hierarchy may be added to the element “fruit” of the first hierarchy. Additionally, the number of price attributes to be assigned may be changed according to the elements of the first hierarchy. In this case, the number of price attributes may be increased as the number of product items belonging to the elements of the first hierarchy or variance in price increases.

Then, the data generation unit 112 extracts, for each element of the lowermost hierarchy of the hierarchical structure being generated, in other words, for each element k of the price attributes belonging to the second hierarchy at the present time, a product item whose similarity to the element k is a threshold th1 or more.

Figure 9:
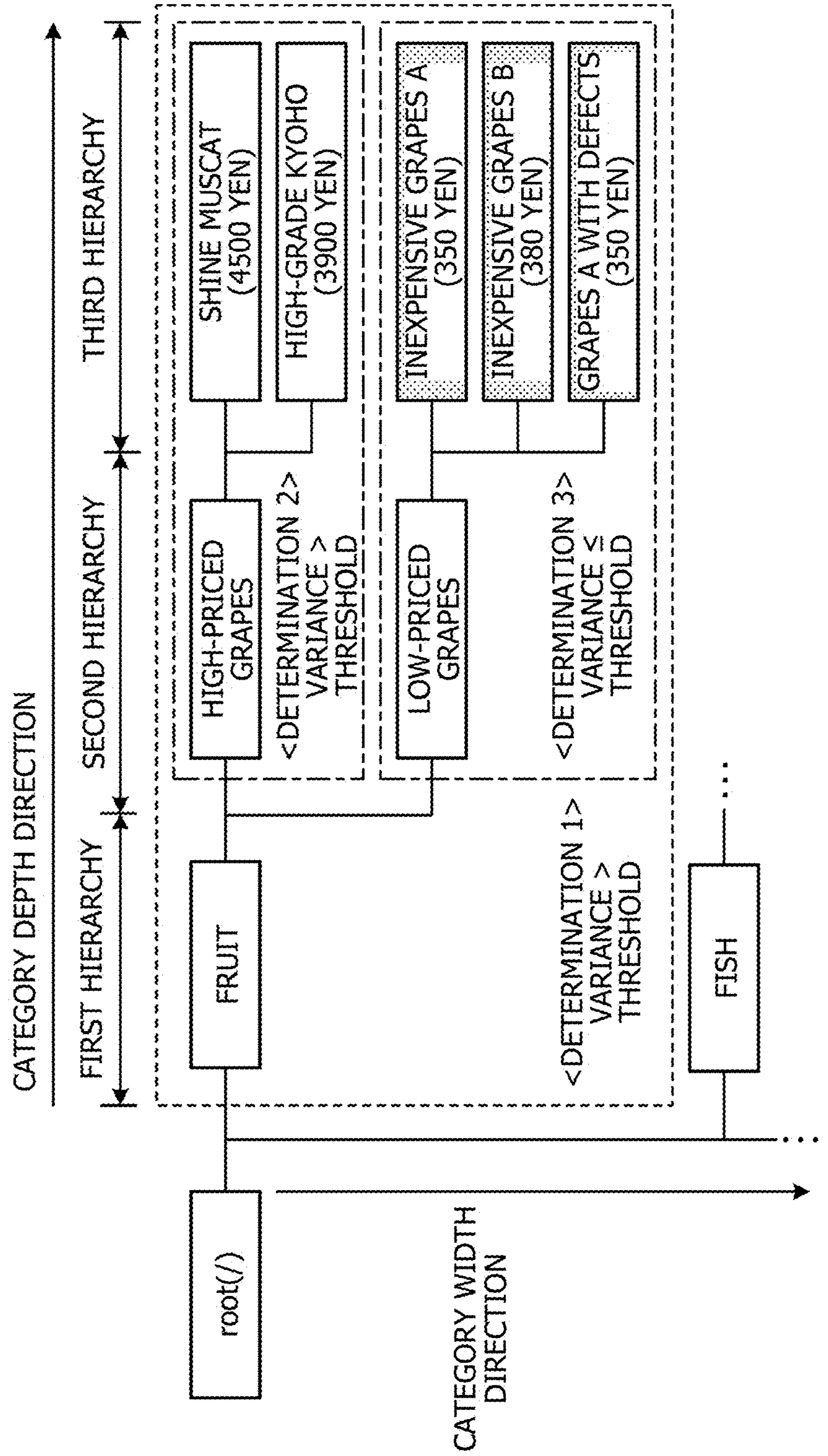
FIG. 9 is a diagram (2) for describing the generation of the hierarchical structure data.

FIG. 9 is a diagram (2) for describing the generation of the hierarchical structure data. In FIG. 9, an example related to the product category “fruit” is excerpted and indicated. For example, an example of extraction of product items related to the element “high-priced grapes” of the second hierarchy illustrated in FIG. 9 will be exemplified. In this case, an embedding vector of the element “high-priced grapes” of the second hierarchy is obtained by inputting a text “high-priced grapes" corresponding to the element "high-priced grapes" of the second hierarchy to the text encoder 10T of the CLIP model 10. On the other hand, an embedding vector of each product item is obtained by inputting, for each product item included in the product list illustrated in FIG. 6, a text for the product item to the text encoder 10T of the CLIP model 10. Then, similarity between the embedding vector of the element "high-priced grapes" of the second hierarchy and the embedding vector of each product item is calculated. As a result, product items "shine muscat" and "high-grade kyoho" of which similarity to the embedding vector of the element "high-priced grapes" of the second hierarchy is the threshold th1 or more are extracted for the element "high-priced grapes" of the second hierarchy. Similarly, product items "inexpensive grapes A", "inexpensive grapes B", and "grapes A with defects" of which similarity to the embedding vector of the element "low-priced grapes" of the second hierarchy is the threshold th1 or more are extracted for the element "low-priced grapes" of the second hierarchy. Note that, here, an example has been exemplified in which the product items are extracted by matching the embedding vectors between the texts, but one or both of the embedding vectors may be an embedding vector of an image.

Thereafter, for each element n of an m-th hierarchy from the first hierarchy to an M−1-th hierarchy excluding an M-th hierarchy that is a lowermost hierarchy among all M hierarchies in the hierarchical structure being generated, the data generation unit 112 calculates variance V of prices of product items belonging to the element n. Then, the data generation unit 112 determines whether or not the variance V of the prices is a threshold th2 or less. At this time, in a case where the variance V of the prices is the threshold th2 or less, the data generation unit 112 determines to terminate search of a hierarchy lower than the element n. On the other hand, in a case where the variance V of the prices is not the threshold th2 or less, the data generation unit 112 increments a loop counter m of the hierarchy by one, and repeats calculation of the variance of the prices and threshold determination of the variance for each element of the hierarchy one level lower.

As merely an example, a case will be exemplified where it is assumed that the first hierarchy illustrated in FIG. 9 is the m-th hierarchy and the element "fruit" of the first hierarchy is the element n. In this case, the element "fruit" of the first hierarchy includes five product items such as shine muscat (4500 yen), high-grade kyoho (3900 yen), inexpensive grapes A (350 yen), inexpensive grapes B (380 yen), and "grapes A with defects (350 yen), as indicated by a broken line frame in FIG. 9. At this time, since variance $V_{11}$ of the prices is not the threshold th2 or less (determination 1 in the drawing), the search for the lower hierarchy is continued. In other words, the loop counter m of the hierarchy is incremented by one, and the second hierarchy is set as the m-th hierarchy.

Next, a case will be exemplified where it is assumed that the second hierarchy illustrated in FIG. 9 is the m-th hierarchy and the element "high-priced grapes" of the second hierarchy is the element n. In this case, the element "high-priced grapes" of the second hierarchy includes two product items such as shine muscat (4500 yen) and high-grade kyoho (3900 yen), as indicated by a one-dot chain line frame in FIG. 9. At this time, although the variance $V_{21}$ of the prices is not the threshold th2 or less (determination 2 in the drawing), since the element "high-priced grapes" of the second hierarchy is an element of a hierarchy one level lower than a third hierarchy which is the lowermost hierarchy, the search is ended.

Moreover, a case will be exemplified where it is assumed that the second hierarchy illustrated in FIG. 9 is the m-th hierarchy and the element "low-priced grapes" of the second hierarchy is the element n. In this case, the element "low-priced grapes" of the second hierarchy includes three product items such as inexpensive grapes A (350 yen), inexpensive grapes B (380 yen), and "grapes A with defects (350 yen), as indicated by a two-dot chain line frame in FIG. 9. At this time, since variance $V_{22}$ of the prices is the threshold th2 or less (determination 3 in the drawing), termination of the search for the lower hierarchy is determined.

Thereafter, the data generation unit 112 repeats the search until termination of the search started for each element of the first hierarchy is determined or all the elements in the M−1-th hierarchy are searched. Then, the data generation unit 112 determines a depth of each route of the hierarchical structure based on a determination result of the variance of the prices obtained at the time of the search described above.

As merely an example, in a case where there is an element for which the variance of the prices of the product item is the threshold th2 or less in the route from the elements of the highest hierarchy to the elements of the lowermost hierarchy of the hierarchical structure having the M hierarchies in total, the data generation unit 112 sets the element as a terminal node. On the other hand, in a case where there is no element for which the variance of the prices of the product item is the threshold th2 or less in the route from the elements of the highest hierarchy to the elements of the lowermost hierarchy, the data generation unit 112 sets an element corresponding to the product item as the terminal node.

For example, in the example illustrated in FIG. 9, a route coupling the element "fruit" of the first hierarchy, the element "high-priced grapes" of the second hierarchy, and the element "shine muscat" of the third hierarchy or the element "high-grade kyoho" of the third hierarchy is exemplified. In this route, neither the variance $V_{11}$ of the prices in the element "fruit" of the first hierarchy nor the variance $V_{21}$ of the prices in the element "high-priced grapes" of the second hierarchy is determined to be the threshold th2 or less. Therefore, in this route, the element "shine muscat" of the third hierarchy and the element "high-grade kyoho" of the third hierarchy are set as the terminal nodes.

Next, in the example illustrated in FIG. 9, a route coupling the element "fruit" of the first hierarchy, the element "low-priced grapes" of the second hierarchy, and the element "inexpensive grapes A" of the third hierarchy, the element "inexpensive grapes B" of the third hierarchy, or the element "grapes A with defects" of the third hierarchy will be exemplified. In this route, although the variance $V_{11}$ of the prices in the element "fruit" of the first hierarchy is not determined to be the threshold th2 or less, the variance $V_{22}$ of the prices in the element "low-priced grapes" of the second hierarchy is determined to be the threshold th2 or less. Therefore, in this route, the element "low-priced grapes" of the second hierarchy is set as the terminal node.

Figure 10:
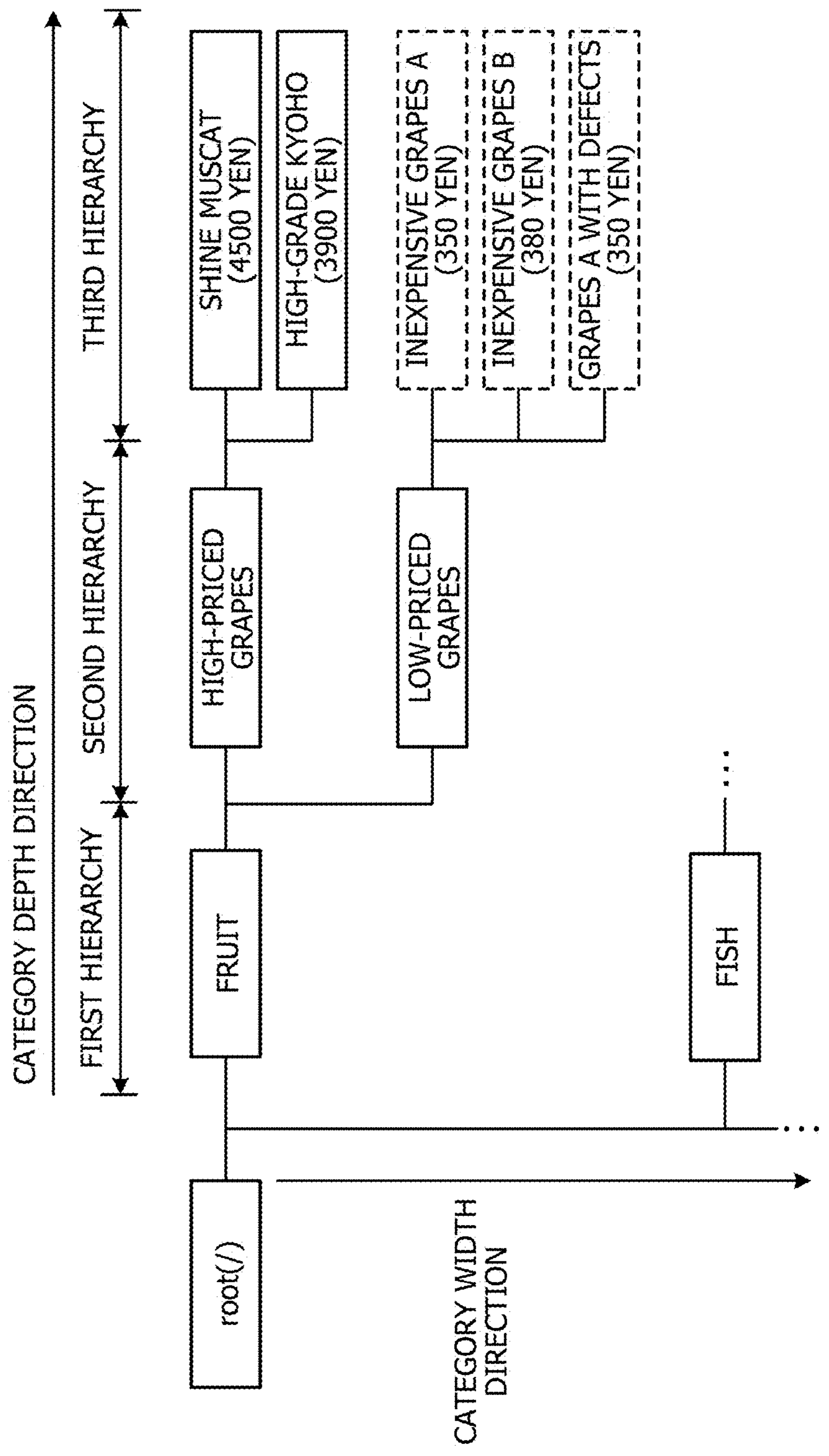
FIG. 10 is a diagram illustrating an example of a hierarchical structure.

By determining the depth of each route of the hierarchical structure having the M hierarchies illustrated in FIG. 9 in this manner, the hierarchical structure illustrated in FIG. 10 is confirmed. The hierarchical structure generated in this manner is stored in the hierarchical structure DB 105 of the storage unit 102.

FIG. 10 is a diagram illustrating an example of the hierarchical structure. In FIG. 10, the elements after the terminal node for which the variance of the prices of the product item is the threshold th2 or less are indicated by broken lines. As illustrated in FIG. 10, the hierarchical structure includes the route coupling the element "fruit" of the first hierarchy, the element "high-priced grapes" of the second hierarchy, and the element "shine muscat" of the third hierarchy or the element "high-grade kyoho" of the third hierarchy. Moreover, the hierarchical structure includes a route coupling the element "fruit" of the first hierarchy and the element "low-priced grapes" of the second hierarchy.

According to such a hierarchical structure, a list of class captions is input to the zero-shot image classifier which is an example of the second machine learning model 104B. For example, as a list of class captions of the first hierarchy, a list of a text "fruit", a text "fish", and the like is input to the text encoder 10T of the CLIP model 10. At this time, it is assumed that the "fruit" is output by the CLIP model as a label of a class corresponding to an input image to the image encoder 10I. In this case, as a list of class captions of the second hierarchy, a list of a text "high-priced grapes" and a text "low-priced grapes" is input to the text encoder 10T of the CLIP model 10.

In this manner, a list in which texts corresponding to attributes of products belonging to the same hierarchy are listed in order from a higher hierarchy of a hierarchical structure is input as a class caption of the CLIP model 10. With this configuration, it is possible to cause the CLIP model 10 to execute narrowing down of candidates of a product item in units of hierarchies. Therefore, a processing cost for implementing a task may be reduced as compared with a case where a list of texts corresponding to all product items of the store is input as the class caption of the CLIP model 10.

Moreover, in the hierarchical structure to be referred to by the CLIP model 10, an element lower than an element for which variance of prices of a product item is the threshold th2 or less is omitted, and thus, it is possible to perform clustering between product items having a small difference in a damage amount at the time of occurrence of a fraudulent act. With this configuration, it is possible to implement further reduction in the processing cost for implementing a task.

Furthermore, in stores such as supermarkets and convenience stores, since there are a large number of types of products and a life cycle of each product is short, the products are frequently replaced.

The hierarchical structure data to be referred to by the CLIP model 10 is a plurality of product candidates arranged in the store at the present time among candidates of a large number of types of products to be replaced. That is, it is sufficient that a part of the hierarchical structure of the CLIP model 10 is updated according to the replacement of the products arranged in the store. It is possible to easily manage the plurality of product candidates arranged in the store at the present time among the candidates of the large number of types of products to be replaced.

2-3-3. Video Acquisition Unit

Returning to the description of FIG. 2, the video acquisition unit 113 is a processing unit that acquires video data from the camera 30. For example, the video acquisition unit 113 acquires video data from the camera 30 installed for the self-checkout machine 50 in an optional cycle, for example, in units of frames. Then, in a case where image data of a new frame is acquired, the video acquisition unit 113 inputs the image data to the first machine learning model 104A, for example, an HOID model, and acquires an output result of the HOID. Then, the video acquisition unit 113 stores, for each frame, the image data of the frame and the output result of the HOID of the frame in the video data DB 106 in association with each other.

2-3-4. Self-Checkout Machine Data Acquisition Unit

The self-checkout machine data acquisition unit 114 is a processing unit that acquires, as self-checkout machine data, information regarding a product subjected to checkout machine registration in the self-checkout machine 50. The "checkout machine registration" referred to herein may be implemented by scanning a product code printed or attached to a product, or may be implemented by manually inputting the product code by the user 2. A reason why operation of causing the user 2 to manually input the product code is performed as in the latter case is that it is not necessarily possible to print or attach labels of codes to all the products. The self-checkout machine data acquired in response to the checkout machine registration in the self-checkout machine 50 in this manner is stored in the self-checkout machine data DB 107.

2-3-5. Fraud Detection Unit

The fraud detection unit 115 is a processing unit that detects various fraudulent acts based on video data obtained by capturing a periphery of the self-checkout machine 50. As illustrated in FIG. 2, the fraud detection unit 115 includes a first detection unit 116 and a second detection unit 117.

2-3-5-1. First Detection Unit

The first detection unit 116 is a processing unit that detects a fraudulent act of replacing a label of a high-priced product with a label of a low-priced product and performing scanning, that is, a so-called label switch.

As one aspect, the first detection unit 116 starts processing in a case where a new product code is acquired through scanning in the self-checkout machine 50. In this case, the first detection unit 116 searches for a frame corresponding to a time when the product code is scanned among frames stored in the video data DB 106. Then, the first detection unit 116 generates an image of a product grasped by the user 2 based on an output result of the HOID corresponding to the frame for which the search is hit. Hereinafter, the image of the product grasped by the user 2 may be referred to as a "hand-held product image".

Figure 11:
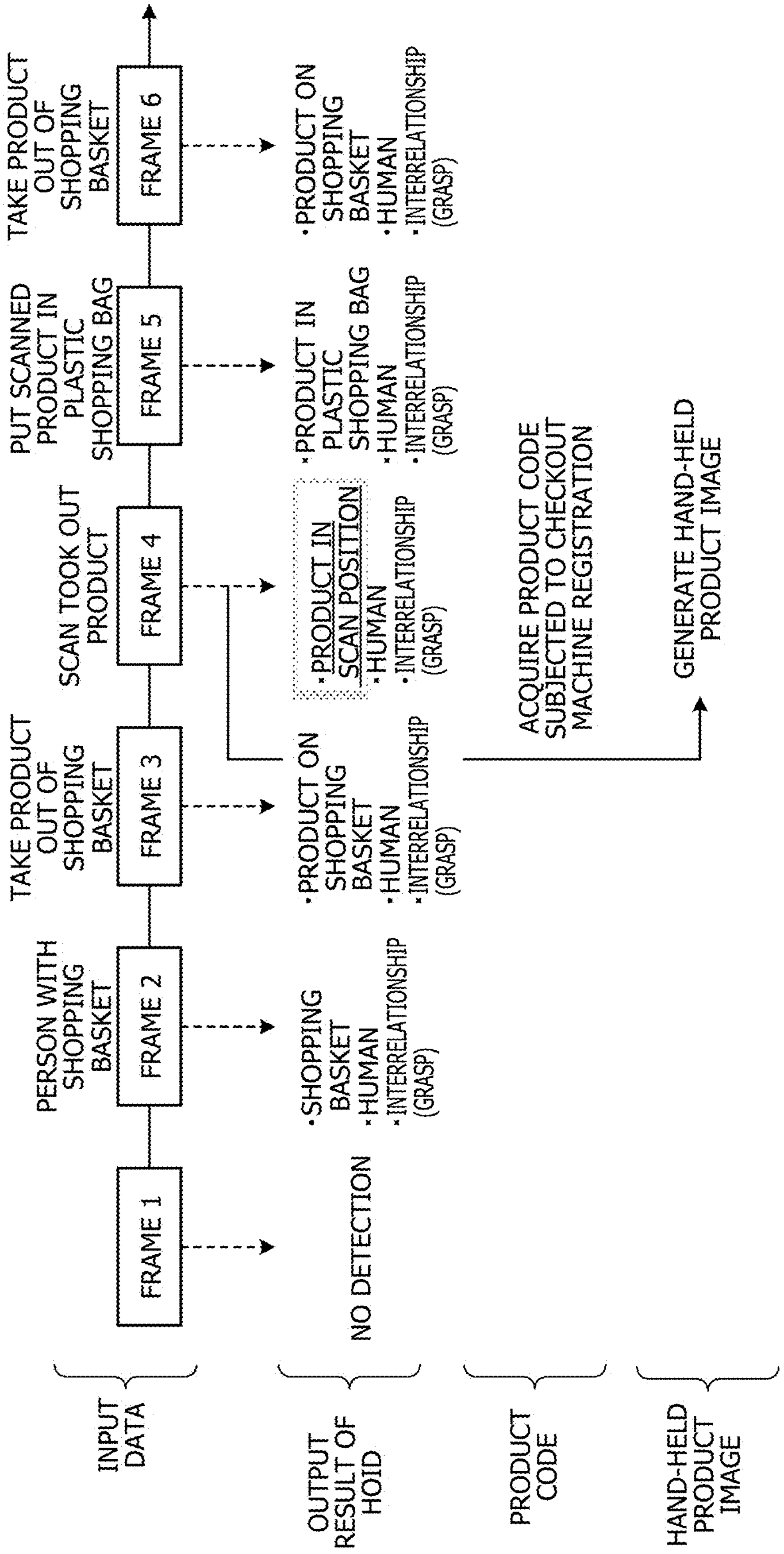
FIG. 11 is a diagram (1) for describing generation of a hand-held product image.

FIG. 11 is a diagram (1) for describing generation of the hand-held product image. FIG. 11 illustrates pieces of image data that are input data to the HOID model and output results of the HOID in time series of frame numbers "1" to "6" acquired from the camera 30. For example, in the example illustrated in FIG. 11, based on a time when a product code subjected to checkout machine registration in the self-checkout machine 50 is scanned, a frame that is the shortest from the time, has a degree of overlap between an object Bbox and a scan position a threshold or more, and has an interaction of a grasp class is searched for. As a result, a hand-held product image is generated by using the output result of the HOID of the frame number "4" that hits the search. With this configuration, it is possible to specify the image of the product in which the user 2 grasps the product at the scan position.

Figure 12:
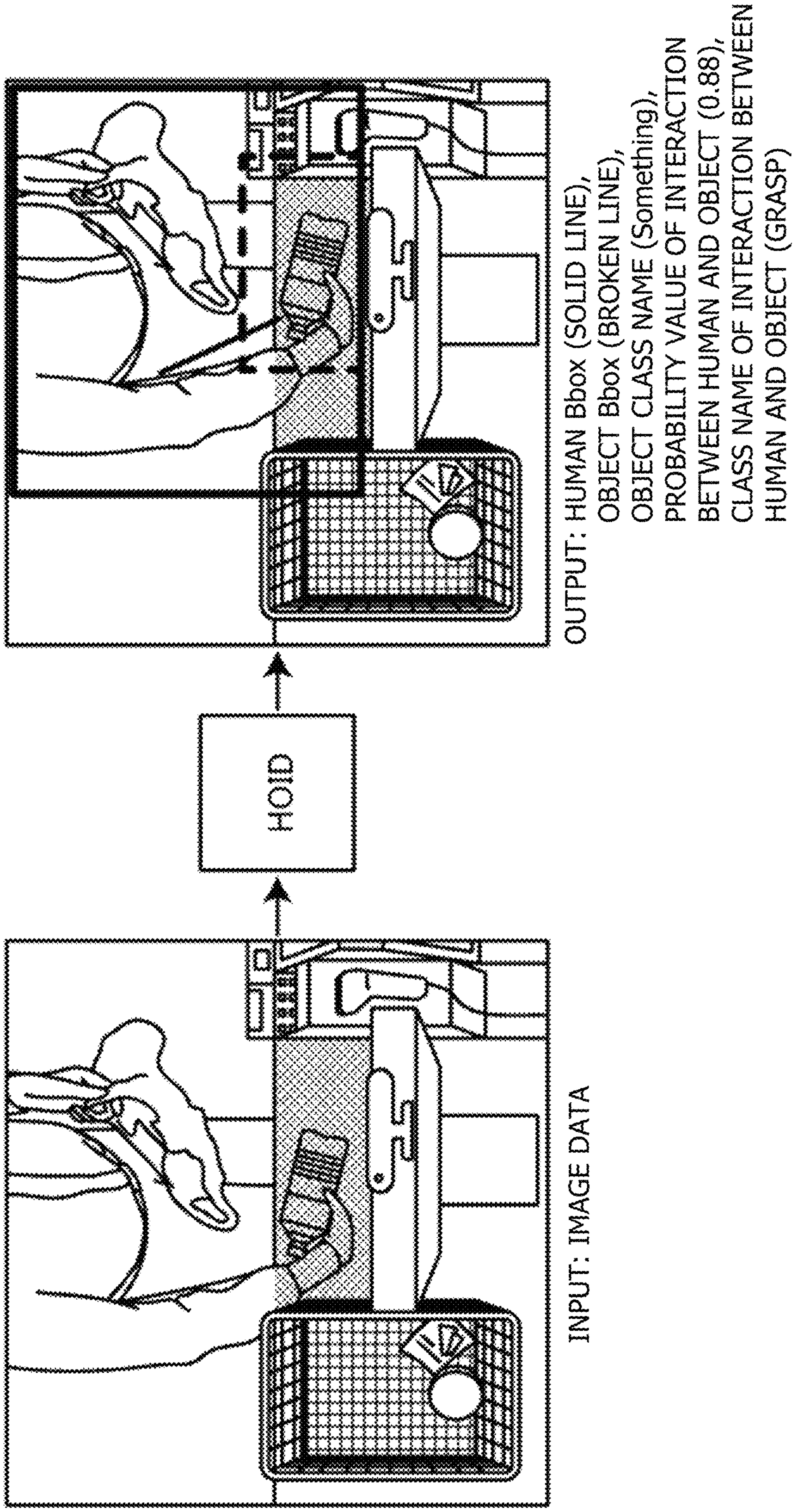
FIG. 12 is a diagram (2) for describing the generation of the hand-held product image.

FIG. 12 is a diagram (2) for describing the generation of the hand-held product image. FIG. 12 illustrates the image data corresponding to the frame number "4" illustrated in FIG. 11 and the output result of the HOID in a case where the image data is input to the HOID model. Moreover, in FIG. 12, a human Bbox is indicated by a solid line frame, and an object Bbox is indicated by a broken line frame. As illustrated in FIG. 12, the output result of the HOID includes the human Bbox, the object Bbox, a probability value and a class name of an interaction between the human and the object, and the like. With reference to the object Bbox among these, the first detection unit 116 cuts out the object Bbox, in other words, a partial image corresponding to the broken line frame in FIG. 12 from the image data of the frame number "4", thereby generating the hand-held product image.

After the hand-held product image is generated in this manner, the first detection unit 116 inputs the hand-held product image to the zero-shot image classifier which is an example of the second machine learning model 104B. Moreover, the first detection unit 116 inputs, to the zero-shot image classifier, a list in which texts corresponding to attributes of products belonging to the same hierarchy are listed in order from a higher hierarchy according to a hierarchical structure stored in the hierarchical structure DB 105. With this configuration, candidates of a product item are narrowed down as the hierarchy of the texts input to the zero-shot image classifier becomes deeper. Then, the first detection unit 116 determines whether or not a product item subjected to checkout machine registration through scanning matches a product item specified by the zero-shot image classifier or a product item group included in a higher attribute thereof. At this time, in a case where both the product items do not match, it may be detected that a label switch is performed. Note that details of specification of a product item by using the zero-shot image classifier will be described later with reference to FIGS. 17 to 21.

2-3-5-2. Second Detection Unit

The second detection unit 117 is a processing unit that detects a fraudulent act of subjecting a low-priced product to checkout machine registration instead of subjecting a high-priced product without a label to checkout machine registration, that is, a so-called banana trick. Such checkout machine registration for a product without a label is performed by manual input by the user 2.

Figure 13:
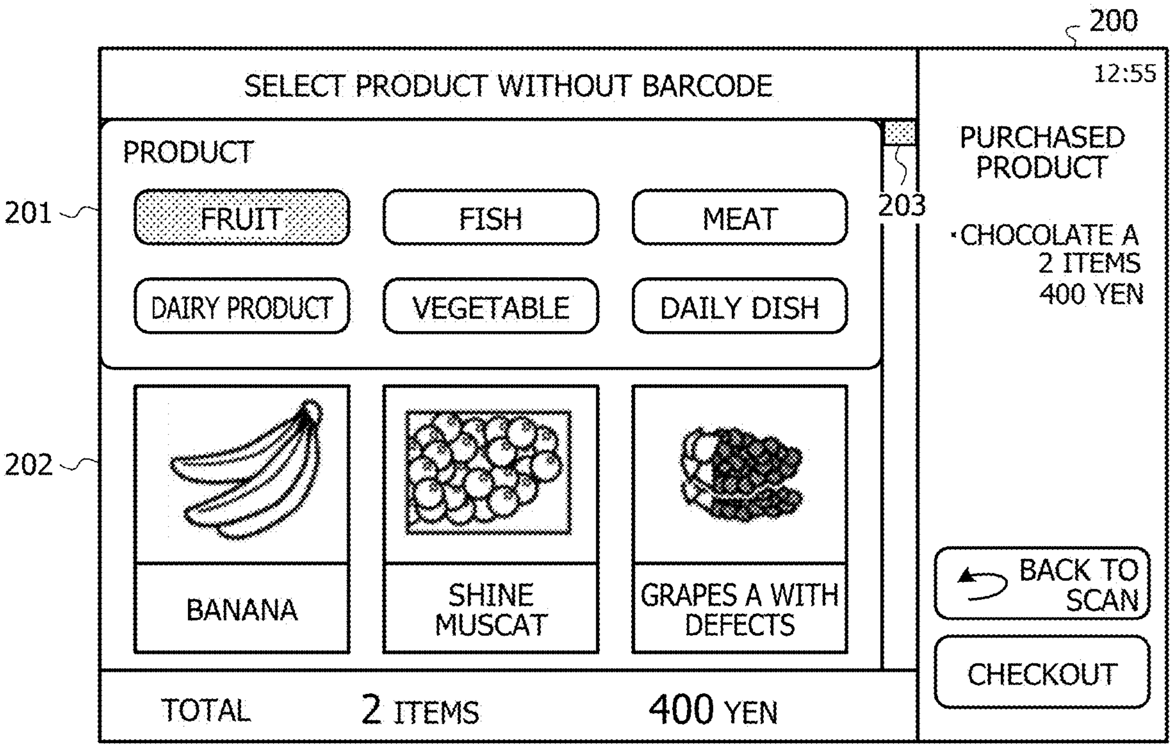
FIG. 13 is a diagram (1) illustrating a display example of a self-checkout machine.

As merely an example, in the self-checkout machine 50, there is a case where checkout machine registration of a product without a label is accepted via operation on a selection screen of a product without a code illustrated in FIG. 13.

FIG. 13 is a diagram (1) illustrating a display example of the self-checkout machine 50. As illustrated in FIG. 13, a selection screen 200 for a product without a code may include a display area 201 for a product category and a display area 202 for a product item belonging to a category being selected. For example, the selection screen 200 for a product without a code illustrated in FIG. 13 illustrates an example in which a product category "fruit" is being selected among product categories "fruit", "fish", "meat", "dairy product", "vegetable", and "daily dish" included in the display area 201. In this case, the display area 202 displays product items "banana", "shine muscat", "grapes A with defects", and the like belonging to the product category "fruit". In a case where there is no space for arranging all the product items belonging to the product category "fruit" in the display area 202, it is possible to expand a range in which the product items are arranged by scrolling a display range of the display area 202 via a scroll bar 203. By accepting selection operation from such product items displayed in the display area 202, checkout machine registration of a product without a label may be accepted.

Figure 14:
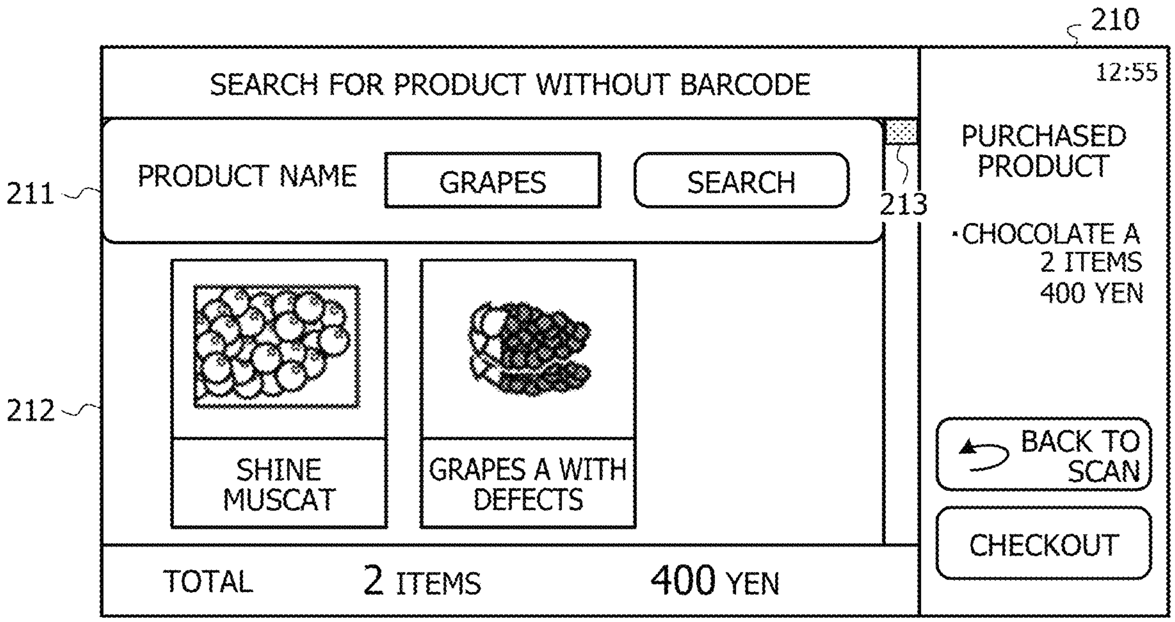
FIG. 14 is a diagram (2) illustrating a display example of the self-checkout machine.

As another example, in the self-checkout machine 50, there is also a case where checkout machine registration of a product without a label is accepted via operation on a search screen of a product without a code illustrated in FIG. 14.

FIG. 14 is a diagram (2) illustrating a display example of the self-checkout machine 50. As illustrated in FIG. 14, a search screen 210 for a product without a code may include a search area 211 for searching for a product and a display area 212 in which a list of search results is displayed. For example, the search screen 210 for a product without a code illustrated in FIG. 14 illustrates a case where "grapes" is specified as a search keyword. In this case, the display area 212 displays product items "shine muscat", "grapes A with defects", and the like as search results of the search keyword "grapes". In a case where there is no space for arranging all the product items as the search results in the display area 212, it is possible to expand a range in which the product items are arranged by scrolling a display range of the display area 212 via a scroll bar 213. By accepting selection operation from such product items displayed in the display area 212, checkout machine registration of a product without a label may be accepted.

In a case where manual input of a product without a label is accepted via the selection screen 200 for a product without a code or the search screen 210 for a product without a code, there is an aspect that the user 2 does not necessarily perform the manual input in the self-checkout machine 50 while grasping the product.

From such an aspect, the second detection unit 117 starts the following processing in a case where a new product code is acquired via manual input in the self-checkout machine 50. As merely an example, the second detection unit 117 searches for a frame in which a grasp class is detected in the most recent HOID from a time when a product code is manually input among frames stored in the video data DB 106. Then, the second detection unit 117 generates a hand-held product image of a product without a label based on an output result of the HOID corresponding to the frame for which the search is hit.

Figure 15:
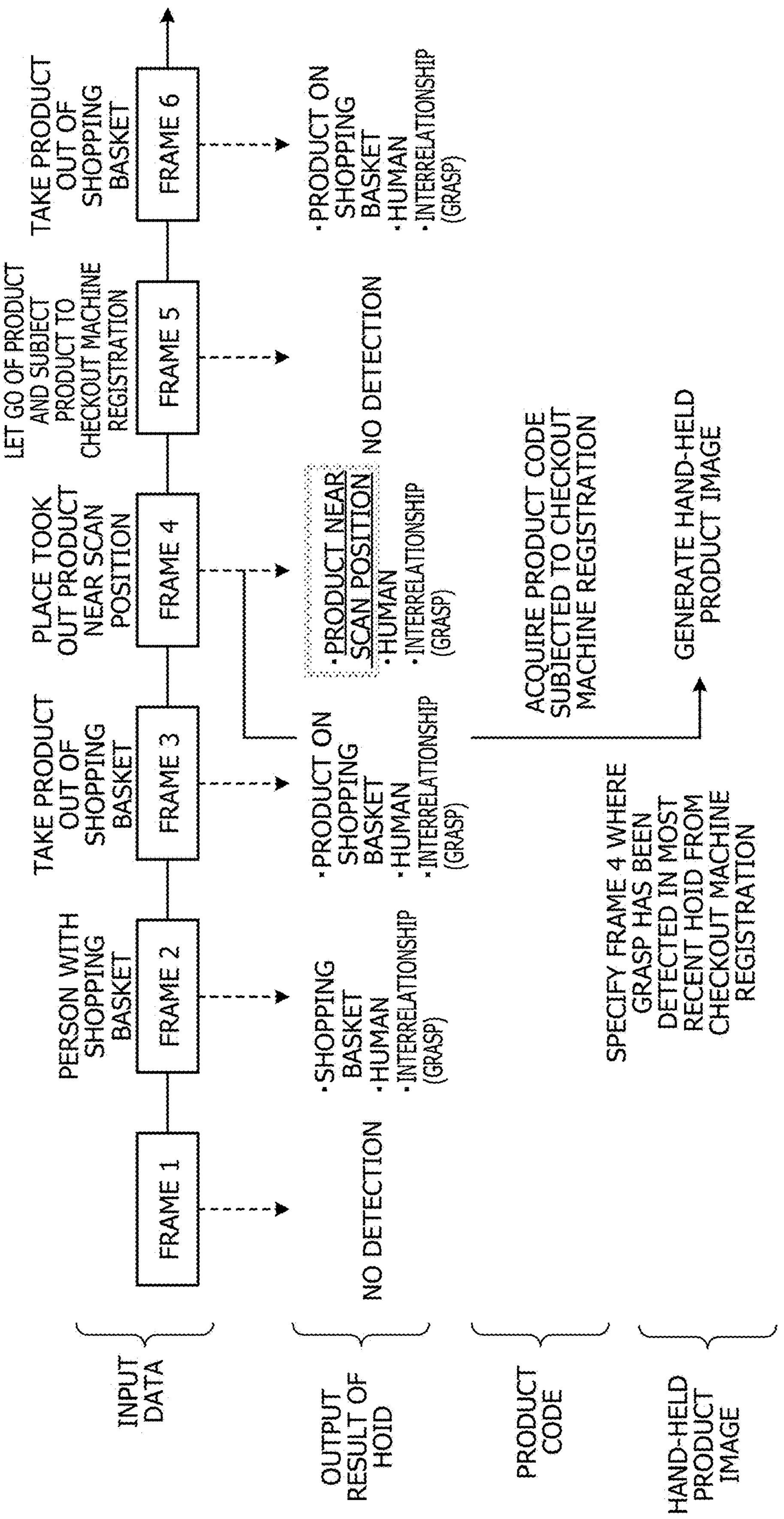
FIG. 15 is a diagram (3) for describing the generation of the hand-held product image.

FIG. 15 is a diagram (3) for describing the generation of the hand-held product image. FIG. 15 illustrates pieces of image data that are input data to the HOID model and output results of the HOID in time series of frame numbers "1" to "6" acquired from the camera 30. For example, in the example illustrated in FIG. 15, based on a time corresponding to the frame number "5" to which a product code subjected to checkout machine registration in the self-checkout machine 50 is manually input, a frame that is the most recent from the time, has a degree of overlap between an object Bbox and a scan position a threshold or more, and has an interaction of a grasp class is searched for. As a result, a hand-held product image is generated by using the output result of the HOID of the frame number "4" that hits the search. With this configuration, it is possible to specify the image in which the user 2 grasps the product without a label.

Figure 16:
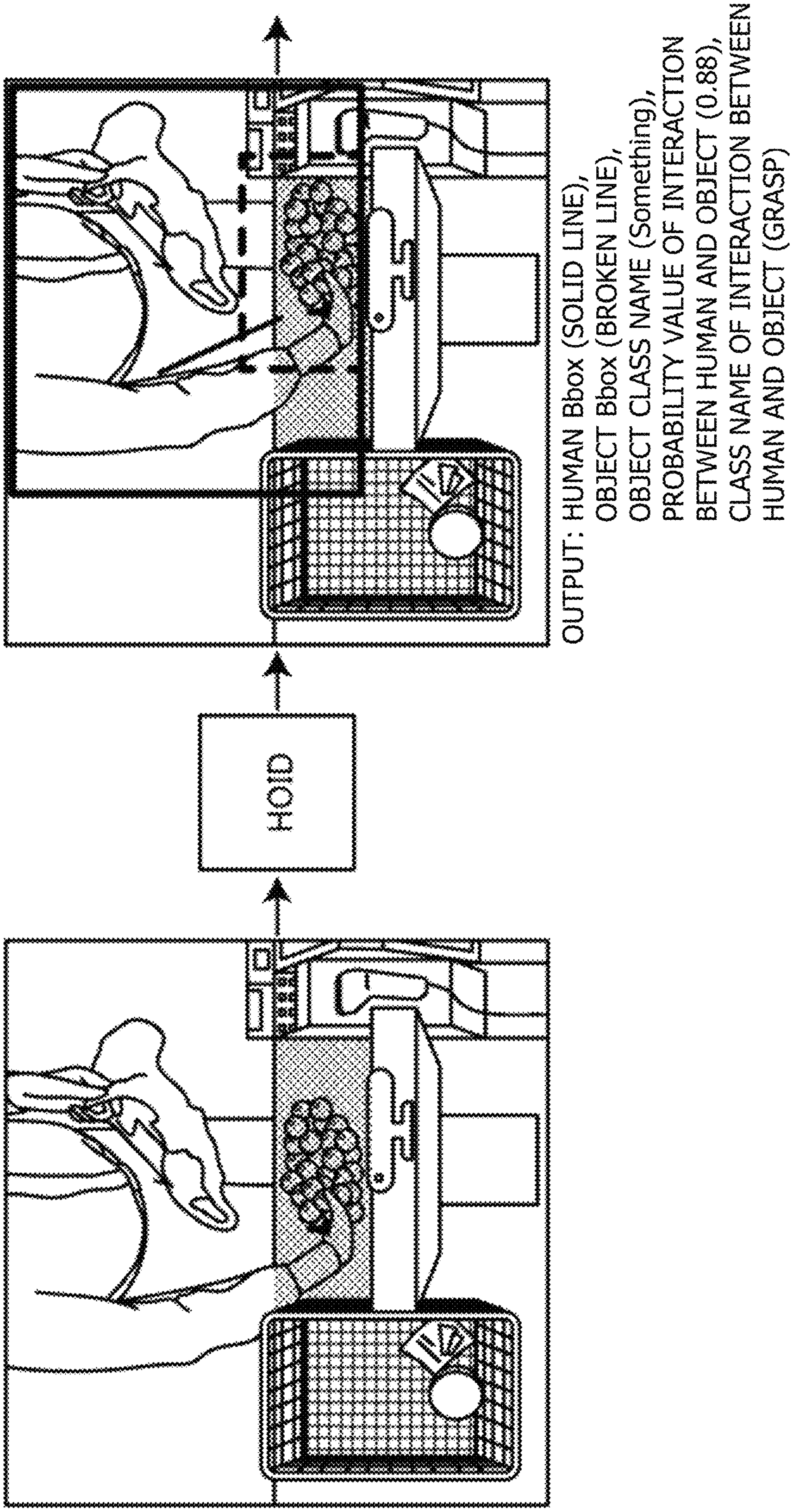
FIG. 16 is a diagram (4) for describing the generation of the hand-held product image.

FIG. 16 is a diagram (4) for describing the generation of the hand-held product image. FIG. 16 illustrates the image data corresponding to the frame number "4" illustrated in FIG. 15 and the output result of the HOID in a case where the image data is input to the HOID model. Moreover, in FIG. 16, a human Bbox is indicated by a solid line frame, and an object Bbox is indicated by a broken line frame. As illustrated in FIG. 16, the output result of the HOID includes the human Bbox, the object Bbox, a probability value and a class name of an interaction between the human and the object, and the like. With reference to the object Bbox among these, the second detection unit 117 cuts out the object Bbox, in other words, a partial image corresponding to the broken line frame in FIG. 15 from the image data of the frame number "4", thereby generating the hand-held product image of a product without a label.

After the hand-held product image is generated in this manner, the second detection unit 117 inputs the hand-held product image to the zero-shot image classifier which is an example of the second machine learning model 104B. Moreover, the second detection unit 117 inputs, to the zero-shot image classifier, a list in which texts corresponding to attributes of products belonging to the same hierarchy are listed in order from a higher hierarchy according to a hierarchical structure stored in the hierarchical structure DB 105. With this configuration, candidates of a product item are narrowed down as the hierarchy of the texts input to the zero-shot image classifier becomes deeper. Then, the second detection unit 117 determines whether or not a product item subjected to checkout machine registration via manual input matches a product item specified by the zero-shot image classifier or a product item group included in a higher attribute thereof. At this time, in a case where both the product items do not match, it may be detected that a banana trick is performed.

(1) Product Item Specification Case 1

Figure 17:
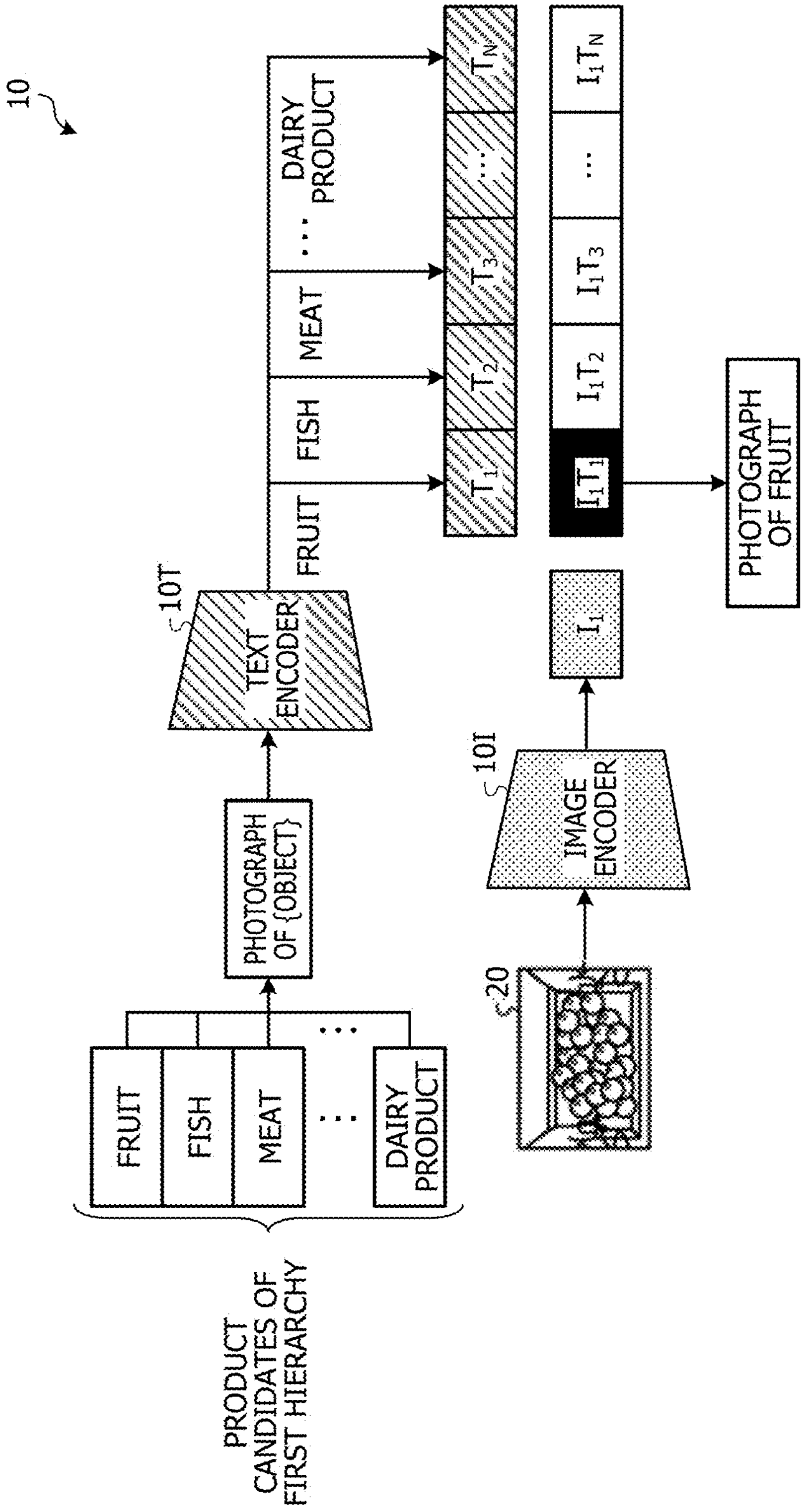
FIG. 17 is a schematic diagram (1) illustrating a case 1 where a product item is specified.
Figure 18:
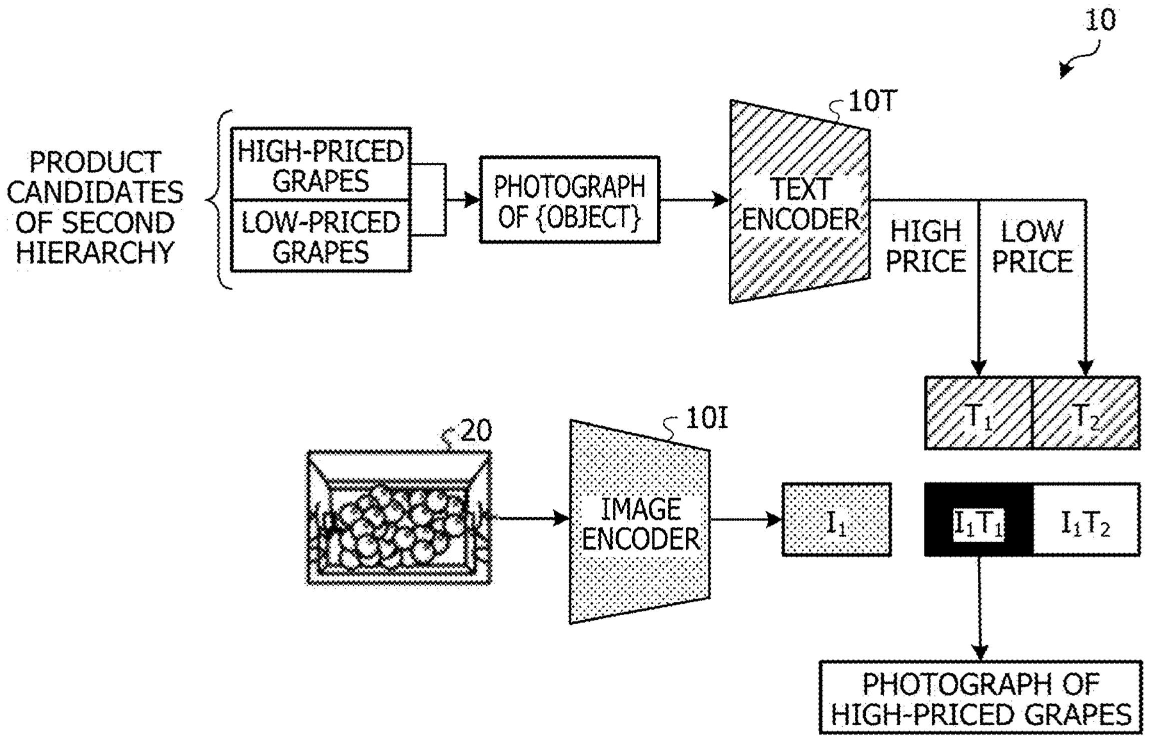
FIG. 18 is a schematic diagram (2) illustrating the case 1 where the product item is specified.
Figure 19:
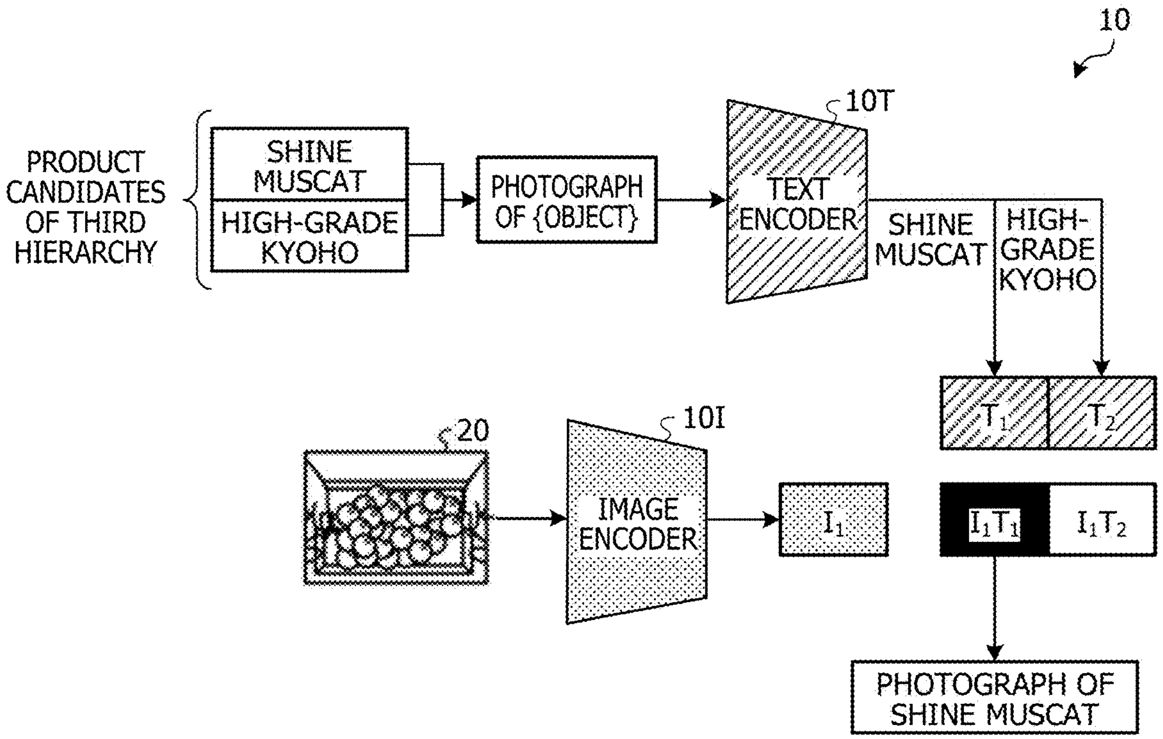
FIG. 19 is a schematic diagram (3) illustrating the case 1 where the product item is specified.

Next, specification of a product item using the zero-shot image classifier will be described with an exemplified case. FIGS. 17 to 19 are schematic diagrams (1) to (3) illustrating a case 1 where a product item is specified. FIGS. 17 to 19 illustrate an example in which a partial image of a Bbox corresponding to the product item "shine muscat" grasped by the user 2 is generated as merely an example of a hand-held product image 20.

As illustrated in FIG. 17, the hand-held product image 20 is input to the image encoder 10I of the CLIP model 10. As a result, the image encoder 10I outputs an embedding vector $I_1$ of the hand-held product image 20.

On the other hand, in the text encoder 10T of the CLIP model 10, texts "fruit", "fish", "meat", and "dairy product" corresponding to the elements of the first hierarchy are input as a list of class captions according to the hierarchical structure illustrated in FIG. 10.

At this time, the texts "fruit", "fish", "meat", and "dairy product" may be input to the text encoder 10T as they are, but "prompt engineering" may be performed from an aspect of changing a format of the class captions at the time of inference to a format of the class captions at the time of training. For example, it is also possible to insert a text corresponding to an attribute of a product, for example, "fruit", into a portion of {object} of "photograph of {object}", and input "photograph of fruit".

As a result, the text encoder 10T outputs an embedding vector $T_1$ of the text "fruit", an embedding vector $T_2$ of the text "fish", an embedding vector $T_3$ of the text "meat", . . . , and an embedding vector $T_N$ of the text "dairy product".

Then, similarity is calculated between the embedding vector $I_1$ of the hand-held product image 20 and the embedding vector $T_1$ of the text "fruit", the embedding vector $T_2$ of the text "fish", the embedding vector $T_3$ of the text "meat", and the embedding vector $T_N$ of the text "dairy product".

As indicated by black and white inversion display in FIG. 17, in the present example, the similarity between the embedding vector $I_1$ of the hand-held product image 20 and the embedding vector $T_1$ of the text "fruit" is the maximum. Therefore, the CLIP model 10 outputs "fruit" as a prediction result of a class of the hand-held product image 20.

Since the prediction result "fruit" of the first hierarchy obtained in this manner is not the terminal node in the hierarchical structure illustrated in FIG. 10, inference of the CLIP model 10 is continued. In other words, as illustrated in FIG. 18, texts "high-priced grapes" and "low-priced grapes" corresponding to the elements of the second hierarchy belonging to the lower order of the prediction result "fruit" of the first hierarchy are input as a list of class captions according to the hierarchical structure illustrated in FIG. 10. Note that, at the time of inputting the texts, it goes without saying that "prompt engineering" may be performed similarly to the example illustrated in FIG. 17.

As a result, the text encoder 10T outputs an embedding vector $T_1$ of the text "high-priced grapes" and an embedding vector $T_2$ of the text "low-priced grapes". Then, similarity is calculated between the embedding vector $I_1$ of the hand-held product image 20 and the embedding vector $T_1$ of the text "high-priced grapes" and the embedding vector $T_2$ of the text "low-priced grapes".

As indicated by black and white inversion display in FIG. 18, in the present example, the similarity between the embedding vector $I_1$ of the hand-held product image 20 and the embedding vector $T_1$ of the text "high-priced grapes" is the maximum. Therefore, the CLIP model 10 outputs "high-priced grapes" as a prediction result of the class of the hand-held product image 20.

Since the prediction result "high-priced grapes" of the second hierarchy obtained in this manner is not the terminal node in the hierarchical structure illustrated in FIG. 10, inference of the CLIP model 10 is continued. In other words, as illustrated in FIG. 19, texts "shine muscat" and "high-grade kyoho" corresponding to the elements of the third hierarchy belonging to the lower order of the prediction result "high-priced grapes" of the second hierarchy are input as a list of class captions according to the hierarchical structure illustrated in FIG. 10.

As a result, the text encoder 10T outputs an embedding vector $T_1$ of the text "shine muscat" and an embedding vector $T_2$ of the text "high-grade kyoho". Then, similarity is calculated between the embedding vector $I_1$ of the hand-held product image 20 and the embedding vector $T_1$ of the text "shine muscat" and the embedding vector $T_2$ of the text "high-grade kyoho".

As indicated by black and white inversion display in FIG. 19, in the present example, the similarity between the embedding vector $I_1$ of the hand-held product image 20 and the embedding vector $T_1$ of the text "shine muscat" is the maximum. Therefore, the CLIP model 10 outputs "shine muscat" as a prediction result of the class of the hand-held product image 20.

As described above, in the case 1, the list of the attributes of the products corresponding to the elements of the first hierarchy is input to the text encoder 10T as the class captions, whereby the product candidates are narrowed down to "fruit". Then, the list of the attributes of the products belonging to the lower order of the element "fruit" of the prediction result of the first hierarchy among the elements of the second hierarchy is input to the text encoder 10T as the class captions, whereby the product candidates are narrowed down to "high-priced grapes". Moreover, the list of the attributes of the products belonging to the lower order of the element "high-priced grapes" of the prediction result of the second hierarchy among the elements of the third hierarchy is input to the text encoder 10T as the class captions, whereby the product candidates are narrowed down to "shine muscat". By such narrowing down, it is possible to specify that the product item included in the hand-held product image 20 is "shine muscat" while reducing the processing cost for implementing a task as compared with a case where the texts corresponding to all the product items of the store are input to the text encoder 10T.

As merely an example, in a case where the product item subjected to checkout machine registration via manual input is "grapes A with defects", the product item does not match the product item "shine muscat" specified by the zero-shot image classifier. In this case, it may be detected that a banana trick is being performed.

(2) Product Item Specification Case 2

Figure 20:
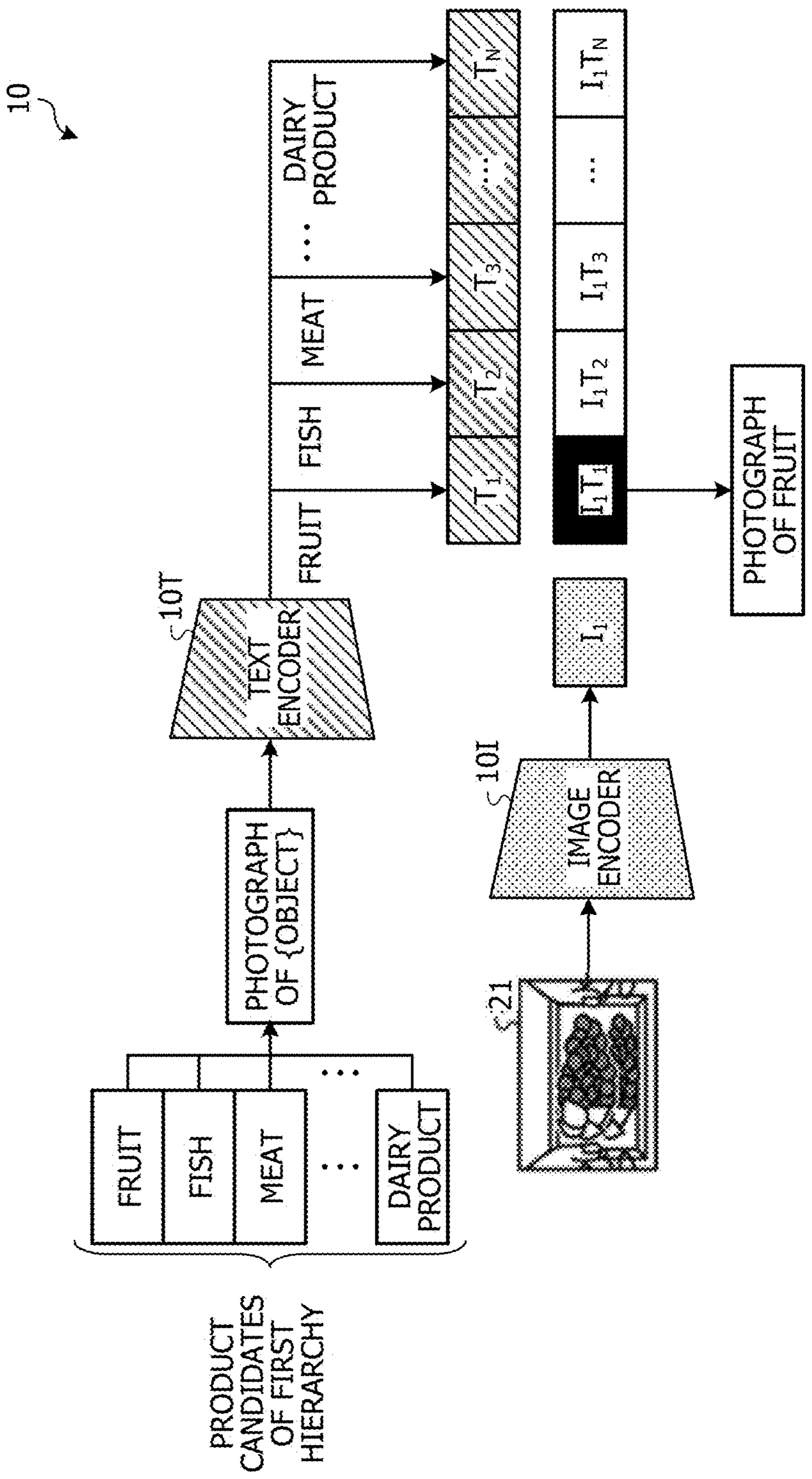
FIG. 20 is a schematic diagram (1) illustrating a case 2 where a product item is specified.
Figure 21:
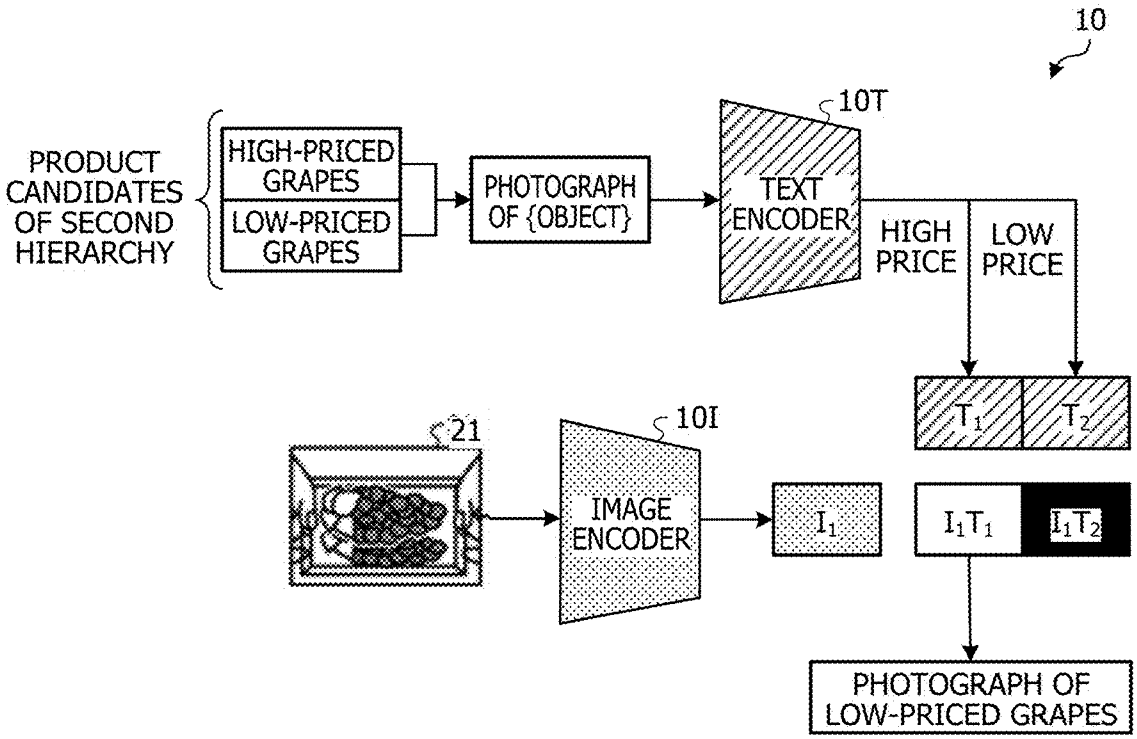
FIG. 21 is a schematic diagram (2) illustrating the case 2 where the product item is specified.

FIGS. 20 and 21 are schematic diagrams (1) and (2) illustrating a case 2 where a product item is specified. FIGS. 20 and 21 illustrate an example in which a partial image of a Bbox corresponding to the product item "grapes A with defects" grasped by the user 2 is generated as another example of a hand-held product image 21.

As illustrated in FIG. 20, the hand-held product image 21 is input to the image encoder 10I of the CLIP model 10. As a result, the image encoder 10I outputs an embedding vector $I_1$ of the hand-held product image 21.

On the other hand, in the text encoder 10T of the CLIP model 10, texts "fruit", "fish", "meat", and "dairy product" corresponding to the elements of the first hierarchy are input as a list of class captions according to the hierarchical structure illustrated in FIG. 10. Note that, at the time of inputting the texts, it goes without saying that "prompt engineering" may be performed similarly to the example illustrated in FIG. 17.

As a result, the text encoder 10T outputs an embedding vector $T_1$ of the text "fruit", an embedding vector $T_2$ of the text "fish", an embedding vector $T_3$ of the text "meat", . . . , and an embedding vector $T_N$ of the text "dairy product".

Then, similarity is calculated between the embedding vector $I_1$ of the hand-held product image 21 and the embedding vector $T_1$ of the text "fruit", the embedding vector $T_2$ of the text "fish", the embedding vector $T_3$ of the text "meat", and the embedding vector $T_N$ of the text "dairy product".

As indicated by black and white inversion display in FIG. 20, in the present example, the similarity between the embedding vector $I_1$ of the hand-held product image 21 and the embedding vector $T_1$ of the text "fruit" is the maximum. Therefore, the CLIP model 10 outputs "fruit" as a prediction result of a class of the hand-held product image 21.

Since the prediction result "fruit" of the first hierarchy obtained in this manner is not the terminal node in the hierarchical structure illustrated in FIG. 10, inference of the CLIP model 10 is continued. In other words, as illustrated in FIG. 21, texts "high-priced grapes" and "low-priced grapes" corresponding to the elements of the second hierarchy belonging to the lower order of the prediction result "fruit" of the first hierarchy are input as a list of class captions according to the hierarchical structure illustrated in FIG. 10.

As a result, the text encoder 10T outputs an embedding vector $T_1$ of the text "high-priced grapes" and an embedding vector $T_2$ of the text "low-priced grapes". Then, similarity is calculated between the embedding vector $I_1$ of the hand-held product image 21 and the embedding vector $T_1$ of the text "high-priced grapes" and the embedding vector $T_2$ of the text "low-priced grapes".

As indicated by black and white inversion display in FIG. 21, in the present example, the similarity between the embedding vector $I_1$ of the hand-held product image 21 and the embedding vector $T_2$ of the text "low-priced grapes" is the maximum. Therefore, the CLIP model 10 outputs "low-priced grapes" as a prediction result of the class of the hand-held product image 21.

Since the prediction result "low-priced grapes" of the second hierarchy obtained in this manner is the terminal node in the hierarchical structure illustrated in FIG. 10, inference of the CLIP model 10 is ended. As a result, the prediction result of the class of the hand-held product image 21 is confirmed as "low-priced grapes".

As described above, in the case 2, as compared with the case 1 described above, the process of inputting the three elements "inexpensive grapes A", "inexpensive grapes B", and "grapes A with defects" of the third hierarchy in which the variance of the prices of the product item is the threshold th2 or less as the class captions may be omitted. Therefore, according to the case 2, it is possible to implement further reduction in the processing cost for implementing a task.

For example, in a case where the product item subjected to checkout machine registration via manual input is "grapes A with defects", the product item matches the product item "grapes A with defects" included in the attribute "low-priced grapes" of the product specified by the zero-shot image classifier. In this case, it may be determined that a banana trick is not performed.

2-3-6. Alert Generation Unit

Returning to the description of FIG. 2, the alert generation unit 118 is a processing unit that generates an alert related to a fraud detected by the fraud detection unit 115.

As one aspect, in a case where a fraud is detected by the fraud detection unit 115, the alert generation unit 118 may generate an alert for the user 2. As such an alert for the user 2, a product item subjected to checkout machine registration and a product item specified by the zero-shot image classifier may be included.

Figure 22:
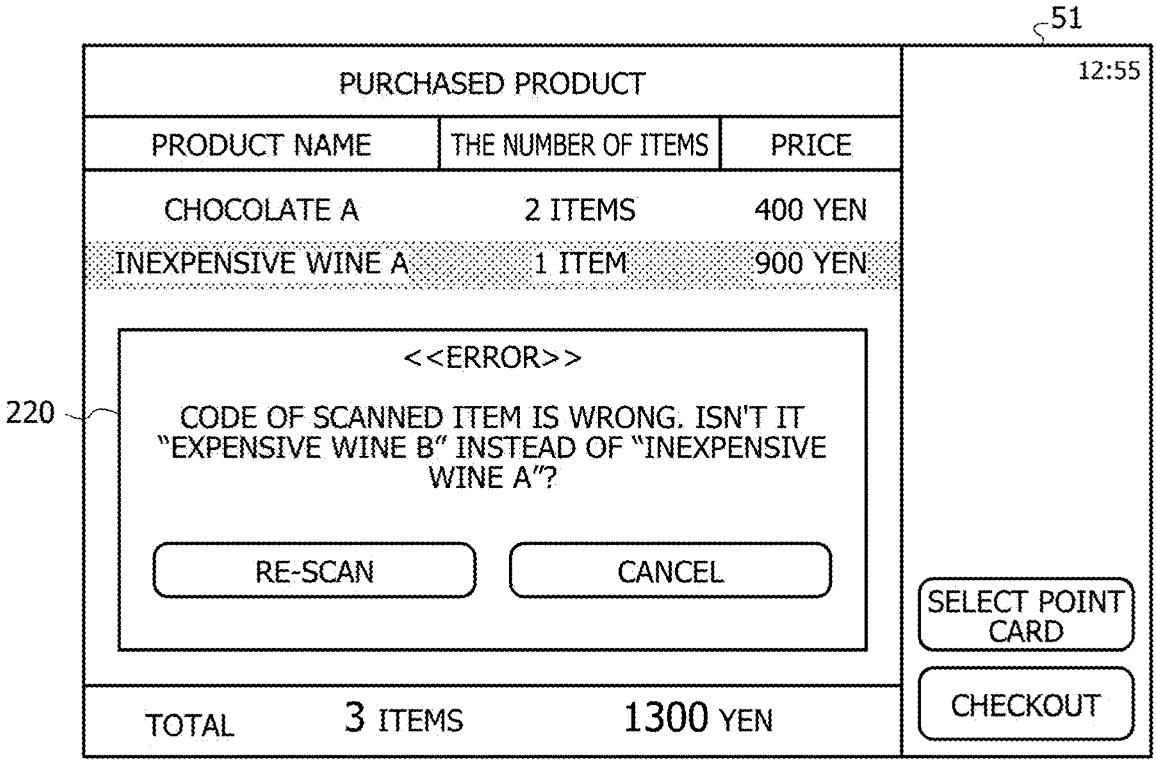
FIG. 22 is a diagram (1) illustrating a display example of an alert.

FIG. 22 is a diagram (1) illustrating a display example of the alert. FIG. 22 illustrates an alert displayed in the self-checkout machine 50 when the first detection unit 116 detects a label switch. As illustrated in FIG. 22, an alert window 220 is displayed in a touch panel 51 of the self-checkout machine 50. In the alert window 220, a product item "inexpensive wine A" subjected to checkout machine registration through scanning and a product item "expensive wine B" specified by image analysis of the zero-shot image classifier are displayed in a comparable state. Additionally, the alert window 220 may include a notification prompting re-scanning. According to such display of the alert window 220, it is possible to warn a user of detection of a label switch of replacing a label of "expensive wine B" with a label of "inexpensive wine A" and performing scanning. Therefore, it is possible to prompt cancellation of checkout by the label switch, and as a result, it is possible to suppress damage to the store by the label switch.

Figure 23:
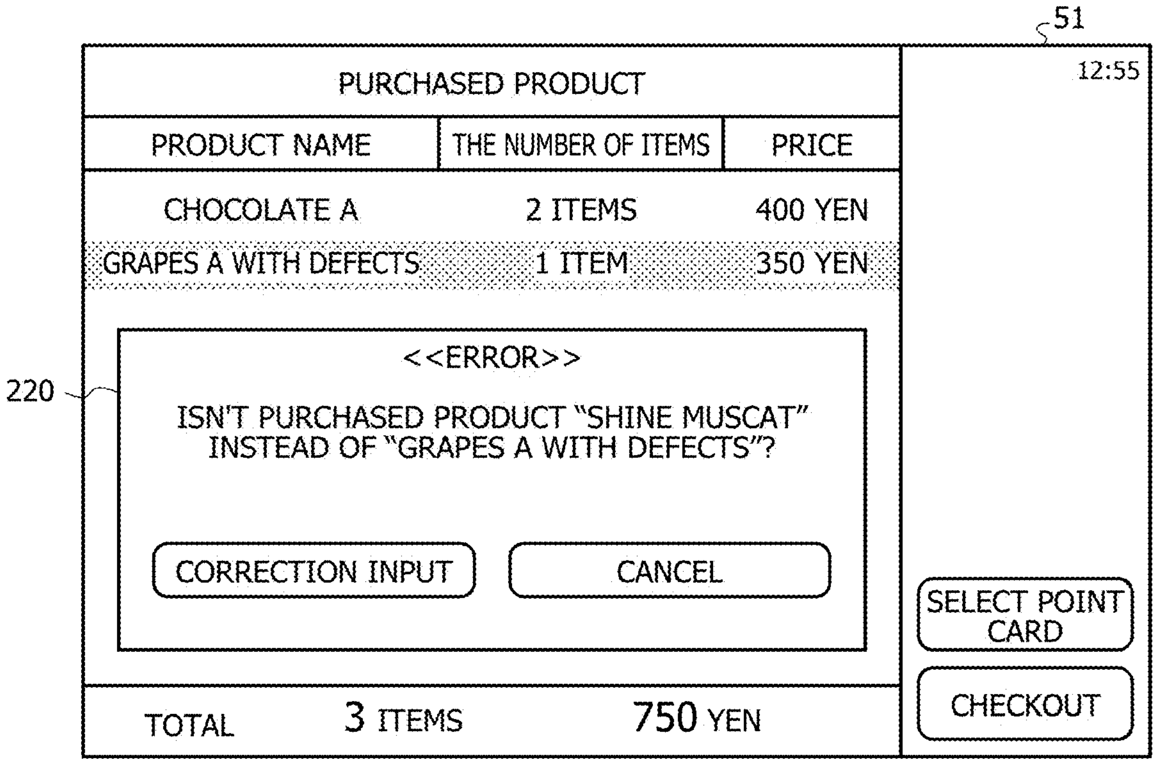
FIG. 23 is a diagram (2) illustrating a display example of the alert.

FIG. 23 is a diagram (2) illustrating a display example of the alert. FIG. 23 illustrates an alert displayed in the self-checkout machine 50 when the second detection unit 117 detects a banana trick. As illustrated in FIG. 23, an alert window 230 is displayed in the touch panel 51 of the self-checkout machine 50. In the alert window 230, a product item "grapes A with defects" subjected to checkout machine registration via manual input and a product item "shine muscat" specified by image analysis of the zero-shot image classifier are displayed in a comparable state. Additionally, the alert window 230 may include a notification prompting correction input. According to such display of the alert window 230, it is possible to warn a user of detection of a banana trick of subjecting "grapes A with defects" to checkout machine registration by manual input instead of subjecting "shine muscat" to checkout machine registration by manual input. Therefore, it is possible to prompt cancellation of checkout by the banana trick, and as a result, it is possible to suppress damage to the store by the banana trick.

As another aspect, in a case where a fraud is detected by the fraud detection unit 115, the alert generation unit 118 may generate an alert for a related person of the store, for example, an administrator. As such an alert for the administrator of the store, a type of the fraud, identification information regarding the self-checkout machine 50 in which the fraud is detected, a predicted damage amount due to the fraudulent act, and the like may be included.

Figure 24:
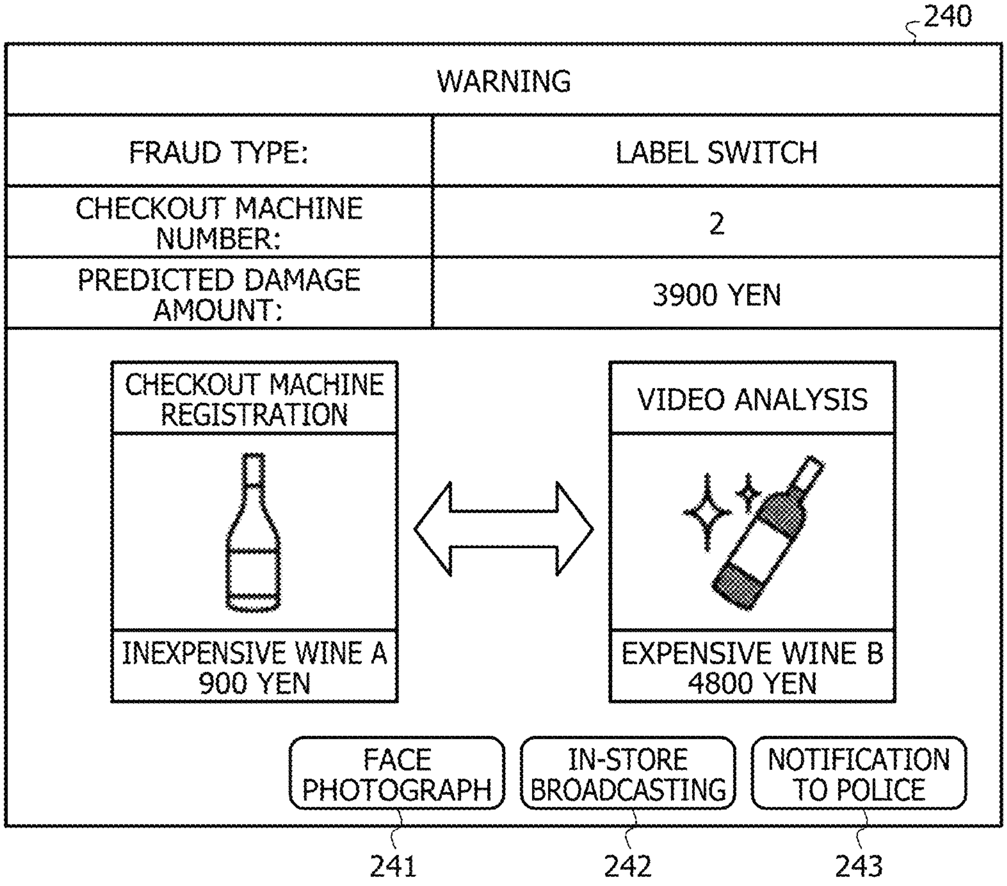
FIG. 24 is a diagram (3) illustrating a display example of the alert.

FIG. 24 is a diagram (3) illustrating a display example of the alert. FIG. 24 illustrates an alert displayed in a display unit of the administrator terminal 60 when the first detection unit 116 detects a label switch. As illustrated in FIG. 24, an alert window 240 is displayed in the display unit of the administrator terminal 60. In the alert window 240, a product item "inexpensive wine A" and a price "900 yen" subjected to checkout machine registration through scanning and a product item "expensive wine B" and a price "4800 yen" specified by image analysis are displayed in a comparable state. Moreover, in the alert window 240, a fraud type "label switch", a checkout machine number "2" at which the label switch occurs, and a predicted damage amount "3900 yen (=4800 yen−900 yen)" that occurs in checkout with the label switch are displayed. Additionally, in the alert window 240, graphical user interface (GUI) components 241 to 243 and the like that accept a request such as display of a face photograph in which a face or the like of the user 2 who uses the self-checkout machine 50 of the checkout machine number "2" is captured, in-store broadcasting, or notification to the police or the like are displayed. According to such display of the alert window 240, it is possible to implement notification of occurrence of damage of the label switch, grasping of a degree of the damage, and further, presentation of various countermeasures against the damage. Therefore, it is possible to prompt the user 2 to respond to the label switch, and as a result, it is possible to suppress the damage to the store by the label switch.

Figure 25:
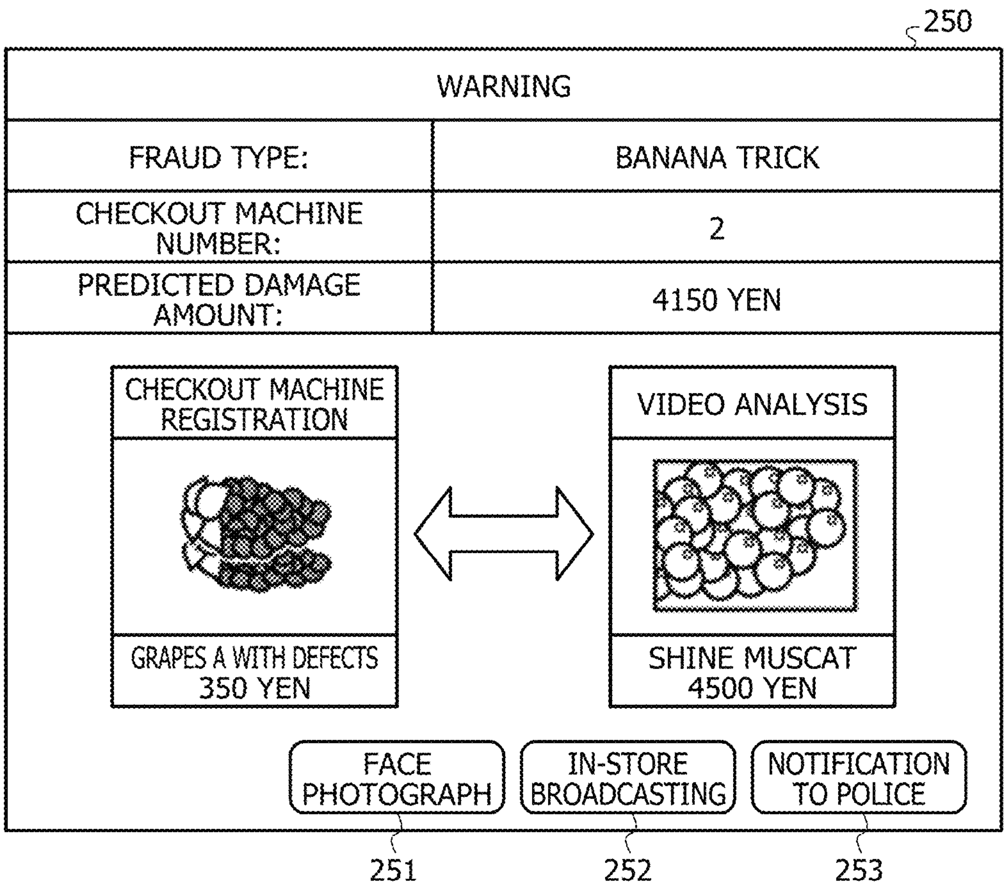
FIG. 25 is a diagram (4) illustrating a display example of the alert.

FIG. 25 is a diagram (4) illustrating a display example of the alert. FIG. 25 illustrates an alert displayed in the display unit of the administrator terminal 60 when the second detection unit 117 detects a banana trick. As illustrated in FIG. 25, an alert window 250 is displayed in the display unit of the administrator terminal 60. In the alert window 250, a product item "grapes A with defects" and a price "350 yen" subjected to checkout machine registration via manual input and a product item "shine muscat" and a price "4500 yen" specified by image analysis are displayed in a comparable state. Moreover, in the alert window 250, a fraud type "banana trick", a checkout machine number "2" at which the banana trick occurs, and a predicted damage amount "4150 yen (=4500 yen−350 yen)" that occurs in checkout with the banana trick are displayed. Additionally, in the alert window 250, GUI components 251 to 253 and the like that accept a request such as display of a face photograph in which a face or the like of the user 2 who uses the self-checkout machine 50 of the checkout machine number "2" is captured, in-store broadcasting, or notification to the police or the like are displayed. According to such display of the alert window 250, it is possible to implement notification of occurrence of damage of the banana trick, grasping of a degree of the damage, and further, presentation of various countermeasures against the damage. Therefore, it is possible to prompt the user 2 to respond to the banana trick, and as a result, it is possible to suppress the damage to the store by the banana trick.

3. Flow of Processing

Next, a flow of processing of the information processing device 100 according to the present embodiment will be described. Here, (1) data generation processing, (2) video acquisition processing, (3) first detection processing, (4) second detection processing, and (5) specifying processing executed by the information processing device 100 will be described in this order.

(1) Data Generation Processing

Figure 26:
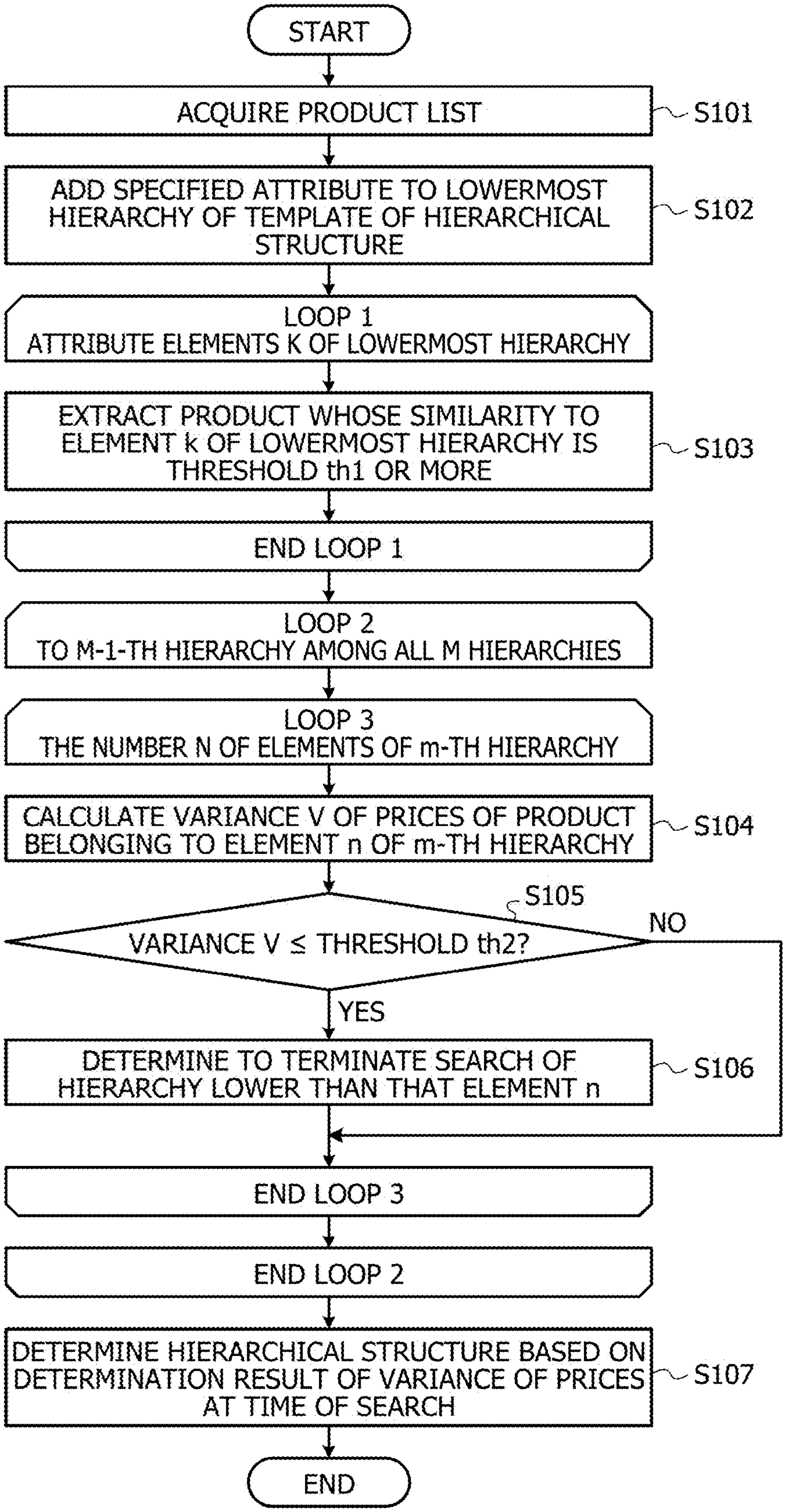
FIG. 26 is a flowchart illustrating a flow of data generation processing according to the first embodiment.

FIG. 26 is a flowchart illustrating a flow of the data generation processing according to the first embodiment. As merely an example, this processing may be started in a case where a request is accepted from the administrator terminal 60, or the like.

As illustrated in FIG. 26, the data generation unit 112 acquires a product list of a store such as a supermarket or a convenience store (Step S101). Subsequently, the data generation unit 112 adds an attribute specified by a system definition or a user definition, for example, an attribute related to "price", or the like, for each element of a lowermost hierarchy of a template of a hierarchical structure (Step S102).

Then, the data generation unit 112 executes loop processing 1 of repeating processing in the following Step S103 for the number of times corresponding to the number K of the elements of the lowermost hierarchy of the hierarchical structure to which the attribute is added to the template in Step S102. Note that, here, although an example in which the processing in Step S103 is repeated is exemplified, the processing in Step S103 may be executed in parallel.

In other words, the data generation unit 112 extracts a product item whose similarity to an element of the lowermost hierarchy of the hierarchical structure, in other words, an element k of the price attribute in the product list acquired in Step S101 is the threshold th1 or more (Step S103).

As a result of such loop processing 1, the product items belonging to the element k are clustered for each element k of the price attribute.

Thereafter, the data generation unit 112 performs loop processing 2 of repeating processing from the following Step S104 to the following Step S106 from a first hierarchy to an M−1-th hierarchy excluding an M-th hierarchy that is the lowermost hierarchy among all the M hierarchies of the hierarchical structure after the clustering in Step S103. Moreover, the data generation unit 112 executes loop processing 3 of repeating processing in the following Step S104 to the following Step S106 for the number of times corresponding to the number N of elements of an m-th hierarchy. Note that, here, although an example in which the processing from Step S104 to Step S106 is repeated is exemplified, the processing from Step S104 to Step S106 may be executed in parallel.

In other words, the data generation unit 112 calculates the variance V of prices of the product item belonging to the element n of the m-th hierarchy (Step S104). Then, the data generation unit 112 determines whether or not the variance V of the prices is the threshold th2 or less (Step S105).

At this time, in a case where the variance V of the prices is the threshold th2 or less (Step S105: Yes), the data generation unit 112 determines to terminate search of a hierarchy lower than the element n (Step S106). On the other hand, in a case where the variance V of the prices is not the threshold th2 or less (Step S105: No), the search of the hierarchy lower than the element n is continued, and thus the processing in Step S106 is skipped.

Through such loop processing 2 and loop processing 3, the search is repeated until termination of the search started for each element of the first hierarchy is determined or all the elements in the M−1-th hierarchy are searched.

Then, the data generation unit 112 determines a depth of each route of the hierarchical structure based on a determination result of the variance of the prices obtained at the time of the search from Step S104 to Step S106 (Step S107).

By determining the depth of each route of the hierarchical structure having the M hierarchies in this manner, the hierarchical structure is confirmed. The hierarchical structure generated in this manner is stored in the hierarchical structure DB 105 of the storage unit 102.

(2) Video Acquisition Processing

Figure 27:
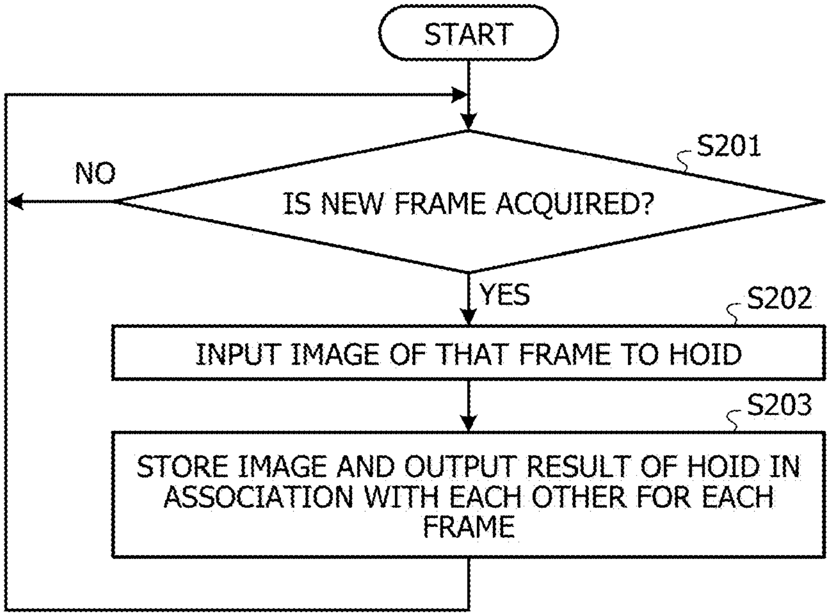
FIG. 27 is a flowchart illustrating a flow of video acquisition processing according to the first embodiment.

FIG. 27 is a flowchart illustrating a flow of the video acquisition processing according to the first embodiment. As illustrated in FIG. 27, in a case where image data of a new frame is acquired (Step S201: Yes), the video acquisition unit 113 inputs the image data to the first machine learning model 104A, for example, the HOID model, and acquires an output result of the HOID (Step S202).

Then, the video acquisition unit 113 stores, for each frame, the image data of the frame and the output result of the HOID of the frame in the video data DB 106 in association with each other (Step S203), and returns to the processing in Step S201.

(3) First Detection Processing

Figure 28:
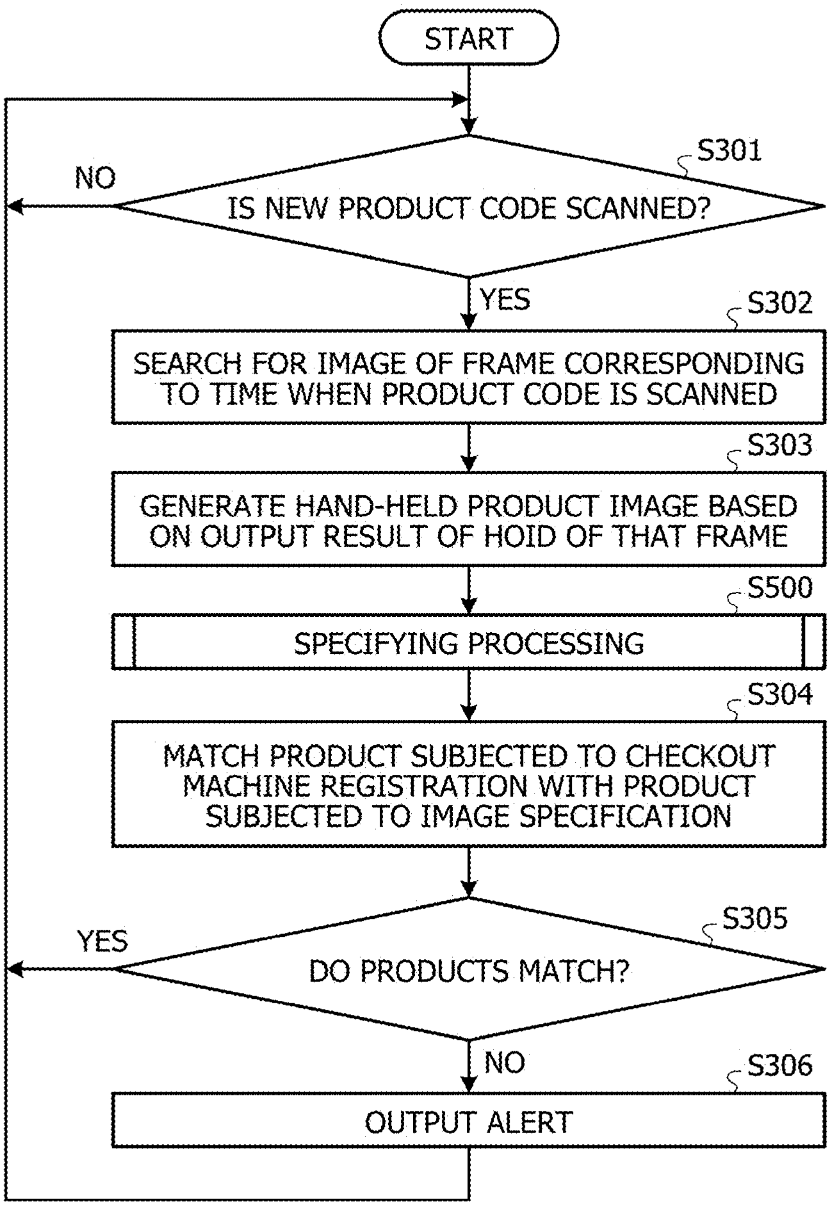
FIG. 28 is a flowchart illustrating a flow of first detection processing according to the first embodiment.

FIG. 28 is a flowchart illustrating a flow of the first detection processing according to the first embodiment. As illustrated in FIG. 28, in a case where a new product code is acquired through scanning in the self-checkout machine 50 (Step S301: Yes), the first detection unit 116 executes the following processing. In other words, the first detection unit 116 searches for a frame corresponding to a time when the product code is scanned among frames stored in the video data DB 106 (Step S302).

Then, the first detection unit 116 generates a hand-held product image in which the user 2 grasps the product based on an output result of the HOID corresponding to the frame for which the search executed in Step S302 is hit (Step S303).

Next, the first detection unit 116 inputs the hand-held product image to the zero-shot image classifier, and inputs a list of texts corresponding to attributes of products for each of the plurality of hierarchies to the zero-shot image classifier, thereby executing “specifying processing” of specifying a product item (Step S500).

Then, the first detection unit 116 determines whether or not the product item subjected to checkout machine registration through scanning matches the product item specified in Step S500 or a product item group included in a higher attribute thereof (Step S304).

At this time, in a case where both the product items do not match (Step S305: No), it may be detected that a label switch is performed. In this case, the alert generation unit 118 generates and outputs an alert of the label switch detected by the first detection unit 116 (Step S306), and returns to the processing in Step S301. Note that, in a case where both the product items match (Step S305: Yes), the processing in Step S306 is skipped, and the processing returns to the processing in Step S301.

(4) Second Detection Processing

Figure 29:
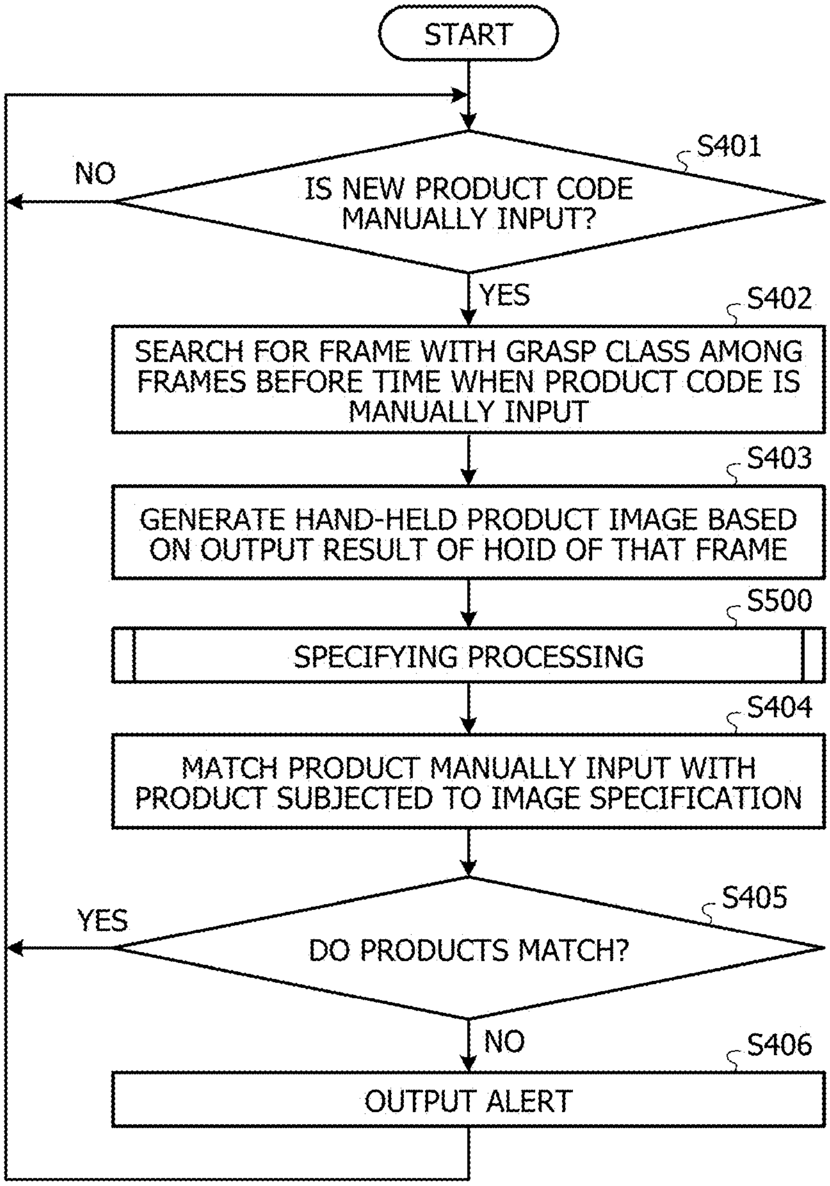
FIG. 29 is a flowchart illustrating a flow of second detection processing according to the first embodiment.

FIG. 29 is a flowchart illustrating a flow of the second detection processing according to the first embodiment. As illustrated in FIG. 28, in a case where a new product code is acquired via manual input in the self-checkout machine 50 (Step S401: Yes), the second detection unit 117 executes the following processing. In other words, the second detection unit 117 searches for a frame in which a grasp class is detected in the most recent HOID from a time when the product code is manually input among frames stored in the video data DB 106 (Step S402).

Then, the second detection unit 117 generates a hand-held product image of a product without a label based on an output result of the HOID corresponding to the frame for which the search executed in Step S402 is hit (Step S403).

Next, the second detection unit 117 inputs the hand-held product image to the zero-shot image classifier, and inputs a list of texts corresponding to attributes of products for each of the plurality of hierarchies to the zero-shot image classifier, thereby executing “specifying processing” of specifying a product item (Step S500).

Then, the second detection unit 117 determines whether or not the product item subjected to checkout machine registration via manual input matches the product item specified in Step S500 or a product item group included in a higher attribute thereof (Step S404).

At this time, in a case where both the product items do not match (Step S405: No), it may be detected that a banana trick is performed. In this case, the alert generation unit 118 generates and outputs an alert of the banana trick detected by the second detection unit 117 (Step S406), and returns to Step S401. Note that, in a case where both the product items match (Step S405: Yes), the processing in Step S406 is skipped, and the processing returns to the processing in Step S401.

(5) Specifying Processing

Figure 30:
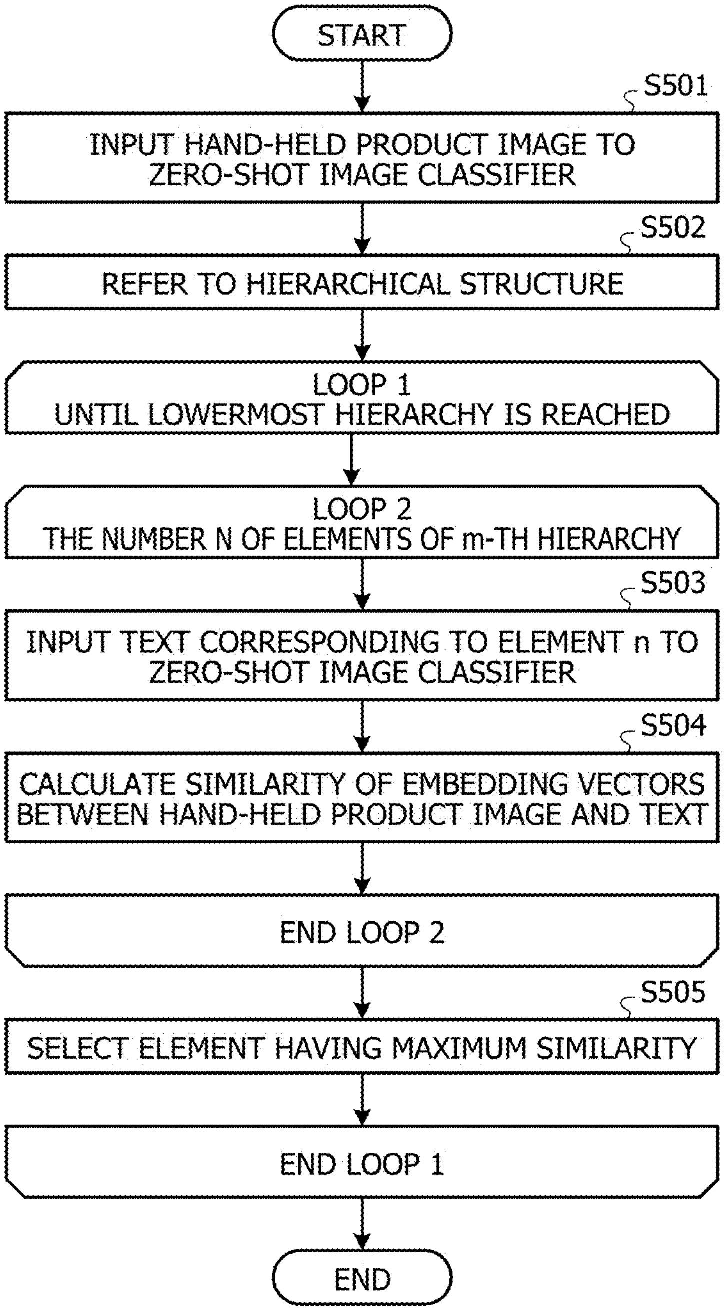
FIG. 30 is a flowchart illustrating a flow of specifying processing according to the first embodiment.

FIG. 30 is a flowchart illustrating a flow of the specifying processing according to the first embodiment. This processing corresponds to the processing in Step S500 illustrated in FIG. 28 or Step S500 illustrated in FIG. 29. As illustrated in FIG. 30, the fraud detection unit 115 inputs the hand-held product image generated in Step S303 or Step S403 to the image encoder 10I of the zero-shot image classifier (Step S501). Thereafter, the fraud detection unit 115 refers to a hierarchical structure stored in the hierarchical structure DB 105 (Step S502).

Then, the fraud detection unit 115 executes loop processing 1 of repeating processing from the following Step S503 to the following Step S505 from an uppermost hierarchy to a lowermost hierarchy of the hierarchical structure referred to in Step S502. Note that, here, although an example in which the processing from Step S503 to Step S505 is repeated is exemplified, the processing from Step S503 to Step S505 may be executed in parallel.

Moreover, the fraud detection unit 115 executes loop processing 2 of repeating processing in the following Step S503 and the following Step S504 for the number of times corresponding to the number N of elements of the m-th hierarchy. Note that, here, although an example in which the processing in Step S503 and Step S504 is repeated is exemplified, the processing in Step S503 and Step S504 may be executed in parallel.

In other words, the fraud detection unit 115 inputs a text corresponding to the element n of the m-th hierarchy to the text encoder 10T of the zero-shot image classifier (Step S503). Then, the fraud detection unit 115 calculates similarity between a vector output from the image encoder 10I to which the hand-held product image has been input in Step S501 and a vector output from the text encoder 10T to which the text has been input in Step S503 (Step S504).

As a result of such loop processing 2, a similarity matrix between the N elements of the m-th hierarchy and the hand-held product image is generated. Then, the fraud detection unit 115 selects an element having the maximum similarity in the similarity matrix between the N elements of the m-th hierarchy and the hand-held product image (Step S505).

Thereafter, the fraud detection unit 115 repeats the loop processing 1 for N elements belonging to the lower order of the element selected in Step S505 in one level lower hierarchy in which the loop counter m of the hierarchy is incremented by one.

As a result of such loop processing 1, the text output by the zero-shot image classifier at the time of inputting the text corresponding to the element of the lowermost hierarchy of the hierarchical structure is obtained as a specification result of a product item.

4. One Aspect of Effects

As described above, the information processing device 100 acquires a video including an object. Then, the information processing device 100 inputs the acquired video to a machine learning model (zero-shot image classifier) that refers to reference source data in which attributes of objects are associated with each of a plurality of hierarchies. With this configuration, an attribute of the object included in the video is specified from attributes of objects of a first hierarchy (melon/apple). Thereafter, the information processing device 100 specifies attributes of objects of a second hierarchy (expensive melon/inexpensive melon) under the first hierarchy by using the specified attribute of the object. Then, the information processing device 100 inputs the acquired video to the machine learning model (zero-shot image classifier) to specify an attribute of the object included in the video from the attributes of the objects in the second hierarchy.

Therefore, according to the information processing device 100, it is possible to implement detection of a fraudulent act in a self-checkout machine by using the machine learning model (zero-shot image classifier) that does not need preparation of a large amount of training data and does not need retuning in accordance with life cycles of products as well.

Furthermore, the information processing device 100 acquires a video of a person who scans a code of a product in the self-checkout machine 50. Then, the information processing device 100 inputs the acquired video to the machine learning model (zero-shot image classifier) to specify a product candidate corresponding to the product included in the video from a plurality of product candidates (texts) set in advance. Thereafter, the information processing device 100 acquires an item of the product identified by the self-checkout machine 50 by scanning the code of the product in the self-checkout machine 50. Then, the information processing device 100 generates an alert indicating an abnormality of the product registered in the self-checkout machine 50 based on an item of the specified product candidate and the item of the product acquired from the self-checkout machine 50.

Therefore, according to the information processing device 100, as one aspect, since an alert may be output at the time of detecting a label switch in the self-checkout machine 50, it is possible to suppress the label switch in the self-checkout machine 50.

Furthermore, the information processing device 100 acquires a video of a person who grasps a product to be registered in the self-checkout machine 50. Then, the information processing device 100 inputs the acquired video to the machine learning model (zero-shot image classifier) to specify a product candidate corresponding to the product included in the video from a plurality of product candidates (texts) set in advance. Thereafter, the information processing device 100 acquires an item of the product input by the person from the plurality of product candidates output by the self-checkout machine 50. Then, the information processing device 100 generates an alert indicating an abnormality of the product registered in the self-checkout machine 50 based on the acquired item of the product and the specified product candidate.

Therefore, according to the information processing device 100, as one aspect, since an alert may be output at the time of detecting a banana trick in the self-checkout machine 50, it is possible to suppress the banana trick in the self-checkout machine 50.

Furthermore, the information processing device 100 acquires product data, and generates reference source data in which attributes of products are associated with each of a plurality of hierarchies based on a variance relationship of the attributes of the products included in the acquired product data. Then, the information processing device 100 sets the generated reference source data as reference source data to be referred to by a zero-shot image classifier.

Therefore, according to the information processing device 100, it is possible to implement reduction in the number of pieces of data to be referred to by the zero-shot image classifier used for detection of a fraudulent act in the self-checkout machine 50.

Second Embodiment

5. Application Examples

Incidentally, while the embodiment related to the disclosed device has been described above, the embodiment may be carried out in a variety of different forms apart from the embodiment described above. Thus, in the following, application examples included in the embodiment will be described.

5-1. First Application Example

Figure 31:
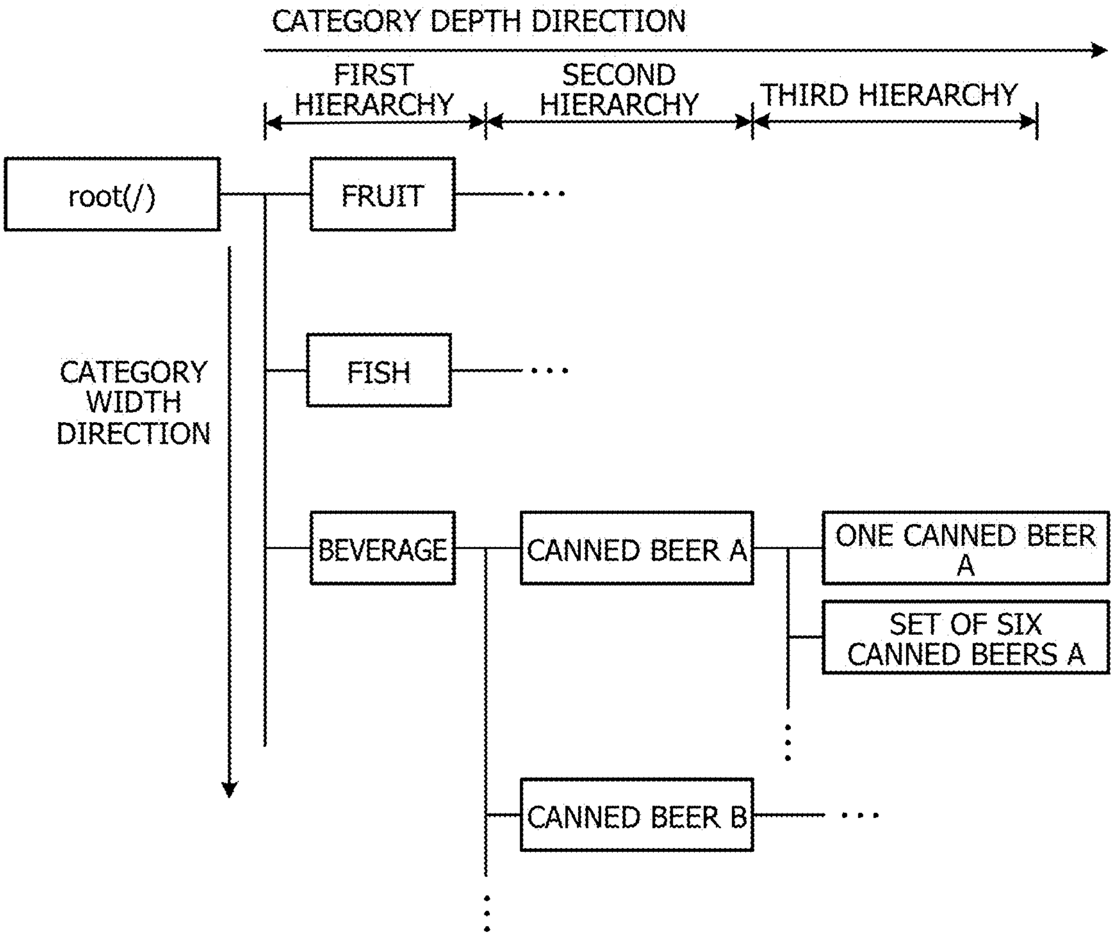
FIG. 31 is a diagram illustrating a first application example of the hierarchical structure.

First, a first application example of the hierarchical structure described in the first embodiment described above will be described. For example, the hierarchical structure may include labels for the number of products or units of the number of products in addition to the attributes of the products. FIG. 31 is a diagram illustrating the first application example of the hierarchical structure. In FIG. 31, for convenience of description, for the second and subsequent hierarchies, lower elements belonging to large classification of products “beverage” are excerpted, and for the third and subsequent hierarchies, lower elements belonging to small classification of products “canned beer A” are excerpted and indicated.

As illustrated in FIG. 31, the hierarchical structure according to the first application example includes the first hierarchy, the second hierarchy, and the third hierarchy. Among these, the first hierarchy includes elements such as “fruit”, “fish”, and “beverage” as examples of the large classification of products. Moreover, the second hierarchy includes elements such as “canned beer A” and “canned beer B" as other examples of the small classification of products. Moreover, the third hierarchy includes elements such as "one canned beer A" and "a set of six canned beers A" as examples of the labels including the number and units of products.

In a case where the labels for the number of products or units of the number of products are included in the hierarchical structure in this manner, it is possible to implement detection of a fraud of performing scanning in a number smaller than an actual purchase number by a label switch in addition to the label switch described above. Hereinafter, the fraud of performing scanning in the number smaller than the actual purchase number by the label switch may be referred to as "label switch (number)".

Figure 32:
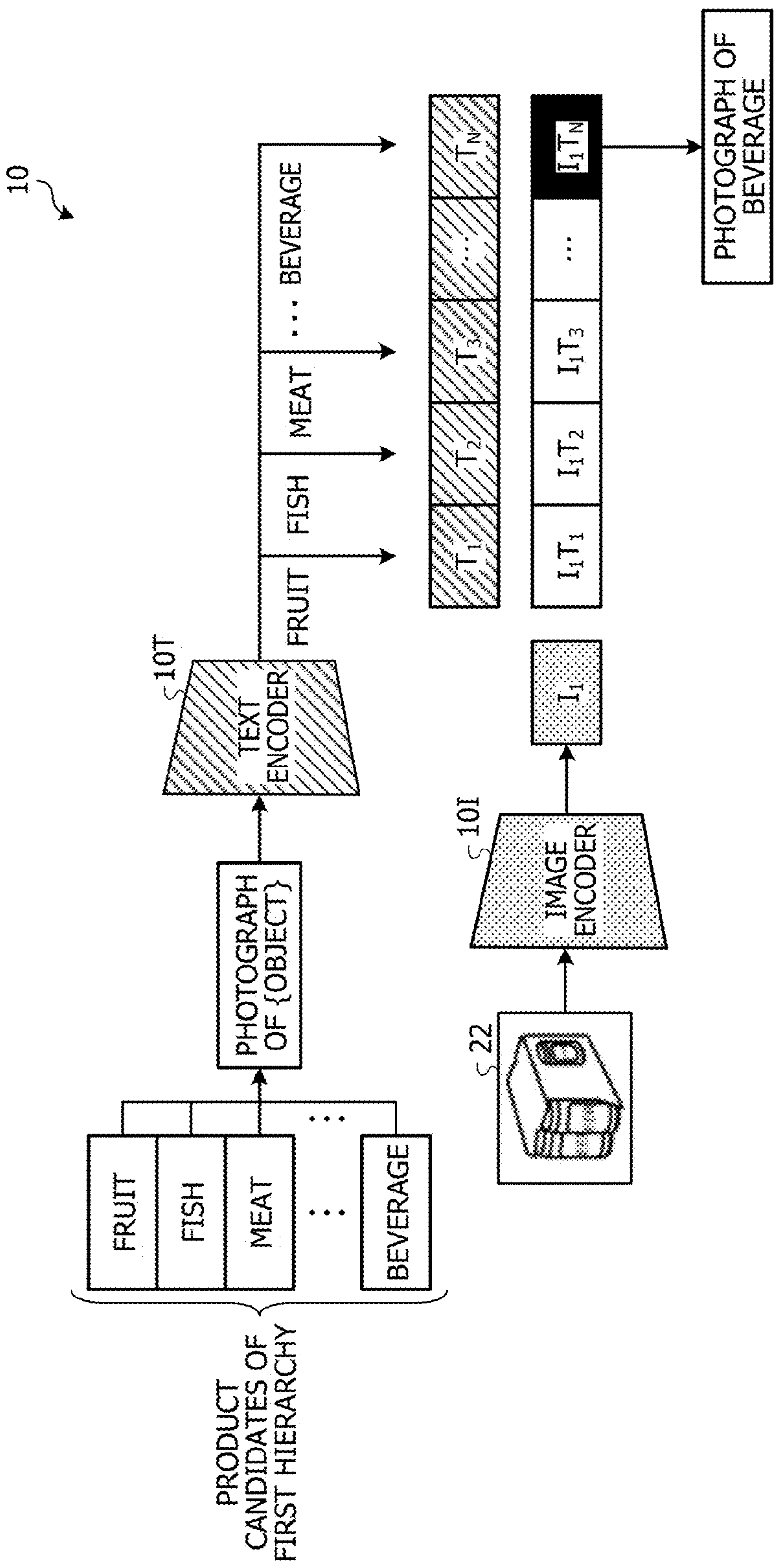
FIG. 32 is a schematic diagram (1) illustrating a case 3 where a product item is specified.
Figure 33:
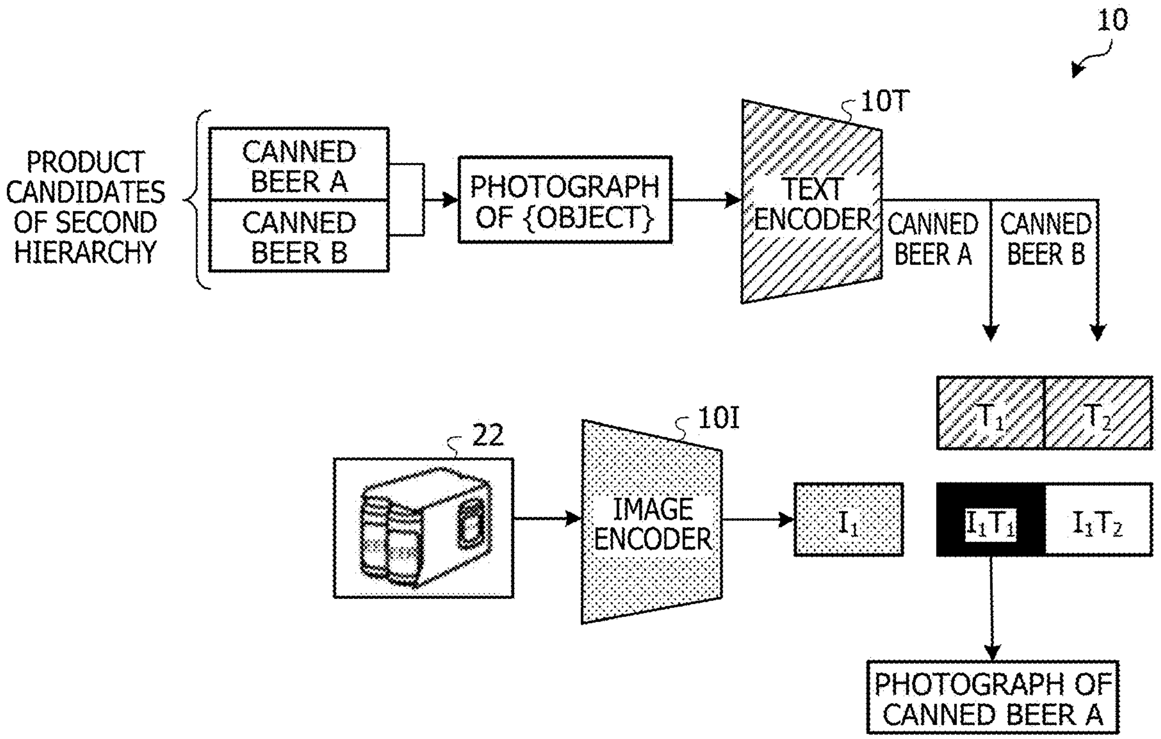
FIG. 33 is a schematic diagram (2) illustrating the case 3 where the product item is specified.
Figure 34:
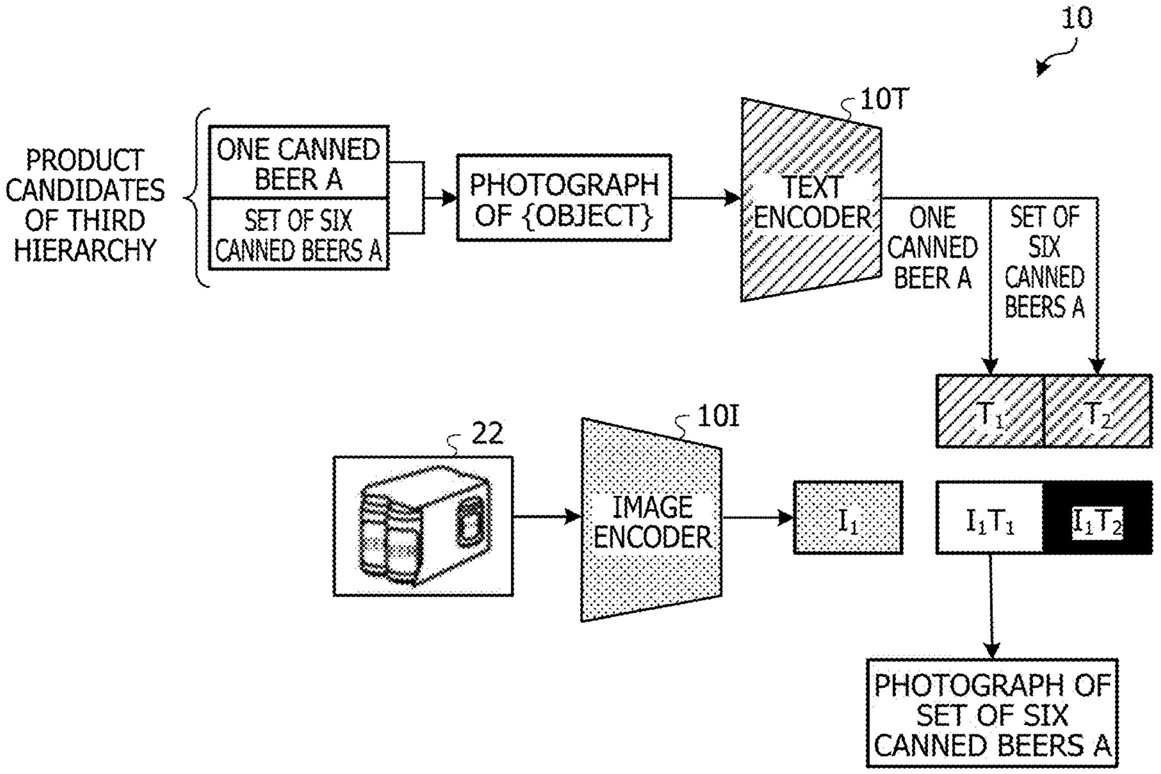
FIG. 34 is a schematic diagram (3) illustrating the case 3 where the product item is specified.

Specification of a product item executed at the time of detection of such a label switch (number) will be described with an exemplified case. FIGS. 32 to 34 are schematic diagrams (1) to (3) illustrating a case 3 where the product item is specified. FIGS. 32 to 34 illustrate an example in which a partial image of a Bbox corresponding to the product item "a set of six canned beers A" grasped by the user 2 is generated as merely an example of a hand-held product image 22.

As illustrated in FIG. 32, the hand-held product image 22 is input to the image encoder 10I of the CLIP model 10. As a result, the image encoder 10I outputs an embedding vector $I_1$ of the hand-held product image 22.

On the other hand, in the text encoder 10T of the CLIP model 10, texts "fruit", "fish", "meat", and "beverage" corresponding to the elements of the first hierarchy are input as a list of class captions according to the hierarchical structure illustrated in FIG. 31. Note that, at the time of inputting the texts, it goes without saying that "prompt engineering" may be performed similarly to the example illustrated in FIG. 17.

As a result, the text encoder 10T outputs an embedding vector $T_1$ of the text "fruit", an embedding vector $T_2$ of the text "fish", an embedding vector $T_3$ of the text "meat", . . . , and an embedding vector $T_N$ of the text "beverage".

Then, similarity is calculated between the embedding vector $I_1$ of the hand-held product image 22 and the embedding vector $T_1$ of the text "fruit", the embedding vector $T_2$ of the text "fish", the embedding vector $T_3$ of the text "meat", and the embedding vector $T_N$ of the text "beverage".

As indicated by black and white inversion display in FIG. 32, in the present example, the similarity between the embedding vector $I_1$ of the hand-held product image 22 and the embedding vector $T_N$ of the text "beverage" is the maximum. Therefore, the CLIP model 10 outputs "beverage" as a prediction result of a class of the hand-held product image 22.

Since the prediction result "beverage" of the first hierarchy obtained in this manner is not the terminal node in the hierarchical structure illustrated in FIG. 31, inference of the CLIP model 10 is continued. In other words, as illustrated in FIG. 33, texts "canned beer A" and "canned beer B" corresponding to the elements of the second hierarchy belonging to the lower order of the prediction result "beverage" of the first hierarchy are input as a list of class captions according to the hierarchical structure illustrated in FIG. 31. Note that, at the time of inputting the texts, it goes without saying that "prompt engineering" may be performed similarly to the example illustrated in FIG. 17.

As a result, the text encoder 10T outputs an embedding vector $T_1$ of the text "canned beer A" and an embedding vector $T_2$ of the text "canned beer B". Then, similarity is calculated between the embedding vector $I_1$ of the hand-held product image 22 and the embedding vector $T_1$ of the text "canned beer A" and the embedding vector $T_2$ of the text "canned beer B".

As indicated by black and white inversion display in FIG. 33, in the present example, the similarity between the embedding vector $I_1$ of the hand-held product image 22 and the embedding vector $T_1$ of the text "canned beer A" is the maximum. Therefore, the CLIP model 10 outputs "canned beer A" as a prediction result of the class of the hand-held product image 22.

Since the prediction result "canned beer A" of the second hierarchy obtained in this manner is not the terminal node in the hierarchical structure illustrated in FIG. 31, inference of the CLIP model 10 is continued. In other words, as illustrated in FIG. 34, texts "one canned beer A" and "a set of six canned beers A" corresponding to the elements of the third hierarchy belonging to the lower order of the prediction result "canned beer A" of the second hierarchy are input as a list of class captions according to the hierarchical structure illustrated in FIG. 31.

As a result, the text encoder 10T outputs an embedding vector $T_1$ of the text "one canned beer A" and an embedding vector $T_2$ of the text "a set of six canned beers A". Then, similarity is calculated between the embedding vector $I_1$ of the hand-held product image 22 and the embedding vector $T_1$ of the text "one canned beer A" and the embedding vector $T_2$ of the text "a set of six canned beers A".

As indicated by black and white inversion display in FIG. 34, in the present example, the similarity between the embedding vector $I_1$ of the hand-held product image 22 and the embedding vector $T_1$ of the text "a set of six canned beers A" is the maximum. Therefore, the CLIP model 10 outputs "a set of six canned beers A" as a prediction result of the class of the hand-held product image 22.

Through the narrowing down above, the product item included in the hand-held product image 22 may be specified as "canned beer A", and the number thereof may also be specified as "6". From an aspect of utilizing this, the first detection unit 116 performs the following determination in addition to the determination of the label switch described above. In other words, the first detection unit 116 determines whether or not the number of product items subjected to checkout machine registration through scanning is smaller than the number of product items specified by image analysis of the zero-shot image classifier. At this time, in a case where the number of product items subjected to checkout machine registration through scanning is smaller than the number of product items specified by the image analysis, it is possible to detect a fraud of performing scanning in a number smaller than an actual purchase number by a label switch.

In a case where the fraud of cheating on the purchase number is detected in this manner, the alert generation unit 118 may generate an alert for the user 2 in a case where a label switch (number) is detected by the first detection unit 116. As such an alert for the user 2, the number of product items subjected to checkout machine registration and the number of product items specified by image analysis of the zero-shot image classifier may be included.

Figure 35:
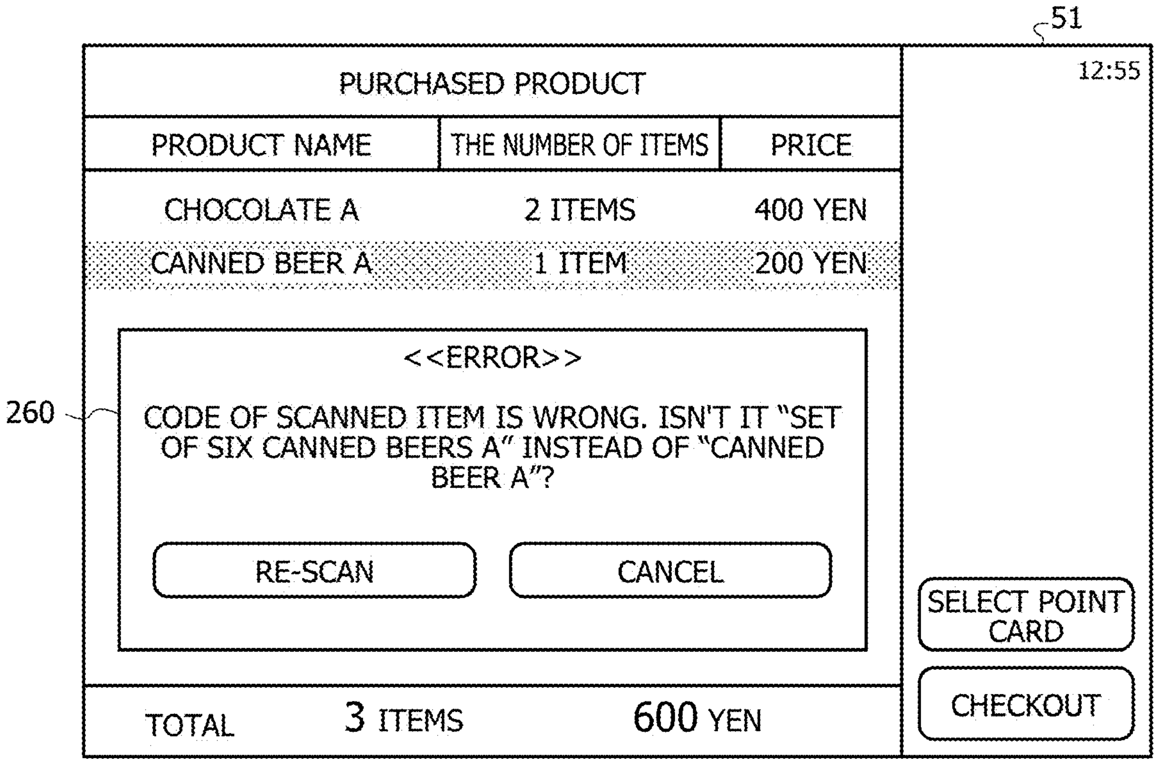
FIG. 35 is a diagram (5) illustrating a display example of the alert.

FIG. 35 is a diagram (5) illustrating a display example of the alert. FIG. 35 illustrates an alert displayed in the self-checkout machine 50 when the first detection unit 116 detects a fraud of cheating on the purchase number. As illustrated in FIG. 35, an alert window 260 is displayed in the touch panel 51 of the self-checkout machine 50. In the alert window 260, the number of product items "canned beer A" subjected to checkout machine registration through scanning and the number of product items "a set of six canned beers A" specified by image analysis of the zero-shot image classifier are displayed in a comparable state. Additionally, the alert window 260 may include a notification prompting re-scanning. According to such display of the alert window 260, it is possible to warn a user of detection of a label switch (number) of cheating on the purchase number by replacing a label of "a set of six canned beers A" with a label of "canned beer A" and performing scanning. Therefore, it is possible to prompt cancellation of checkout with the wrong purchase number, and as a result, it is possible to suppress damage to the store by the label switch (number).

As another aspect, in a case where a label switch (number) is detected by the first detection unit 116, the alert generation unit 118 may generate an alert for a related person of the store, for example, an administrator. As such an alert for the administrator of the store, a type of the fraud, identification information regarding the self-checkout machine 50 in which the fraud is detected, a predicted damage amount due to the fraudulent act, and the like may be included.

Figure 36:
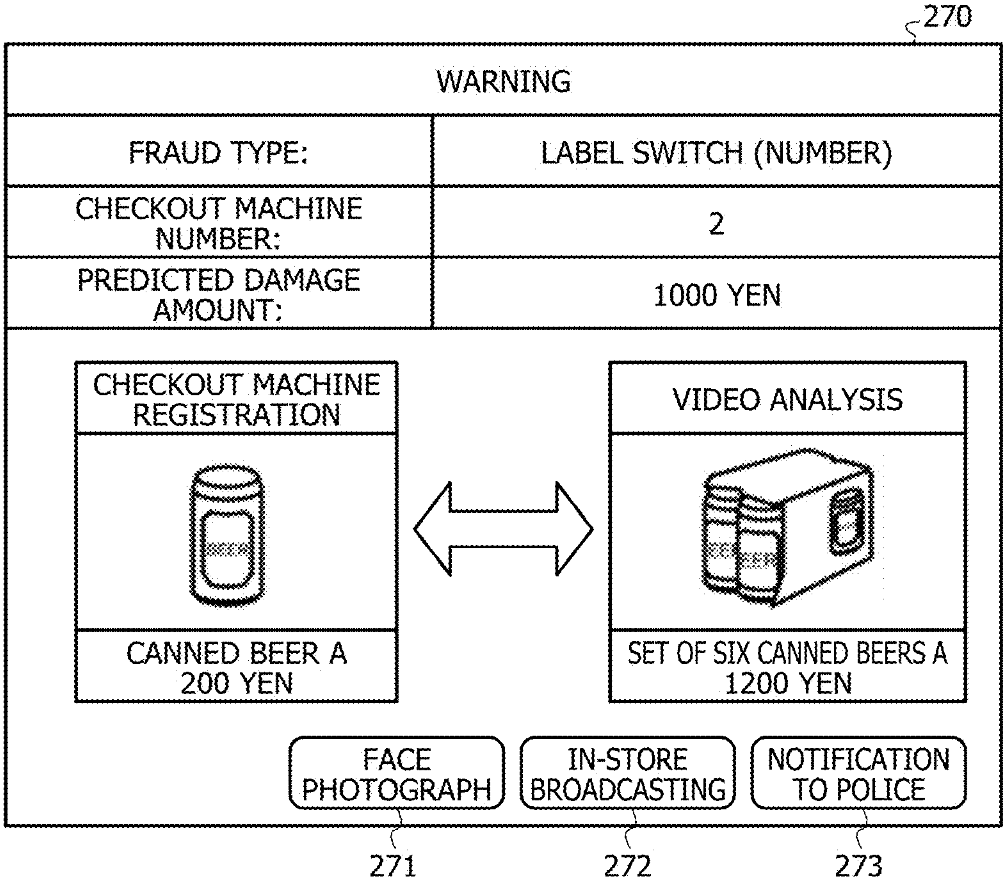
FIG. 36 is a diagram (6) illustrating a display example of the alert.

FIG. 36 is a diagram (6) illustrating a display example of the alert. FIG. 36 illustrates an alert displayed in the display unit of the administrator terminal 60 when the first detection unit 116 detects a fraud of cheating on the purchase number. As illustrated in FIG. 36, an alert window 270 is displayed in the display unit of the administrator terminal 60. In the alert window 270, the number of product items "canned beer A" and a price "200 yen" subjected to checkout machine registration through scanning and the number of product items "a set of six canned beers A" and a price "1200 yen" specified by image analysis are displayed in a comparable state. Moreover, in the alert window 270, a fraud type "label switch (number)" of cheating on the purchase number by switching a label of "a set of six canned beers A" to a label of "canned beer A", a checkout machine number "2" at which the label switch (number) occurs, and a predicted damage amount "1000 yen (=1200 yen−200 yen)" that occurs in checkout with the label switch (number) are displayed. Additionally, in the alert window 270, GUI components 271 to 273 and the like that accept a request such as display of a face photograph in which a face or the like of the user 2 who uses the self-checkout machine 50 of the checkout machine number "2" is captured, in-store broadcasting, or notification to the police or the like are displayed. According to such display of the alert window 270, it is possible to implement notification of occurrence of damage of the label switch (number), grasping of a degree of the damage, and further, presentation of various countermeasures against the damage. Therefore, it is possible to prompt the user 2 to respond to the label switch (number), and as a result, it is possible to suppress the damage to the store by the label switch (number).

Figure 37:
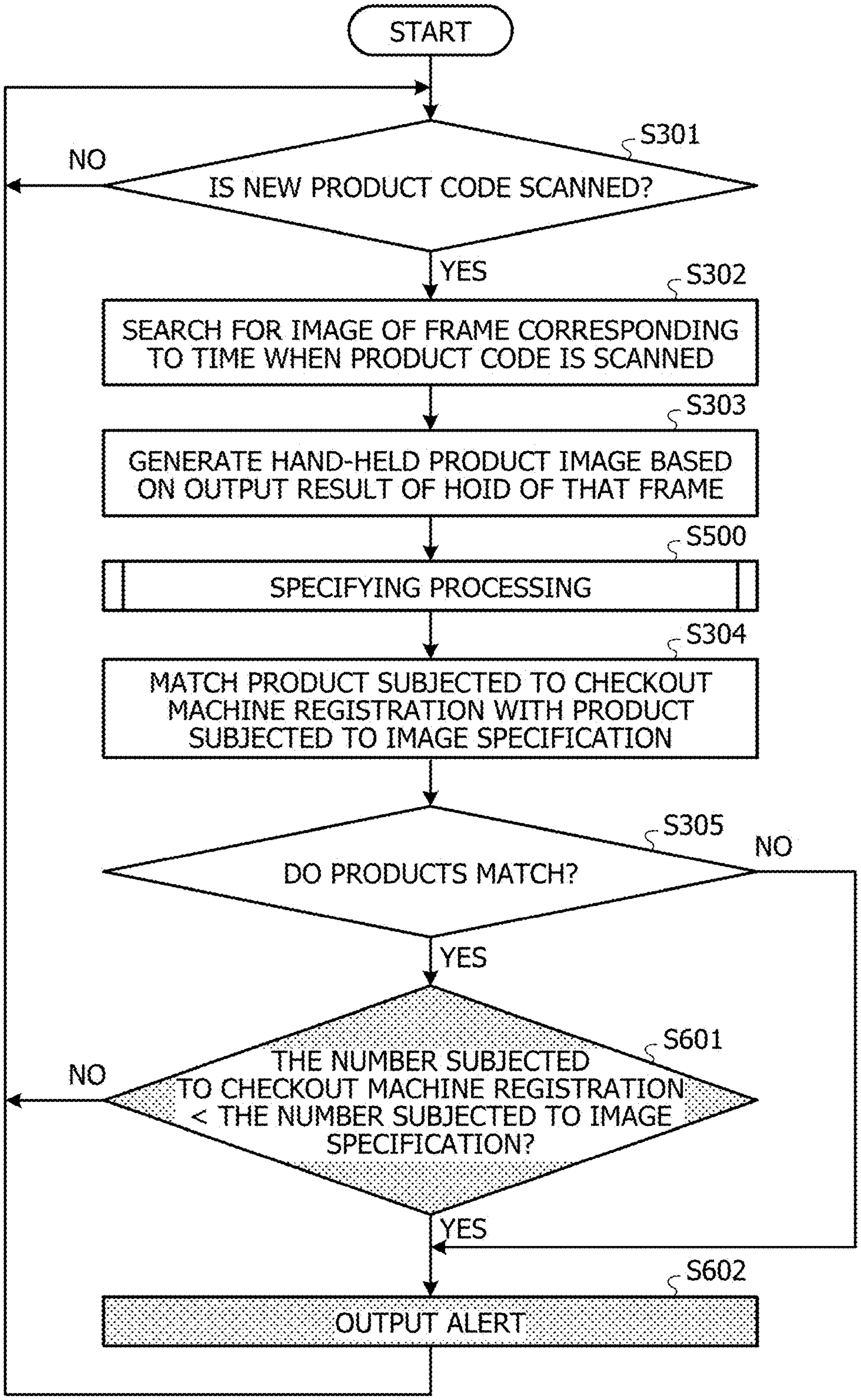
FIG. 37 is a flowchart illustrating a flow of the first detection processing according to the first application example.

Next, processing of detecting the label switch (number) described above will be described. FIG. 37 is a flowchart illustrating a flow of the first detection processing according to the first application example. In FIG. 37, the same step number is assigned to a step in which the same processing as that of the flowchart illustrated in FIG. 28 is executed, while a different step number is assigned to a step in which the processing changed in the first application example is executed.

As illustrated in FIG. 37, processing similar to that of the flowchart illustrated in FIG. 28 is executed from Step S301 to Step S305, while processing executed in a branch of No in Step S305 and subsequent processing is different.

In other words, in a case where the product items match (Step S305: Yes), the first detection unit 116 determines whether or not the number of product items subjected to checkout machine registration through scanning is smaller than the number of product items specified by image analysis (Step S601).

Here, in a case where the number of product items subjected to checkout machine registration through scanning is smaller than the number of product items specified by the image analysis (Step S601: Yes), it is possible to detect a label switch (number) of performing scanning in a number smaller than an actual purchase number by a label switch. In this case, the alert generation unit 118 generates and outputs an alert of the label switch (number) detected by the first detection unit 116 (Step S602), and returns to the processing in Step S301.

As described above, by executing the first detection processing according to the hierarchical structure according to the first application example, the detection of the label switch (number) may be implemented.

5-2. Second Application Example

Figure 38:
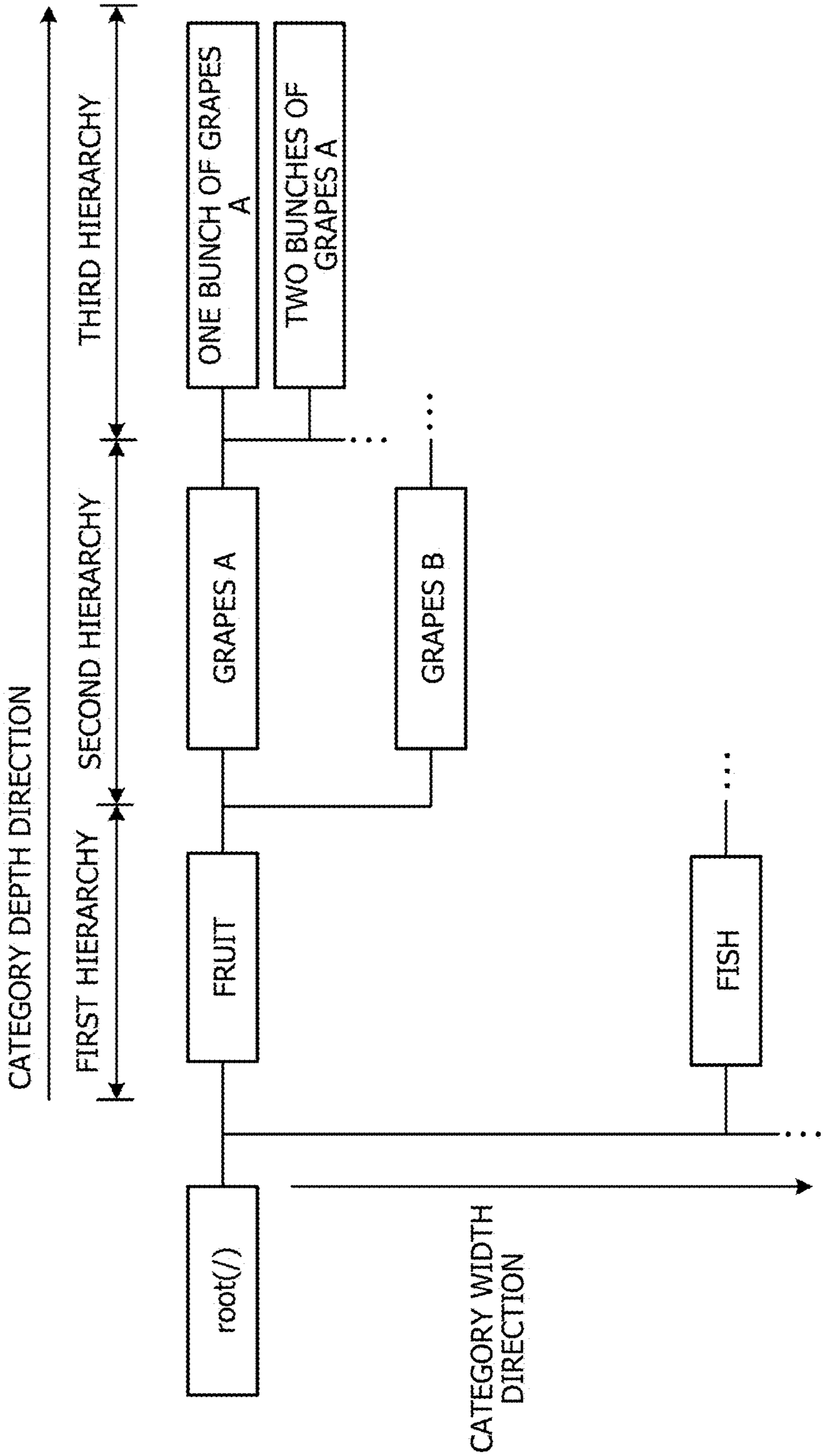
FIG. 38 is a diagram illustrating a second application example of the hierarchical structure.

In addition to the first application example described above, the hierarchical structure according to a second application example will be exemplified as another example of the hierarchical structure including the elements of the labels for the number of products or units of the number of the products. FIG. 38 is a diagram illustrating the second application example of the hierarchical structure. In FIG. 38, for convenience of description, for the second and subsequent hierarchies, lower elements belonging to large classification of products "fruit" are excerpted, and for the third and subsequent hierarchies, lower elements belonging to small classification of products "grapes A" are excerpted and indicated.

As illustrated in FIG. 38, the hierarchical structure according to the second application example includes the first hierarchy, the second hierarchy, and the third hierarchy. Among these, the first hierarchy includes elements such as "fruit" and "fish" as examples of the large classification of products. Moreover, the second hierarchy includes elements such as "grapes A" and "grapes B" as other examples of the small classification of products. Moreover, the third hierarchy includes elements such as "one bunch of grapes A" and "two bunches of grapes A" as examples of the labels including the number and units of products.

In a case where the labels for the number of products or units of the number of products are included in the hierarchical structure in this manner, it is possible to implement detection of a fraud of performing manual input in a number smaller than an actual purchase number by a banana trick in addition to the banana trick described above. Hereinafter, the fraud of performing manual input in the number smaller than the actual purchase number by the banana trick may be referred to as "banana trick (number)".

Such checkout machine registration for a product without a label is performed by manual input by the user 2. As merely an example, in the self-checkout machine 50, there is a case where checkout machine registration of a product without a label is accepted via operation on a selection screen of a product without a code illustrated in FIG. 39.

Figure 39:
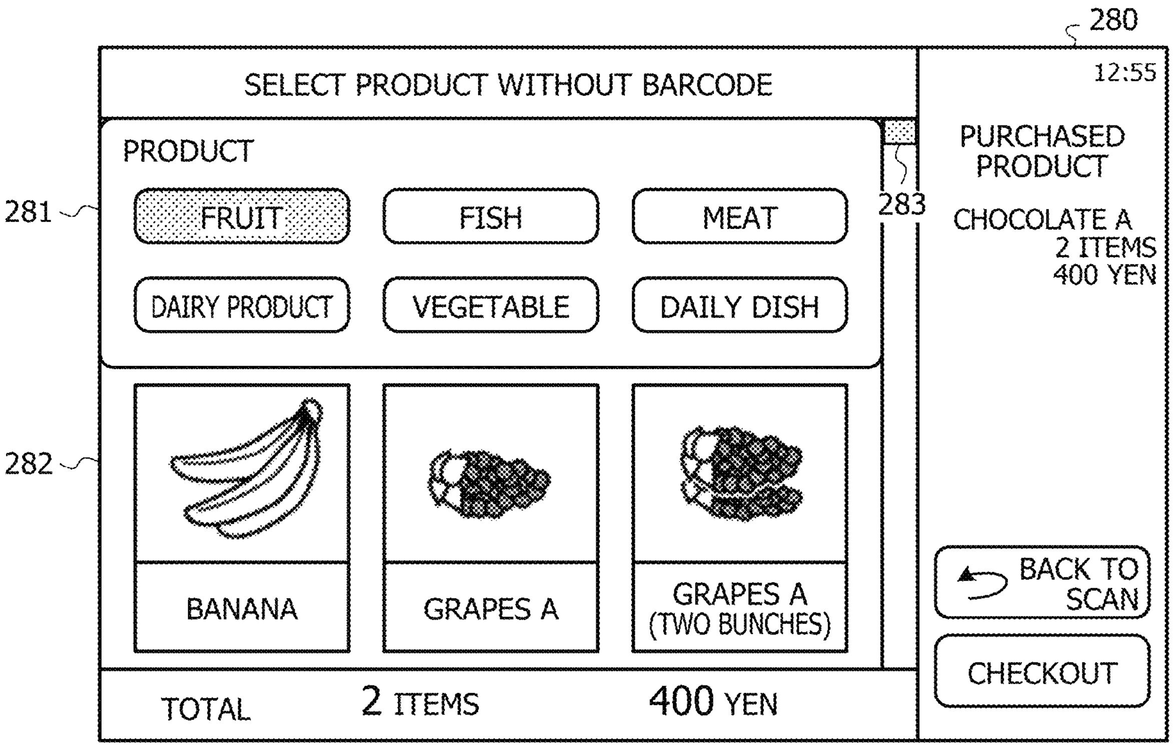
FIG. 39 is a diagram (3) illustrating a display example of the self-checkout machine.

FIG. 39 is a diagram (3) illustrating a display example of the self-checkout machine. As illustrated in FIG. 39, a selection screen 280 for a product without a code may include a display area 281 for a product category and a display area 282 for a product item belonging to a category being selected. For example, the selection screen 280 for a product without a code illustrated in FIG. 39 illustrates an example in which a product category "fruit" is being selected among product categories "fruit", "fish", "meat", "dairy product", "vegetable", and "daily dish" included in the display area 281. In this case, the display area 282 displays product items "banana", "grapes A", "grapes A (two bunches)", and the like belonging to the product category "fruit". In a case where there is no space for arranging all the product items belonging to the product category "fruit" in the display area 282, it is possible to expand a range in which the product items are arranged by scrolling a display range of the display area 282 via a scroll bar 283. By accepting selection operation from such product items displayed in the display area 282, checkout machine registration of a product without a label may be accepted.

Figure 40:
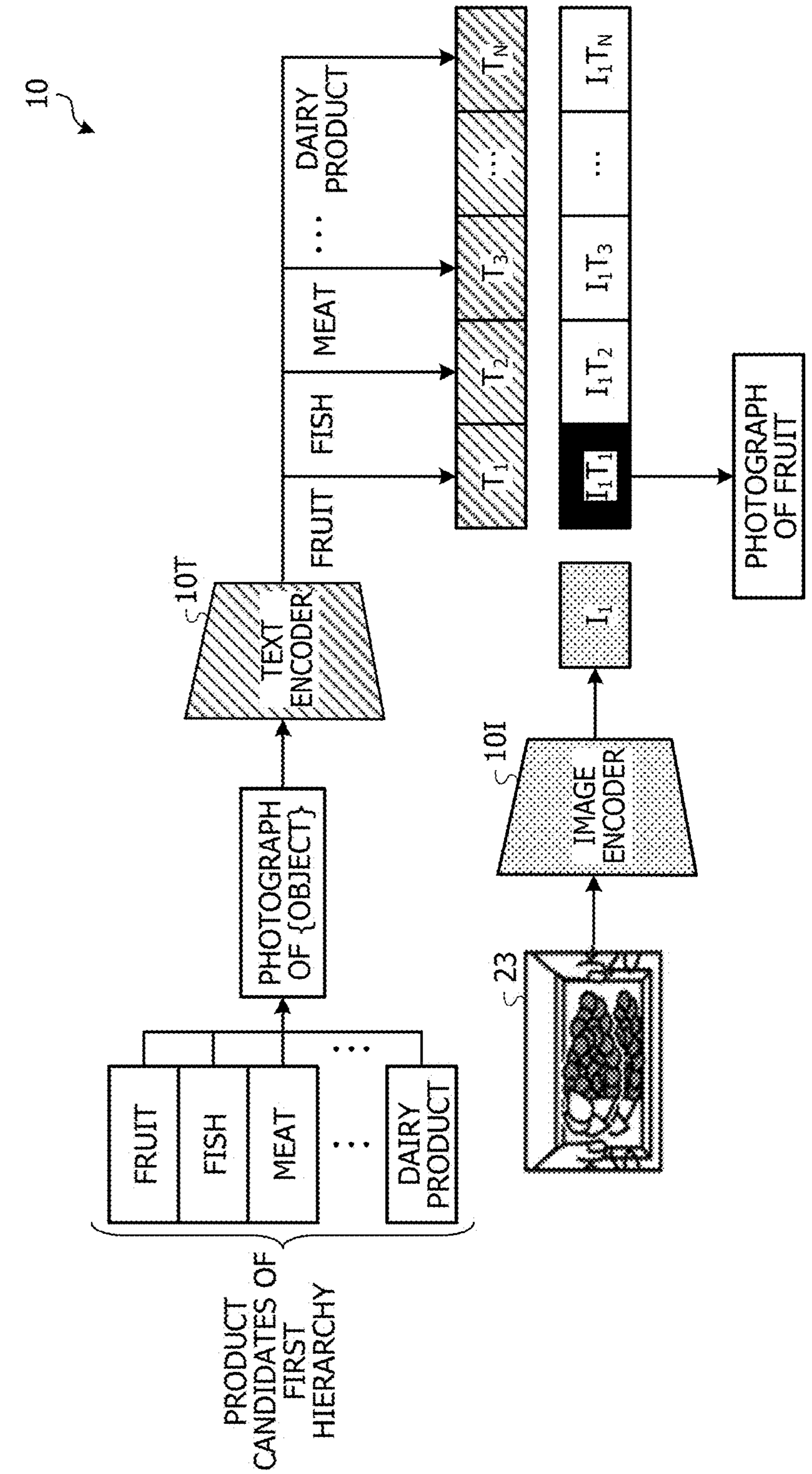
FIG. 40 is a schematic diagram (1) illustrating a case 4 where a product item is specified.
Figure 41:
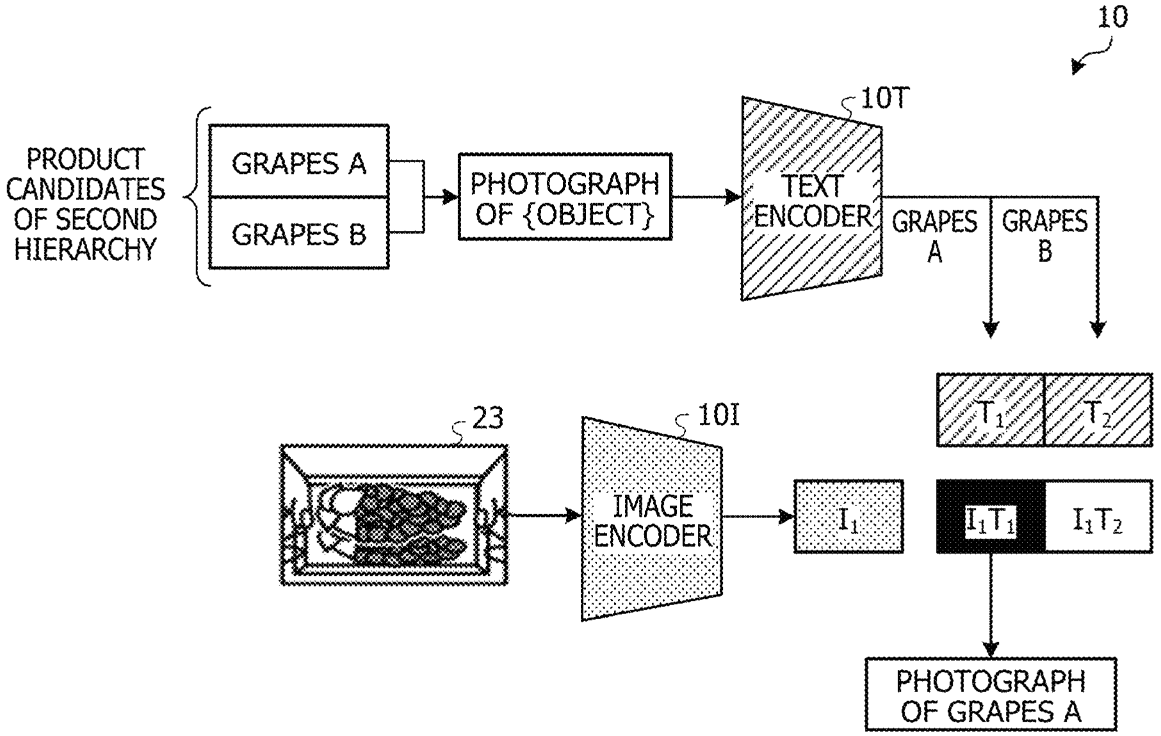
FIG. 41 is a schematic diagram (2) illustrating the case 4 where the product item is specified.
Figure 42:
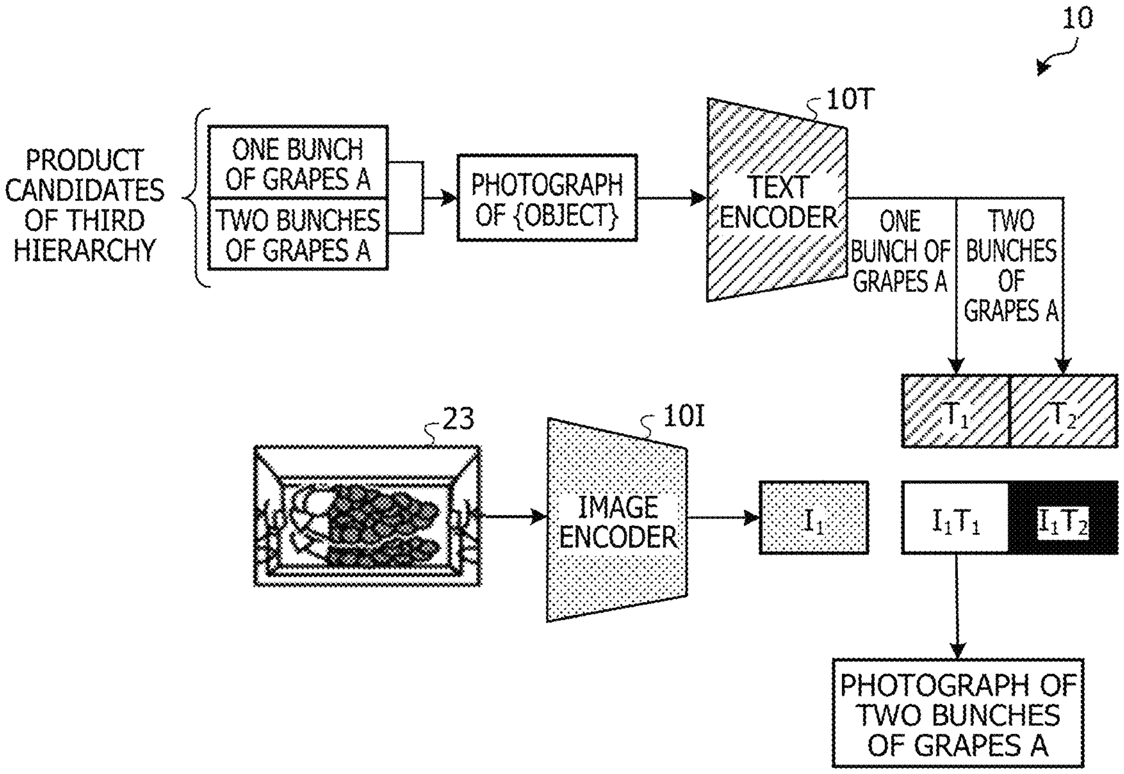
FIG. 42 is a schematic diagram (3) illustrating the case 4 where the product item is specified.

Specification of a product item executed at the time of detection of such a banana trick (number) will be described with an exemplified case. FIGS. 40 to 42 are schematic diagrams (1) to (3) illustrating a case 4 where the product item is specified. FIGS. 40 to 42 illustrate an example in which a partial image of a Bbox corresponding to the product item "two bunches of grapes A" grasped by the user 2 is generated as merely an example of a hand-held product image 23.

As illustrated in FIG. 40, the hand-held product image 23 is input to the image encoder 10I of the CLIP model 10. As a result, the image encoder 10I outputs an embedding vector $I_1$ of the hand-held product image 23.

On the other hand, in the text encoder 10T of the CLIP model 10, texts "fruit", "fish", "meat", and "dairy product" corresponding to the elements of the first hierarchy are input as a list of class captions according to the hierarchical structure illustrated in FIG. 38. Note that, at the time of inputting the texts, it goes without saying that "prompt engineering" may be performed similarly to the example illustrated in FIG. 17.

As a result, the text encoder 10T outputs an embedding vector $T_1$ of the text "fruit", an embedding vector $T_2$ of the text "fish", an embedding vector $T_3$ of the text "meat", . . . , and an embedding vector $T_N$ of the text "dairy product".

Then, similarity is calculated between the embedding vector $I_1$ of the hand-held product image 23 and the embedding vector $T_1$ of the text "fruit", the embedding vector $T_2$ of the text "fish", the embedding vector $T_3$ of the text "meat", and the embedding vector $T_N$ of the text "dairy product".

As indicated by black and white inversion display in FIG. 40, in the present example, the similarity between the embedding vector $I_1$ of the hand-held product image 23 and the embedding vector $T_1$ of the text "fruit" is the maximum. Therefore, the CLIP model 10 outputs "fruit" as a prediction result of a class of the hand-held product image 23.

Since the prediction result "fruit" of the first hierarchy obtained in this manner is not the terminal node in the hierarchical structure illustrated in FIG. 38, inference of the CLIP model 10 is continued. In other words, as illustrated in FIG. 41, texts "grapes A" and "grapes B" corresponding to the elements of the second hierarchy belonging to the lower order of the prediction result "fruit" of the first hierarchy are input as a list of class captions according to the hierarchical structure illustrated in FIG. 38. Note that, at the time of inputting the texts, it goes without saying that "prompt engineering" may be performed similarly to the example illustrated in FIG. 17.

As a result, the text encoder 10T outputs an embedding vector $T_1$ of the text "grapes A" and an embedding vector $T_2$ of the text "grapes B". Then, similarity is calculated between the embedding vector $I_1$ of the hand-held product image 23 and the embedding vector $T_1$ of the text "grapes A" and the embedding vector $T_2$ of the text "grapes B".

As indicated by black and white inversion display in FIG. 41, in the present example, the similarity between the embedding vector $I_1$ of the hand-held product image 23 and the embedding vector $T_1$ of the text "grapes A" is the maximum. Therefore, the CLIP model 10 outputs "grapes A" as a prediction result of the class of the hand-held product image 23.

Since the prediction result "grapes A" of the second hierarchy obtained in this manner is not the terminal node in the hierarchical structure illustrated in FIG. 38, inference of the CLIP model 10 is continued. In other words, as illustrated in FIG. 42, texts "one bunch of grapes A" and "two bunches of grapes A" corresponding to the elements of the third hierarchy belonging to the lower order of the prediction result "grapes A" of the second hierarchy are input as a list of class captions according to the hierarchical structure illustrated in FIG. 38.

As a result, the text encoder 10T outputs an embedding vector $T_1$ of the text "one bunch of grapes A" and an embedding vector $T_2$ of the text "two bunches of grapes A". Then, similarity is calculated between the embedding vector $I_1$ of the hand-held product image 22 and the embedding vector $T_1$ of the text "one bunch of grapes A" and the embedding vector $T_2$ of the text "two bunches of grapes A".

As indicated by black and white inversion display in FIG. 42, in the present example, the similarity between the embedding vector $I_1$ of the hand-held product image 23 and the embedding vector $T_2$ of the text "two bunches of grapes A" is the maximum. Therefore, the CLIP model 10 outputs "two bunches of grapes A" as a prediction result of the class of the hand-held product image 23.

Through the narrowing down above, the product item included in the hand-held product image 23 may be specified as "two bunches of grapes A", and the number thereof may also be specified as "two bunches". From an aspect of utilizing this, the second detection unit 117 performs the following determination in addition to the determination of the banana trick described above. In other words, the second detection unit 117 determines whether or not the number of product items subjected to checkout machine registration via manual input is smaller than the number of product items specified by image analysis of the zero-shot image classifier. At this time, in a case where the number of product items subjected to checkout machine registration via manual input is smaller than the number of product items specified by the image analysis, it is possible to detect a fraud of performing manual input in a number smaller than an actual purchase number by a banana trick.

In a case where the fraud of cheating on the purchase number is detected in this manner, the alert generation unit 118 may generate an alert for the user 2 in a case where a banana trick (number) is detected by the second detection unit 117. As such an alert for the user 2, the number of product items subjected to checkout machine registration and the number of product items specified by image analysis of the zero-shot image classifier may be included.

Figure 43:
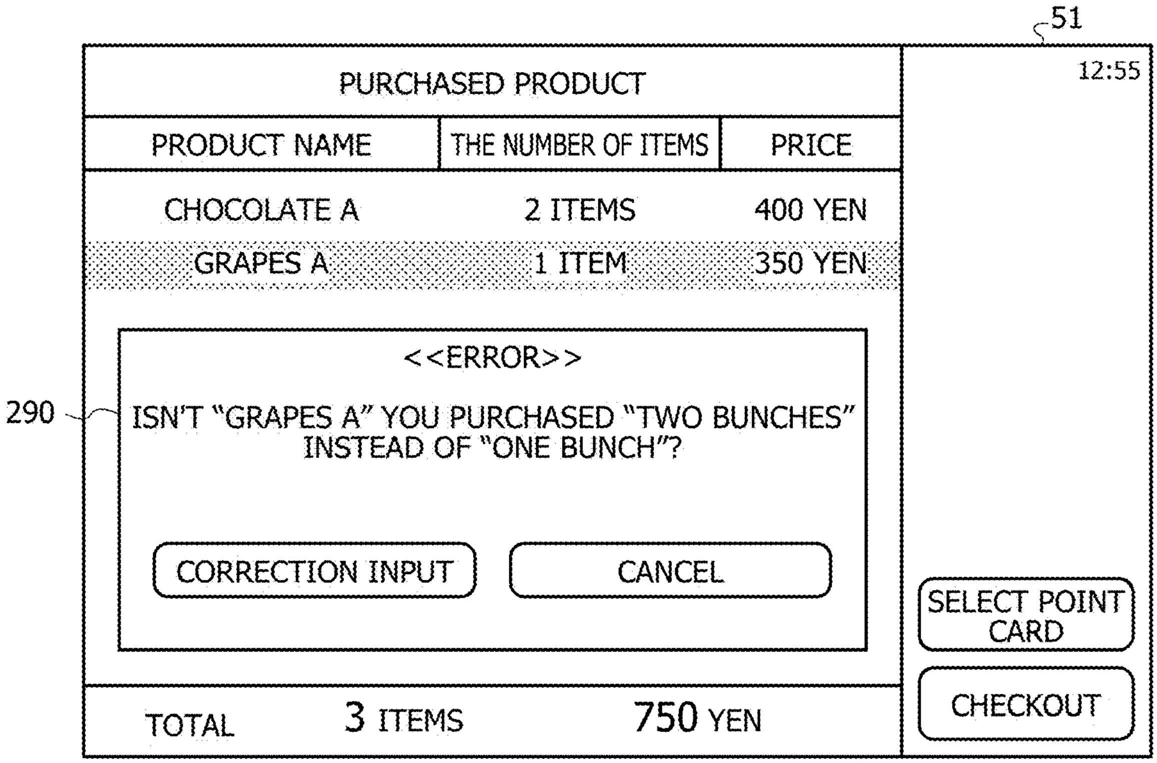
FIG. 43 is a diagram (7) illustrating a display example of the alert.

FIG. 43 is a diagram (7) illustrating a display example of the alert. FIG. 43 illustrates an alert displayed in the self-checkout machine 50 when the second detection unit 117 detects a fraud of cheating on the purchase number. As illustrated in FIG. 43, an alert window 290 is displayed in the touch panel 51 of the self-checkout machine 50. In the alert window 290, the number of product items "grapes A" subjected to checkout machine registration via manual input and the number of product items "two bunches of grapes A"

specified by image analysis are displayed in a comparable state. Additionally, the alert window 290 may include a notification prompting redoing manual input. According to such display of the alert window 290, it is possible to warn a user of detection of a banana trick (number) of cheating on manual input of the purchase number of “grapes A” as “one bunch” instead of “two bunches”. Therefore, it is possible to prompt cancellation of checkout with the wrong purchase number, and as a result, it is possible to suppress damage to the store by the banana trick (number).

As another aspect, in a case where a banana trick (number) is detected by the second detection unit 117, the alert generation unit 118 may generate an alert for a related person of the store, for example, an administrator. As such an alert for the administrator of the store, a type of the fraud, identification information regarding the self-checkout machine 50 in which the fraud is detected, a predicted damage amount due to the fraudulent act, and the like may be included.

Figure 44:
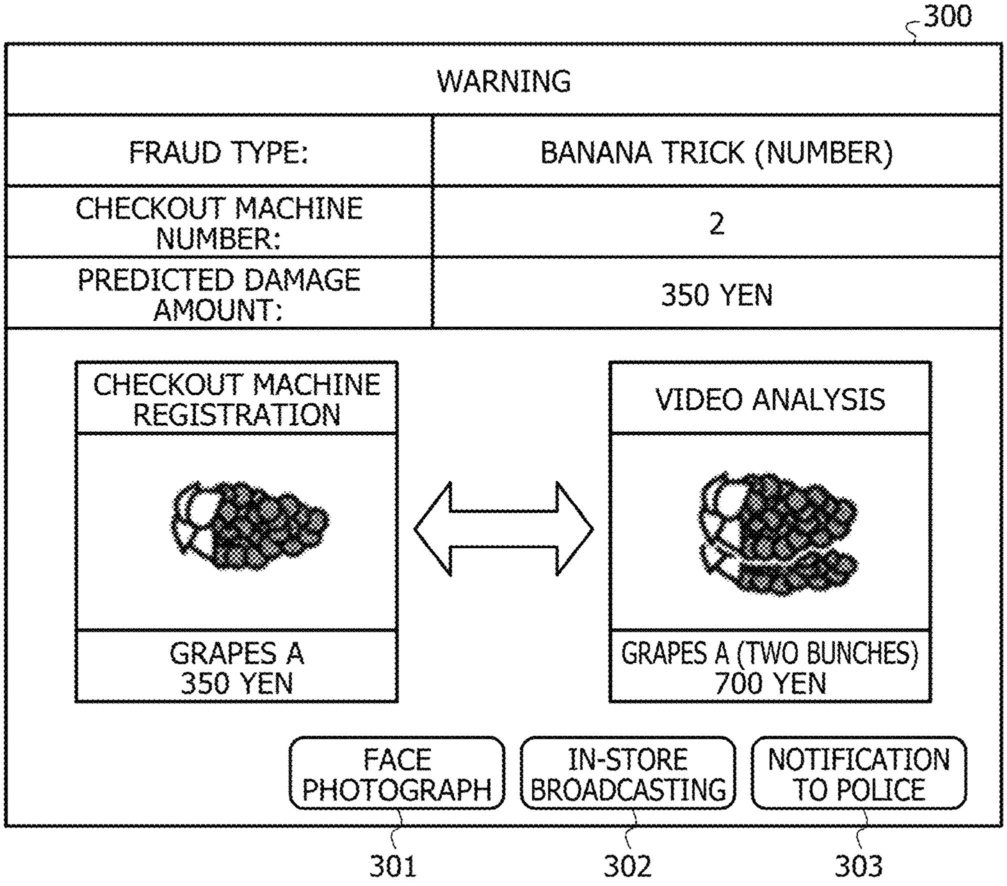
FIG. 44 is a diagram (8) illustrating a display example of the alert.

FIG. 44 is a diagram (8) illustrating a display example of the alert. FIG. 44 illustrates an alert displayed in the display unit of the administrator terminal 60 when the second detection unit 117 detects a fraud of cheating on the purchase number. As illustrated in FIG. 44, an alert window 300 is displayed in the display unit of the administrator terminal 60. In the alert window 300, the number of product items “grapes A” and a price “350 yen” subjected to checkout machine registration via manual input and the number of product items “two bunches of grapes A” and a price “700 yen” specified by image analysis are displayed in a comparable state. Moreover, in the alert window 300, a fraud type “banana trick (number)” of cheating on manual input of the purchase number of “grapes A” as “one bunch” instead of “two bunches”, a checkout machine number “2” at which the banana trick (number) occurs, and a predicted damage amount “350 yen (=700 yen−350 yen)” that occurs in checkout with the banana trick (number) are displayed. Additionally, in the alert window 300, GUI components 301 to 303 and the like that accept a request such as display of a face photograph in which a face or the like of the user 2 who uses the self-checkout machine 50 of the checkout machine number “2” is captured, in-store broadcasting, or notification to the police or the like are displayed. According to such display of the alert window 300, it is possible to implement notification of occurrence of damage of the banana trick (number), grasping of a degree of the damage, and further, presentation of various countermeasures against the damage. Therefore, it is possible to prompt the user 2 to respond to the banana trick (number), and as a result, it is possible to suppress the damage to the store by the banana trick (number).

Figure 45:
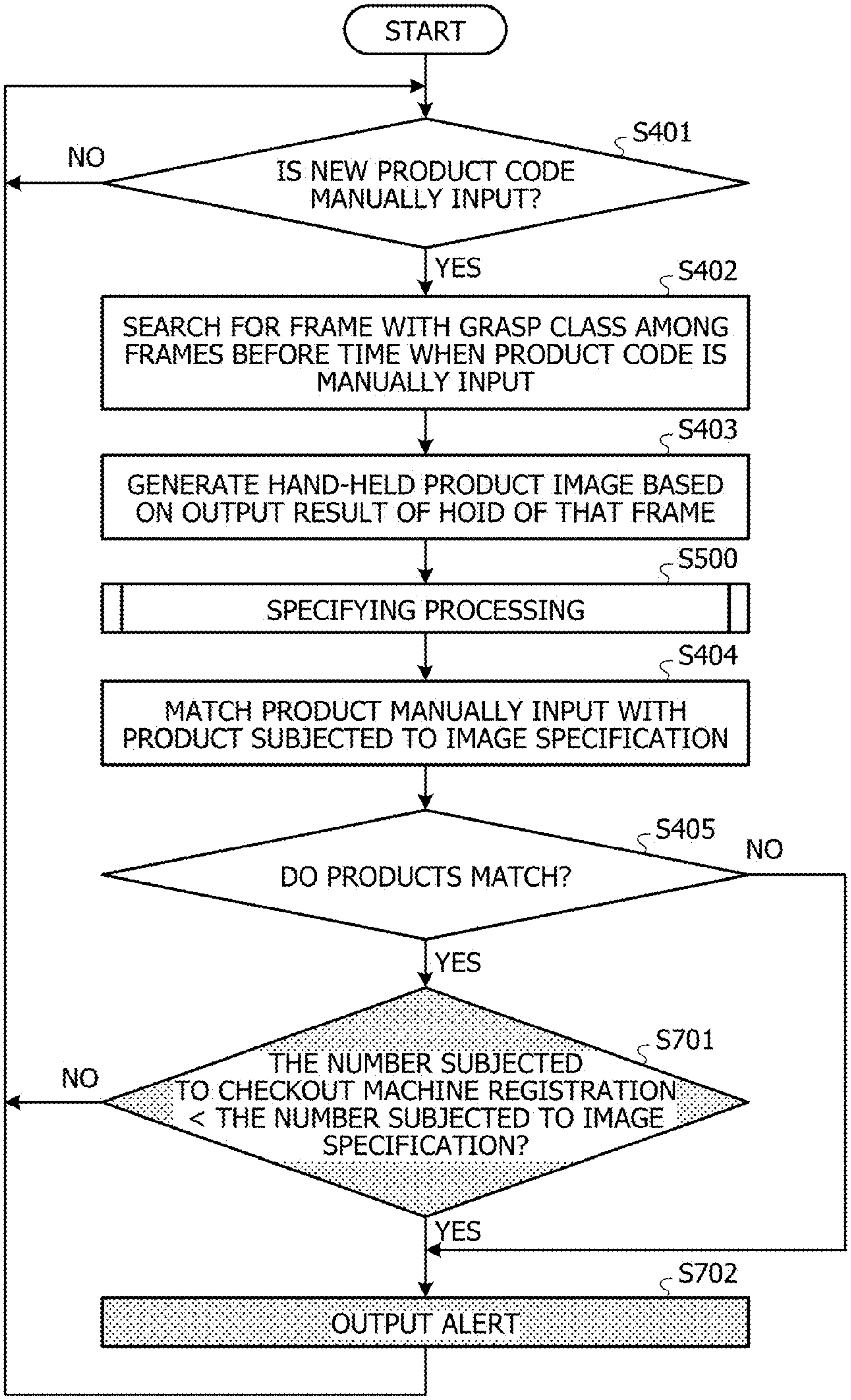
FIG. 45 is a flowchart illustrating a flow of the second detection processing according to the second application example.

Next, processing of detecting the banana trick (number) described above will be described. FIG. 45 is a flowchart illustrating a flow of the second detection processing according to the second application example. In FIG. 45, the same step number is assigned to a step in which the same processing as that of the flowchart illustrated in FIG. 29 is executed, while a different step number is assigned to a step in which the processing changed in the second application example is executed.

As illustrated in FIG. 45, processing similar to that of the flowchart illustrated in FIG. 29 is executed from Step S401 to Step S405, while processing executed in a branch of No in Step S405 and subsequent processing is different.

In other words, in a case where the product items match (Step S405: Yes), the second detection unit 117 determines whether or not the number of product items subjected to checkout machine registration via manual input is smaller than the number of product items specified by image analysis (Step S701).

Here, in a case where the number of product items subjected to checkout machine registration via manual input is smaller than the number of product items specified by image analysis (Step S701: Yes), the following possibility increases. In other words, it is possible to detect a banana trick (number) of performing manual input in the number smaller than the actual purchase number. In this case, the alert generation unit 118 generates and outputs an alert of the banana trick (number) detected by the second detection unit 117 (Step S702), and returns to the processing in Step S401.

As described above, by executing the second detection processing according to the hierarchical structure according to the second application example, the detection of the banana trick (number) may be implemented.

5-3. Third Application Example

Figure 46:
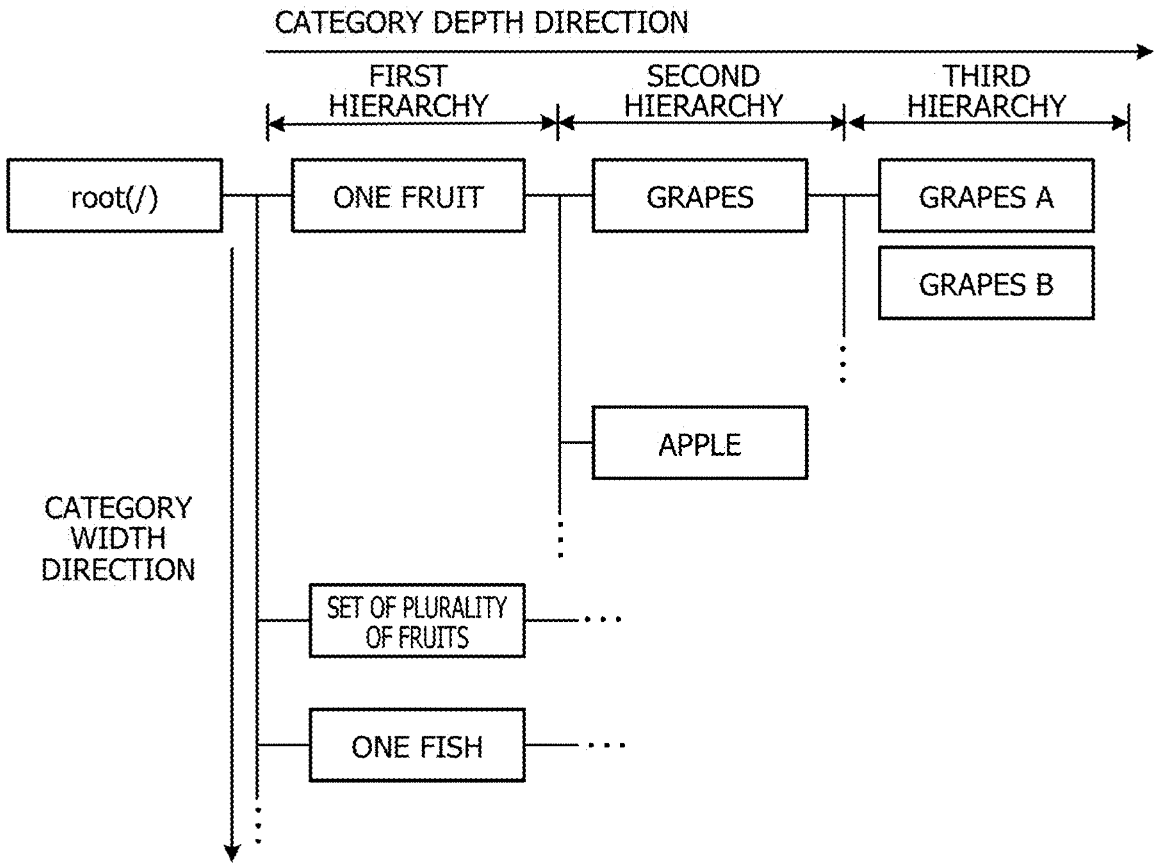
FIG. 46 is a diagram illustrating a third application example of the hierarchical structure.

In the first application example described above and the second application example described above, an example has been exemplified in which the elements of the labels for the number of products or units of the number of the products are included in the third hierarchy. However, the elements of the labels for the number of products or units of the number of the products may be included in any hierarchy. FIG. 46 is a diagram illustrating a third application example of the hierarchical structure. FIG. 46 exemplifies an example in which the first hierarchy includes the elements of the labels for the number of products or units of the number of the products.

As illustrated in FIG. 46, the hierarchical structure according to the third application example includes the first hierarchy, the second hierarchy, and the third hierarchy. Among these, the first hierarchy includes elements such as “one fruit” and “a plurality of fruits” as examples of the labels including the number and units of products and the large classification of products. Moreover, the second hierarchy includes elements such as “grapes” and “apple” as other examples of the small classification of products. Moreover, the third hierarchy includes elements such as “grapes A” and “grapes B” as examples of product items.

Also in a case where the labels for the number of products or units of the number of products are included in any hierarchy in this manner, it is possible to detect a fraud of cheating on the purchase number, such as the label switch (number) described above or the banana trick (number) described above.

5-4. Fourth Application Example

In the first embodiment described above, an example has been exemplified in which the price attributes are added to the template in addition to the categories (large classification or small classification) as an example of the attributes of the products, but the attributes of the products are not limited to this. For example, attributes such as “color” and “shape” may be added to the template from an aspect of improving accuracy of embedding the texts of the class captions of the zero-shot image classifier in the feature space. Additionally, attributes such as “the number of pieces of stock” may be added to the template from a viewpoint of suppressing stock shortage in a store.

Figure 47:
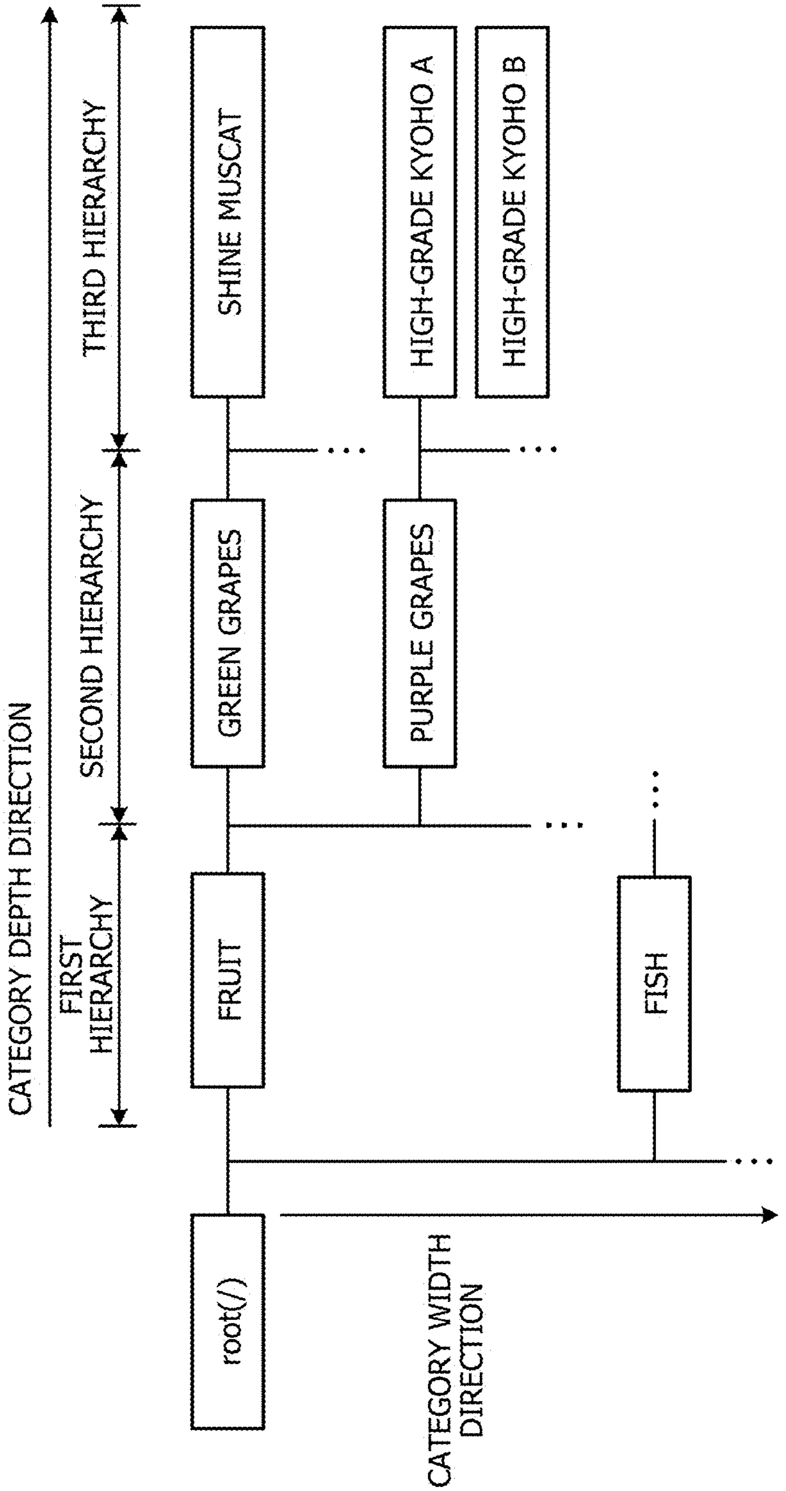
FIG. 47 is a diagram illustrating a fourth application example of the hierarchical structure.

FIG. 47 is a diagram illustrating a fourth application example of the hierarchical structure. FIG. 47 exemplifies an example in which an element corresponding to the attribute "color" is added to each element of the first hierarchy as an example of the attributes of the products. As illustrated in FIG. 47, the hierarchical structure according to the fourth application example includes the first hierarchy, the second hierarchy, and the third hierarchy. Among these, the first hierarchy includes elements such as "fruit" and "fish" as examples of the large classification of products. Moreover, the second hierarchy includes elements such as "green grapes" and "purple grapes" as examples of color of products. Moreover, the third hierarchy includes "shine muscat" as an example of product items belonging to the element "green grapes" of the second hierarchy, and includes "high-grade kyoho A" and "high-grade kyoho B" as examples of product items belonging to the element "purple grapes" of the second hierarchy.

In this manner, by adding the elements such as "color" and "shape" to the template as examples of the attributes of the products, it is possible to improve the accuracy of embedding the texts of the class captions of the zero-shot image classifier in the feature space.

5-5. Fifth Application Example

In the first embodiment described above, the hierarchical structure data is exemplified as an example of the reference source data in which the attributes of the products are associated with each of the plurality of hierarchies, and an example in which the zero-shot image classifier refers to the hierarchical structure data to specify one or a plurality of product candidates has been described. Then, as merely an example, an example has been exemplified in which the class captions corresponding to the plurality of product candidates arranged in the store at the present time among the large number of types of product candidates to be replaced are listed in the hierarchical structure data, but the embodiment is not limited to this.

As merely an example, the hierarchical structure data may be generated for each period based on products that arrive at the store at the period. For example, in a case where the products in the store are replaced every month, the data generation unit 112 may generate the hierarchical structure data for each period as follows. In other words, the hierarchical structure data is generated for each period by a scheme such as hierarchical structure data related to arrived products in November 2022, hierarchical structure data related to arrived products in December 2022, and hierarchical structure data related to arrived products in January 2023. Then, the fraud detection unit 115 refers to the corresponding hierarchical structure data at the time of specifying a product item in the hierarchical structure data stored for each period, and inputs the corresponding hierarchical structure data to the text encoder of the zero-shot image classifier. With this configuration, the reference source data to be referred to by the zero-shot image classifier may be switched in accordance with the replacement of the products in the store. As a result, even in a case where life cycles of the products in the store are short, stability of accuracy of specification of a product item may be implemented before and after the replacement of the products.

5-6. Numerical Value

The number of self-checkout machines and cameras, numerical value examples, training data examples, the number of pieces of training data, the machine learning model, each class name, the number of classes, the data format, and the like used in the embodiments described above are merely examples, and may be optionally changed. Furthermore, the flow of the processing described in each flowchart may be appropriately changed in a range without contradiction. Furthermore, for each model, a model generated by various algorithms such as a neural network may be adopted.

Furthermore, for the scan position and the position of the shopping basket, the information processing device 100 may also use known technologies such as another machine learning model that detects the position, an object detection technology, and a position detection technology. For example, since the information processing device 100 may detect the position of the shopping basket based on a difference between the frames (image data) or a time-series change of the frames, the detection may be performed by using that, or another model may be generated by using that. Furthermore, by specifying a size of the shopping basket in advance, in a case where an object having the size is detected from the image data, the information processing device 100 may identify a position of the object as the position of the shopping basket. Note that, since the scan position is a position fixed to some extent, the information processing device 100 may also identify a position specified by the administrator or the like as the scan position.

5-7. System

Pieces of information including a processing procedure, a control procedure, a specific name, various types of data, and parameters described above or illustrated in the drawings may be optionally changed unless otherwise specified.

Furthermore, specific forms of distribution and integration of components of individual devices are not limited to those illustrated in the drawings. For example, the video acquisition unit 113 and the fraud detection unit 115 may be integrated, and the fraud detection unit 115 may be distributed to the first detection unit 116 and the second detection unit 117. That is, all or a part of the components may be functionally or physically distributed or integrated in optional units, according to various types of loads, use situations, or the like. Moreover, all or an optional part of the respective processing functions of each device may be implemented by a central processing unit (CPU) and a program to be analyzed and executed by the CPU, or may be implemented as hardware by wired logic.

5-8. Hardware

Figure 48:
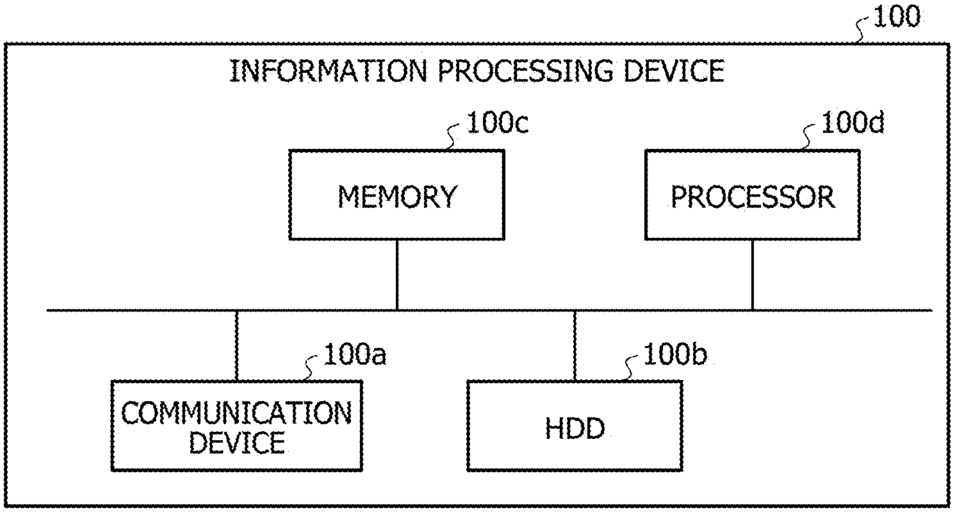
FIG. 48 is a diagram for describing a hardware configuration example of the information processing device.

FIG. 48 is a diagram for describing a hardware configuration example of the information processing device. Here, as an example, the information processing device 100 will be described. As illustrated in FIG. 48, the information processing device 100 includes a communication device **100*a*, a hard disk drive (HDD) 100*b*, a memory 100*c*, and a processor 100*d*. Furthermore, the individual units illustrated in FIG. 48** are mutually coupled by a bus or the like.

The communication device **100*a* is a network interface card or the like, and communicates with another device. The HDD 100*b* stores programs and DBs that operate the functions illustrated in FIG. 2**.

The processor **100*d* reads a program that executes processing similar to that of each processing unit illustrated in FIG. 2 from the HDD 100*b* or the like, and loads the read program into the memory 100*c*, thereby causing a process that executes each function described with reference to FIG. 2 or the like to operate. For example, this process executes a function similar to that of each processing unit included in the information processing device 100. Specifically, the processor 100***d* reads, from the HDD 100*b* or the like, a program having functions similar to those of the machine learning unit 111, the data generation unit 112, the video acquisition unit 113, the self-checkout machine data acquisition unit 114, the fraud detection unit 115, the alert generation unit 118, and the like. Then, the processor 100*d* executes a process that executes processing similar to that of the machine learning unit 111, the data generation unit 112, the video acquisition unit 113, the self-checkout machine data acquisition unit 114, the fraud detection unit 115, the alert generation unit 118, and the like.

In this manner, the information processing device 100 operates as an information processing device that executes an information processing method by reading and executing the program. Furthermore, the information processing device 100 may also implement functions similar to those of the embodiments described above by reading the program described above from a recording medium by a medium reading device and executing the read program described above. Note that the program mentioned in another embodiment is not limited to being executed by the information processing device 100. For example, the embodiments described above may be similarly applied also to a case where another computer or server executes the program or a case where these computer and server cooperatively execute the program.

This program may be distributed via a network such as the Internet. Furthermore, this program may be recorded in a computer-readable recording medium such as a hard disk, a flexible disk (FD), a compact disc read only memory (CD-ROM), a magneto-optical disk (MO), or a digital versatile disc (DVD), and may be executed by being read from the recording medium by a computer.

Figure 49:
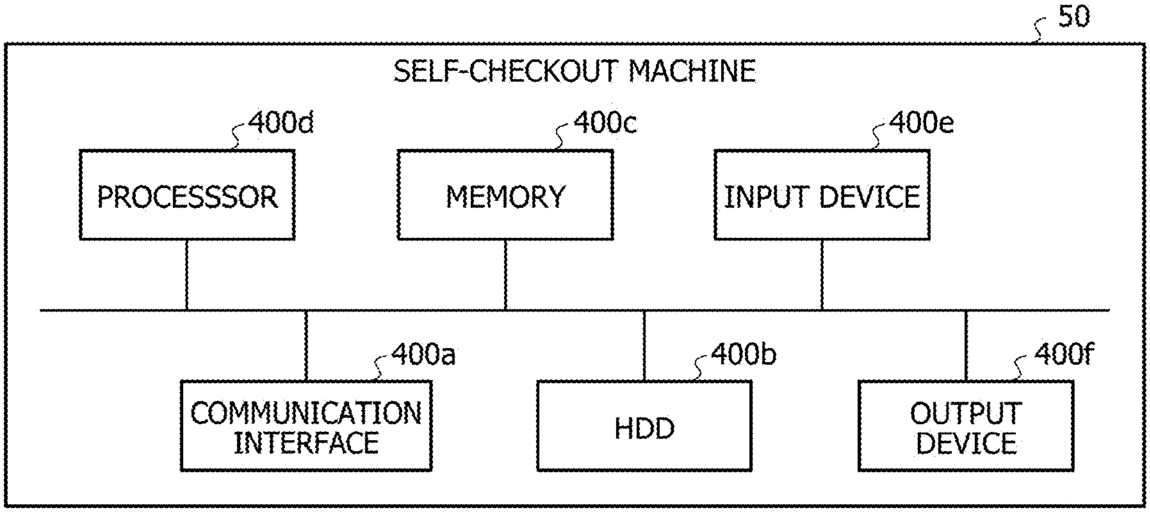
FIG. 49 is a diagram for describing a hardware configuration example of the self-checkout machine.

Next, the self-checkout machine 50 will be described. FIG. 49 is a diagram for describing a hardware configuration example of the self-checkout machine 50. As illustrated in FIG. 49, the self-checkout machine 50 includes a communication interface 400*a*, an HDD 400*b*, a memory 400*c*, a processor 400*d*, an input device 400*e*, and an output device 400*f*. Furthermore, the individual units illustrated in FIG. 49 are mutually coupled by a bus or the like.

The communication interface 400*a* is a network interface card or the like, and communicates with another information processing device. The HDD 400*b* stores a program and data for operating each function of the self-checkout machine 50.

The processor 400*d* is a hardware circuit that reads the program that executes processing of each function of the self-checkout machine 50 from the HDD 400*b* or the like and loads the read program into the memory 400*c*, thereby causing a process that executes each function of the self-checkout machine 50 to operate. In other words, this process executes a function similar to that of each processing unit included in the self-checkout machine 50.

In this manner, the self-checkout machine 50 operates as an information processing device that executes operation control processing by reading and executing the program that executes processing of each function of the self-checkout machine 50. Furthermore, the self-checkout machine 50 may also implement the respective functions of the self-checkout machine 50 by reading the program from a recording medium by the medium reading device and executing the read program. Note that the program mentioned in another embodiment is not limited to being executed by the self-checkout machine 50. For example, the present embodiment may be similarly applied also to a case where another computer or server executes the program or a case where these computer and server cooperatively execute the program.

Furthermore, the program that executes the processing of each function of the self-checkout machine 50 may be distributed via a network such as the Internet. Furthermore, this program may be recorded in a computer-readable recording medium such as a hard disk, an FD, a CD-ROM, an MO, or a DVD, and may be executed by being read from the recording medium by a computer.

The input device 400*e* detects various types of input operation by a user, such as input operation for a program executed by the processor 400*d*. The input operation includes, for example, touch operation or the like. In the case of the touch operation, the self-checkout machine 50 further includes a display unit, and the input operation detected by the input device 400*e* may be touch operation on the display unit. The input device 400*e* may be, for example, a button, a touch panel, a proximity sensor, and the like. Furthermore, the input device 400*e* reads a barcode. The input device 400*e* is, for example, a barcode reader. The barcode reader includes a light source and a light sensor, and scans a barcode.

The output device 400*f* outputs data output from the program executed by the processor 400*d* via an external device coupled to the self-checkout machine 50, for example, an external display device or the like. Note that, in a case where the self-checkout machine 50 includes the display unit, the self-checkout machine 50 does not have to include the output device 400*f*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a data generation program that causes at least one computer to execute a process, the process comprising:
- acquiring product data;
- generating reference source data in which attributes of products are associated with each of a plurality of hierarchies based on a variance relationship of attributes of products included in the acquired product data; and
- setting the generated reference source data as data to be referred to by a zero-shot image classifier, wherein the generating includes:
- adding a second hierarchy that has attributes related to prices of products under elements of a first hierarchy included in a template of a hierarchical structure;
- assigning items of products similar to elements of the second hierarchy among items of products to be sold in a store under the elements of the second hierarchy;
- determining, as a terminus of the hierarchical structure, an element in which a variance of prices of products that belong to the elements of the first hierarchy is a threshold or less among the elements of the first hierarchy; and determining, as a terminus of the hierarchical structure, an element in which a variance of prices of products that belong to the elements of the second hierarchy is the threshold or less among the elements of the second hierarchy.

2. The non-transitory computer-readable storage medium according to claim 1, wherein the setting includes setting to a class caption to be input to a text encoder included in the zero-shot image classifier.

3. The non-transitory computer-readable storage medium according to claim 1, wherein the zero-shot image classifier narrows down, by inputting an acquired video to the zero-shot image classifier that refers to reference source data in which attributes of objects are associated with each of a plurality of hierarchies, attributes of an object included in the video among attributes of objects of a first hierarchy, identifies attributes of objects of a second hierarchy under the first hierarchy by using the attributes of the object obtained by the narrowing down, and specifies, by inputting the acquired video to the zero-shot image classifier, an attribute of the object included in the video among the attributes of the objects of the second hierarchy.

4. A data generation method for a computer to execute a process comprising:

acquiring product data;

generating reference source data in which attributes of products are associated with each of a plurality of hierarchies based on a variance relationship of attributes of products included in the acquired product data; and setting the generated reference source data as data to be referred to by a zero-shot image classifier, wherein the generating includes:

adding a second hierarchy that has attributes related to prices of products under elements of a first hierarchy included in a template of a hierarchical structure;

assigning items of products similar to elements of the second hierarchy among items of products to be sold in a store under the elements of the second hierarchy;

determining, as a terminus of the hierarchical structure, an element in which a variance of prices of products that belong to the elements of the first hierarchy is a threshold or less among the elements of the first hierarchy; and determining, as a terminus of the hierarchical structure, an element in which a variance of prices of products that belong to the elements of the second hierarchy is the threshold or less among the elements of the second hierarchy.

5. The data generation method according to claim 4, wherein the setting includes setting to a class caption to be input to a text encoder included in the zero-shot image classifier.

6. The data generation method according to claim 4, wherein the zero-shot image classifier narrows down, by inputting an acquired video to the zero-shot image classifier that refers to reference source data in which attributes of objects are associated with each of a plurality of hierarchies, attributes of an object included in the video among attributes of objects of a first hierarchy, identifies attributes of objects of a second hierarchy under the first hierarchy by using the attributes of the object obtained by the narrowing down, and specifies, by inputting the acquired video to the zero-shot image classifier, an attribute of the object included in the video among the attributes of the objects of the second hierarchy.

7. An information processing device comprising:

one or more memories; and one or more processors coupled to the one or more memories and the one or more processors configured to:

acquire product data, generate reference source data in which attributes of products are associated with each of a plurality of hierarchies based on a variance relationship of attributes of products included in the acquired product data, and set the generated reference source data as data to be referred to by a zero-shot image classifier, wherein the generating of the reference source data includes:

adding a second hierarchy that has attributes related to prices of products under elements of a first hierarchy included in a template of a hierarchical structure;

assigning items of products similar to elements of the second hierarchy among items of products to be sold in a store under the elements of the second hierarchy;

determining, as a terminus of the hierarchical structure, an element in which a variance of prices of products that belong to the elements of the first hierarchy is a threshold or less among the elements of the first hierarchy; and determining, as a terminus of the hierarchical structure, an element in which a variance of prices of products that belong to the elements of the second hierarchy is the threshold or less among the elements of the second hierarchy.

* * * * *